US012731400B2

(12) United States Patent
Lee et al.

(10) Patent No.: US 12,731,400 B2
(45) Date of Patent: Sep. 8, 2026

(54) VIDEO SURVEILLANCE SYSTEM WITH COMPREHENSIVE EVENT DETECTION

(71) Applicant: Spot AI, inc., Lehi, UT (US)

(72) Inventors: Nathaniel Paul Lee, San Francisco, CA (US); Amrish Sushil Kapoor, Belmont, CA (US); Dunchadhn Hanley Broer Lyons, Durham, NC (US); Cameron Akhavan, Los Angeles, CA (US); Kevin Tajeran, Roseville, CA (US); Jordan Hart, Jupiter, FL (US); Douglas Rogers, Tucker, GA (US); Lisa Marie Carlson Heile, Cupertino, CA (US)

(73) Assignee: SPOT AI, INC., Lehi, UT (US)

( * ) Notice: Subject to any disclaimer, the term of this patent is extended or adjusted under 35 U.S.C. 154(b) by 0 days.

(21) Appl. No.: 19/037,468

(22) Filed: Jan. 27, 2025

(65) Prior Publication Data

US 2026/0112162 A1 Apr. 23, 2026

Related U.S. Application Data

(60) Provisional application No. 63/709,215, filed on Oct. 18, 2024.

(51) Int. Cl.
*G06V 20/40* (2022.01)
*G06V 10/77* (2022.01)
*G06V 20/52* (2022.01)

(52) U.S. Cl.
CPC .......... *G06V 20/44* (2022.01); *G06V 10/7715* (2022.01); *G06V 20/52* (2022.01)

(58) Field of Classification Search
None
See application file for complete search history.

(56) References Cited

U.S. PATENT DOCUMENTS 12,158,762 B1 12/2024 O'hara et al.
12,272,138 B1 * 4/2025 Annigeri .............. G06V 10/764
(Continued)

OTHER PUBLICATIONS

"U.S. Appl. No. 19/037,493, Non Final Office Action mailed Apr. 25, 2025", 8 pgs.
(Continued)

*Primary Examiner* — James M Anderson, II
(74) *Attorney, Agent, or Firm* — SCHWEGMAN LUNDBERG & WOESSNER, P.A.

(57) ABSTRACT

Methods, systems, and computer programs are presented for detecting events based on video surveillance data and performing automated actions in response to detecting the events. The video surveillance system analyzes video data to detect events. The video is analyzed to detect objects within the video frames, and the objects may include, but are not limited to, people, animals, vehicles, tools, weapons, etc. The system identifies object attributes, such as appearance or movement, which may be used for event search and analysis. The system determines the object locations and calculates relationships between the objects. The triggers for the events are actuated based on the detected objects, such as presence of an object, relationships among the objects, movement of the objects, etc. The actions configured for the events are performed in response to the triggering. The system provides a user interface for defining event parameters, such as camera selection, triggers, and actions.

23 Claims, 31 Drawing Sheets

(56) References Cited

U.S. PATENT DOCUMENTS

| | | | | |
|---|---|---|---|---|
| 12,456,299 | B1 | 10/2025 | Lee et al. | |
| 2007/0013776 | A1* | 1/2007 | Venetianer | H04N 5/76 348/E7.086 |
| 2007/0268145 | A1* | 11/2007 | Bazakos | G07C 9/28 340/521 |
| 2007/0279214 | A1* | 12/2007 | Buehler | G08B 13/19615 340/521 |
| 2020/0186454 | A1 | 6/2020 | Thapliyal | |
| 2020/0334631 | A1* | 10/2020 | Conlon | G08B 25/10 |
| 2021/0256823 | A1* | 8/2021 | Ito | G06V 20/52 |
| 2022/0083767 | A1* | 3/2022 | Subramanian | G06Q 30/0201 |
| 2023/0186630 | A1* | 6/2023 | Joseph | H04N 7/18 348/224.1 |
| 2023/0351753 | A1 | 11/2023 | Gorti et al. | |
| 2024/0127587 | A1 | 4/2024 | Kim et al. | |
| 2024/0203085 | A1 | 6/2024 | Bangalath et al. | |
| 2024/0371164 | A1 | 11/2024 | Yan et al. | |
| 2024/0378859 | A1 | 11/2024 | He et al. | |
| 2025/0045329 | A1* | 2/2025 | Gottumukkal | G06F 16/7837 |
| 2025/0104394 | A1 | 3/2025 | Qiu et al. | |

OTHER PUBLICATIONS

"U.S. Appl. No. 19/037,493, Response filed Jul. 11, 2025 to Non Final Office Action mailed Apr. 25, 2025", 11 pgs.
"U.S. Appl. No. 19/037,493, Notice of Allowance mailed Jul. 22, 2025", 7 pgs.

* cited by examiner

AI Agents: Extra eyes and hands for your safety, operations and security managers

AI agents see the environment and understand the context to automatically accomplish tasks that meet predefined objectives

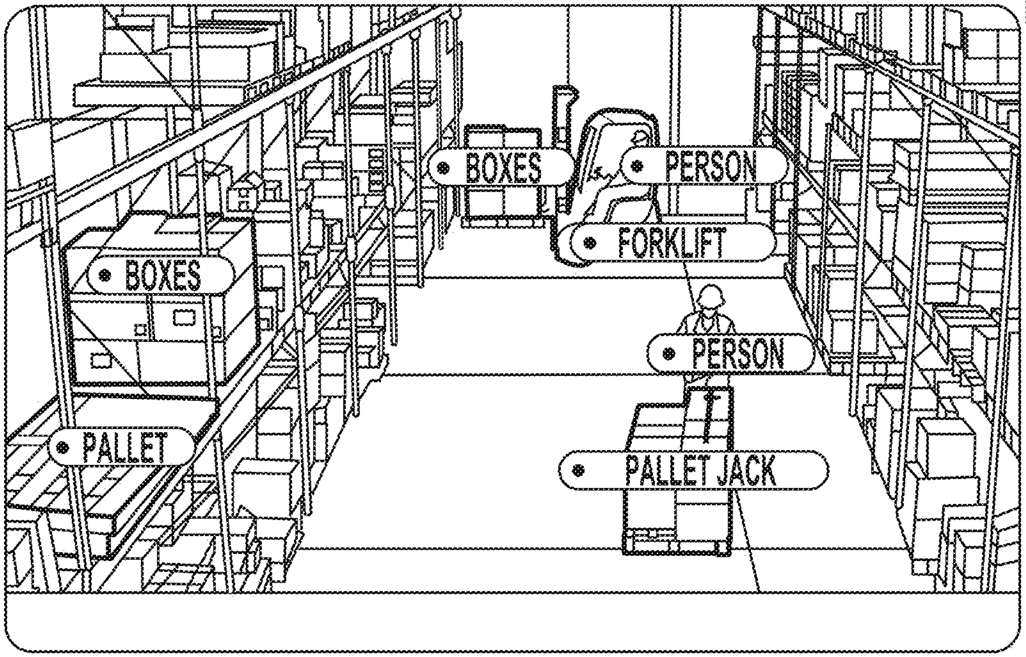

Understand Your Environment

Combine AI-powered object and activity detection to detect custom events adapted to your operational needs

| Safety | Operations | Security |
|---|---|---|
| Missing PPE | Unattended workstation | Motor break-in/theft |
| Forklift accident | Missing object tracking | Loitering |

...and many more

Automatically Respond

Once an event is detected, AI Agents immediately trigger pre-configured actions, within and across systems

| | |
|---|---|
| Notify contact list | Door lockdown |
| Turn on siren, flood lights, or other deterrence device | Automated message |
| Stop machine | Trigger YMS, PMS, ERP |

UNATTENDED KIOSK

402

FRAME DETECTION

802 FILTER:
PEOPLE OR CAR

FRAME (PEOPLE + CAR)

804 OVERLAP FILTER
PERSON + OBJECT IS KIOSK OR CAR

FRAME (PEOPLE + CAR)

806 OBJECT COUNT FILTER:
(PEOPLE > 0) AND (CAR > 0)

FENCE-JUMPING ALERT

1202

Event Queue

All Events

+ Create New Event

Manage Events

Search | Filters +

Scanned up to: Aug 20, 2024 11:00 AM

Fetch More

| Date & Time | Event Name | Location | Camera | Severity | Assigning To |
| --- | --- | --- | --- | --- | --- |
| Aug 20, 2024 12:42 PM PDT | Test | #3 Ed Temple Blvd | Loading | | |
| Aug 20, 2024 12:42 PM PDT | Test | #3 Ed Temple Blvd | Queue | | |
| Aug 20, 2024 12:42 PM PDT | Test | #1 Doverside Drive | NPU Drive Out | | |
| Aug 20, 2024 12:41 PM PDT | Test | #3 Ed Temple Blvd | Queue | | |
| Aug 20, 2024 12:41 PM PDT | Test | #1 Doverside Drive | XPT 2 | | |
| Aug 20, 2024 12:41 PM PDT | Test | #3 Ed Temple Blvd | XPT 2 | | |
| Aug 20, 2024 12:41 PM PDT | Test | #1 Doverside Drive | XPT 2 | | |
| Aug 20, 2024 12:41 PM PDT | Test | #1 Doverside Drive | NPU Drive Out | | |
| Aug 20, 2024 12:40 PM PDT | Test | #2 Harding Place | Loading | | |
| Aug 20, 2024 12:40 PM PDT | Test | #1 Doverside Drive | NPU Drive Out | | |
| Aug 20, 2024 12:40 PM PDT | Test | #3 Ed Temple Blvd | Loading | | |
| Aug 20, 2024 12:40 PM PDT | Test | #3 Ed Temple Blvd | Queue | | |

Seek

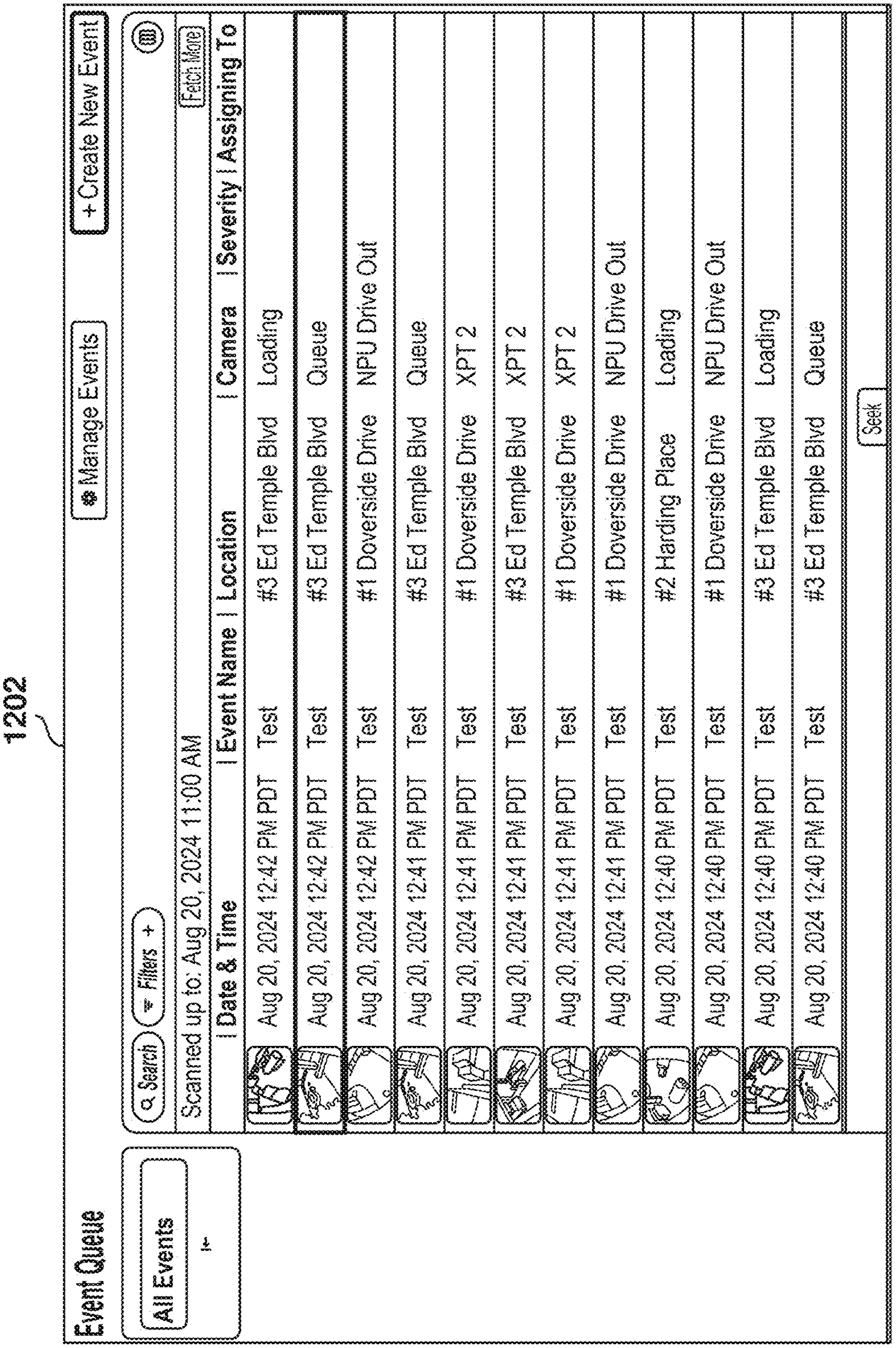

FIG. 12

| 0 | TIME | NAME | RED | BLUE | GENDER | POSE | | |
|---|---|---|---|---|---|---|---|---|
| 1 | 1:12:15 | JOE | 1 | | M | 7 | | |
| 2 | 1:12:17 | JANE | | 1 | F | 5 | | |

| 0 | TIME | TEMP | DOOR | IR | BIO READER | | | |
|---|---|---|---|---|---|---|---|---|
| 1 | 1:11:01 | | OPEN | | JOE | | | |
| 2 | 1:11:02 | 97 | | ON | | | | |

| ID | OB ID | TIME | X | 7 |
|---|---|---|---|---|
| 1 | JOE | 1:11:03 | 24.5 | 15.6 |
| 2 | CHEVY | 1:11:04 | 25.6 | 14.0 |
| 3 | FKLFT | 1:11:06 | 28.9 | 21.3 |

1602

EVENT CAPTURE LOG

INTENDED TO VERIFY ACTION ACTIVITY FOR THIS ASSOCIATED EVENT. FOR TRACES OF ITERATIONS, PLEASE REFER TO THE INTERNAL TOOLS TRACE DATA IN THE EVENT DETAILS ON THE LEFT SIDEBAR.

EVENT DETAILS:

CAMERA ID: 10289 START TIME: 10/16/2024, 9:20:25.000 AM PDT END TIME: 10/16/2024, 9:20:26.000 AM PDT

| CHECKPOINT | TRACE EVENT | ELAPSED | **TIMESTAMP** ↑ | CAPTURE TRACE ID | DETECTION | USER ID | APPLIANCE ID |
|---|---|---|---|---|---|---|---|
| EVENT_CAPTURE | EVENT_OUTPUT | 6.06S | 10/16/2024, 9:20:31.059 AM PDT | E0B3CD8A-A367-4D9A-87C4-90EBDB38BCC9 | 10/16/2024, 9:20:25.000 AM PDT | | |
| AGENT_LISTENER | MESSAGE_INPUT | 6.19S | 10/16/2024, 9:20:31.189 AM PDT | E0B3CD8A-A367-4D9A-87C4-90EBDB38BCC9 | 10/16/2024, 9:20:25.000 AM PDT | | |
| AGENT_LISTENER | MESSAGE_PROCESSED | 6.24S | 10/16/2024, 9:20:31.240 AM PDT | E0B3CD8A-A367-4D9A-87C4-90EBDB38BCC9 | 10/16/2024, 9:20:25.000 AM PDT | | |
| AGENT_LISTENER | SCHEDULING_ACTIONS_START | 6.24S | 10/16/2024, 9:20:31.240 AM PDT | E0B3CD8A-A367-4D9A-87C4-90EBDB38BCC9 | 10/16/2024, 9:20:25.000 AM PDT | | |
| AGENT_LISTENER | SCHEDULING_ACTIONS_COMPLETE | 6.24S | 10/16/2024, 9:20:31.241 AM PDT | E0B3CD8A-A367-4D9A-87C4-90EBDB38BCC9 | 10/16/2024, 9:20:25.000 AM PDT | | |
| EVENT_ACTION_NOTIFICATION | SEND_EMAIL_ATTEMPT | 6.31S | 10/16/2024, 9:20:31.307 AM PDT | E0B3CD8A-A367-4D9A-87C4-90EBDB38BCC9 | 10/16/2024, 9:20:25.000 AM PDT | 104 | |
| EVENT_ACTIONDETERRENCE | PERIPHERAL_STATE_UPDATE_ATTEMPT | 6.48S | 10/16/2024, 9:20:31.484 AM PDT | E0B3CD8A-A367-4D9A-87C4-90EBDB38BCC9 | 10/16/2024, 9:20:25.000 AM PDT | | 918 |
| EVENT_ACTION_NOTIFICATION | SEND_EMAIL_SUCCESS | 6.62S | 10/16/2024, 9:20:31.618 AM PDT | E0B3CD8A-A367-4D9A-87C4-90EBDB38BCC9 | 10/16/2024, 9:20:25.000 AM PDT | 104 | |
| EVENT_ACTIONDETERRENCE | PERIPHERAL_STATE_UPDATE_SUCCESS | 6.75S | 10/16/2024, 9:20:31.747 AM PDT | E0B3CD8A-A367-4D9A-87C4-90EBDB38BCC9 | 10/16/2024, 9:20:25.000 AM PDT | | 918 |

VIDEO SURVEILLANCE SYSTEM WITH COMPREHENSIVE EVENT DETECTION

CROSS-REFERENCE TO RELATED APPLICATIONS

This application claims the benefit of U.S. Provisional Patent No. 63/709,215, filed on Oct. 18, 2024, and entitled "Video Surveillance System with Comprehensive Event Detection." This provisional application is herein incorporated by reference in its entirety.

TECHNICAL FIELD

The subject matter disclosed herein generally relates to methods, systems, and machine-readable storage media for analyzing video surveillance streams to detect configurable events.

BACKGROUND

In the field of video surveillance, users encounter challenges in efficiently and accurately identifying specific events within extensive video feeds. The manual process of sifting through hours of footage to locate particular incidents, such as a vehicle approaching a pedestrian or a customer waiting unattended, proves time-consuming and inefficient. This hinders the ability to address situations promptly.

Further, clients may have very specific situations that they want to detect automatically. However, there may not be a pre-configured tool to do so. The complexity of creating AI monitoring tools makes it difficult to create new surveillance tools without extensive technical expertise or resources. The problem is further compounded by the inefficiency of existing methods, which often require large datasets and complex neural network architectures.

BRIEF DESCRIPTION OF THE DRAWINGS

Various appended drawings illustrate examples of the present disclosure and cannot be considered limiting its scope.

FIG. 2 illustrates the use of AI agents for security applications, according to some examples.

FIG. 12 shows a UI for presenting event information, according to some examples.

FIG. 16 shows a table for tracing actions, according to some examples.

DETAILED DESCRIPTION

Figure 1:
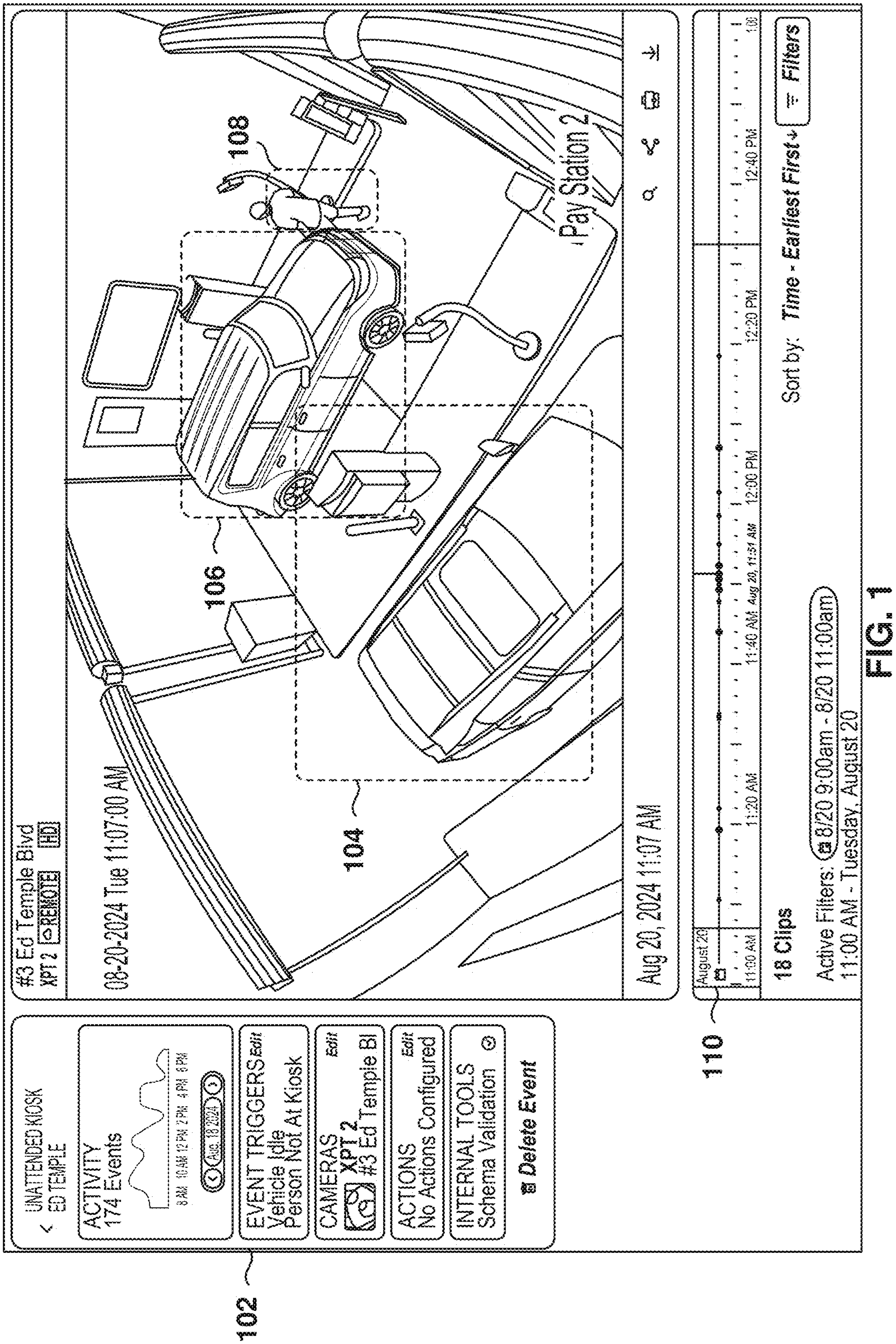
FIG. 1 shows a user interface (UI) for reviewing events in a video surveillance system, according to some examples.

Example methods, systems, and computer programs described herein are directed at performing semantic analysis of video data for event detection and validation. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

Example methods, systems, and computer programs are directed at configuring actions and detecting events based on video surveillance data (e.g., images). Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

Existing solutions primarily rely on basic motion detection, resulting in a high volume of false alarms. These systems cannot discern complex object relationships or reason about the semantic nature of the captured image; often, their outputs are simply approximations and not a detection of an actual event, leading to an overwhelming number of irrelevant alerts. The absence of advanced filtering and customization options further exacerbates the issue, as users cannot tailor the system to their requirements.

In one aspect, a solution provides for the creation of security agents designed to enhance security monitoring by allowing users to create custom event alerts. The platform provides precise event detection based on people, motion, vehicles, or the like enabling users to define events such as fighting, loitering, and near misses of objects (e.g., a person and a vehicle) using a combination of existing data and Artificial Intelligence (AI). The system may reduce security costs by enhancing the effectiveness of security personnel (e.g., the number of false alerts is significantly reduced) and may provide a customizable solution for each user.

It is noted that some examples are described with reference to detecting security events, but the same principles may be used to detect any other type of events, such as events related to safety, operations, monitoring, attendance, etc.

Some features include the ability to set up AI monitoring, search for events, and execute actions based on detected events. The platform also allows users to coach the AI for improved accuracy and offers an easy-to-use event builder for creating new alerts and templates.

The disclosed system provides a comprehensive approach for detecting events based on video surveillance data. The system may utilize advanced AI models (also referred to as machine-learning [ML] models) to detect and track objects, identifying attributes such as color, position, and movement. By defining specific zones and object relationships, the system enables the creation of customizable event templates. This approach allows users to tailor event detection to their specific needs, reducing false alarms and enhancing monitoring efficiency. The integration with external systems through APIs further enables automated actions, improving response times and security measures.

In some examples, the system receives data from other relevant sources that provide additional context, including, but not limited to, access control systems, enterprise resource planning (ERP) systems, vape sensors, smoke sensors, temperature sensors, and so on.

In some examples, the system uses semantic models to compute embeddings (e.g., intelligent semantic conceptualizations) of video frames and crops to enhance detection accuracy using an understanding of images and text.

In some examples, the various sources of data are composed using Compound AI to determine the accurate firing of events based on context clues. Namely, the triggers for the events are actuated based on the detected objects, such as presence of an object, relationships among the objects, movement of the objects, badge scans, semantic reasonings, and more.

The event detection optionally goes through a verification process through AI-based cognitive systems that can reason on raw video clips using AI (e.g., an LLM). The actions configured for the security events are performed in response to the triggering or optional verification. Further, the system provides a user interface for defining event parameters, such as camera selection, triggers, and actions. The combination of these definitions results in an agent for detecting the occurrence of the event.

In one aspect, methods, systems, and computer programs are presented for performing semantic analysis of video data for event detection and validation. One method includes an operation for training a machine-learning model with text-image pairs to create a semantic model. The semantic model generates text embeddings based on text describing events and image embeddings from video frames. The system calculates similarity values between text and image embeddings to determine event occurrences when the similarity exceeds a predetermined threshold. The system enables precise event detection by analyzing object relationships and attributes within video frames, reducing false alarms and enhancing monitoring efficiency.

Some of the concepts used for the description of the solution are presented below.

An event is a specific occurrence of a predefined situation detected by the video surveillance system. For example, the event occurrence may be identified using heuristics or AI models and may involve the detection of object presence, object absence, object interactions, or relationships between objects. The occurrence of the event is detected based on a trigger or a combination of triggers.

A verified event is an event that has been verified automatically, e.g., using an automated AI transformer-based cognition system that watches the event and determines whether the event has been positively detected.

A trigger is a condition used to determine when an event has occurred. Many types of conditions may be used, such as conditions based on object attributes, relationships between the objects, timing of the objects, missing objects, etc. When the condition is satisfied, then the trigger is said to have been activated.

A trigger combination is a set of triggers that can be logically combined using logical operations to determine when an event has occurred.

An action includes a predefined response executed by the system upon detecting an event, such as sending notifications or triggering alarms.

An agent is a program that determines if a trigger, or a combination of triggers, is activated to determine that an event has occurred. The agent performs one or more actions when the trigger is activated. If an agent is based on a single trigger, the agent will determine that the associated event has occurred when the trigger is activated. If an agent is based on a trigger combination, the agent will determine that the event has occurred when the trigger combination is activated.

An event template is a pre-configured agent for detecting the occurrence of a specific type of event. The event template comprises one or more triggers and one or more actions.

A frame includes a single image captured by a camera, forming part of the continuous video data used for detecting objects and events.

An object includes an entity detected within video frames, such as people, vehicles, tools, or weapons, identified by attributes, such as identity, color, and position.

An AI model is a machine learning model that uses algorithms to analyze data, identify patterns, and make decisions or predictions based on the data.

A bounding box is a rectangular outline used to define the position and size of an object within an image frame.

Detection metadata includes structured information extracted from video data, including attributes such as object identity, color, position, and movement.

An embedding is a dense numerical representation of a discrete object, such as a word, image, or user, in a high-dimensional space.

An image encoder is a component of a machine-learning model that encodes visual inputs, such as video frames or object crops, into a high-dimensional semantic space.

An image embedding comprises a vector that encodes information based on an image frame. In some examples, the image embedding may be used for comparison with text embeddings.

A text embedding is a vector that encodes information based on text. In some examples, the text embedding corresponds to text that describes the occurrence of an event.

A text-image pair is a combination of an image and its corresponding textual description used for training machine-learning models to create a shared embedding space where the meanings of the text and the visual content of the image are closely aligned.

Metadata is structured information extracted from video data, including attributes such as object identity, color, position, and movement.

A semantic model is a model trained to understand and generate embeddings for both visual and textual data, allowing for effective comparison and reasoning across different data modalities.

A similarity value is a measure of the closeness (e.g., cosine distance) between two embeddings.

Few-shot learning is a machine learning approach that enables a model to learn and make accurate predictions with only a small number of training examples.

Cosine distance is a metric used to measure the similarity between two vectors, often used in the context of comparing embeddings.

FIG. 1 shows a user interface (UI 102) for reviewing events in a video surveillance system, according to some examples. The UI 102 may provide a comprehensive view of an event related to an unattended kiosk scenario. An event is a specific occurrence of a predefined situation detected by the video surveillance system. For example, the event occurrence may be identified using heuristics or AI models and may involve the detection of object presence, object absence, object interactions, or relationships between objects. The occurrence of the event is detected based on a trigger or a combination of triggers, as described in more detail below.

The UI 102 displays an image of a video feed from a security camera capturing images in the area around the kiosk, highlighting specific elements such as a vehicle 104 and a vehicle 106. A kiosk is a small structure or machine that can be used for a variety of purposes to interact with a person. These vehicles 104 and 106 are identified within designated zones (e.g., rectangles that are bounding boxes) that have been identified by a machine-learning (ML) model.

A person 108 is also shown to be detected within the area, interacting with the kiosk environment. The system uses advanced AI models to track and identify objects, ensuring accurate monitoring of the area. The UI 102 includes a timeline 110, which allows a user to navigate through recorded events. This timeline 110 provides a visual representation of the events captured over time, thus enabling efficient review and analysis of the video footage captured by the security camera. A user can view timestamps and select specific clips of the captured video to review. In some examples, options are provided to sort and filter the clips based on time and other criteria.

An information panel, located on the left side of the UI 102, displays details about surveillance activity. It includes sections for "Activity" (showing the number of events during a selected time period), "Event Triggers" (listing specific triggers such as "Vehicle Idle" and "Person Not Attending Kiosk" during the time period), and "Cameras" (indicating the active camera feed associated with the event). Options for editing these settings are available.

There may be a need in some deployments to identify events, such as when a vehicle approaches a person too closely or a customer has been waiting for more than 30 seconds without staff attending. In existing solutions, identifying specific instances in video footage requires manually reviewing the entire footage sequence. In some examples, intelligent filtering of events is performed in order to reduce the number of situations that need attention. The system is designed to analyze historical data about events quickly and using flexible selection parameters.

FIG. 2 illustrates the use of AI agents for security applications, according to some examples. An agent is a program that determines if a trigger, or a combination of triggers, is activated to determine that an event has occurred. The agent performs one or more actions when the trigger is activated. If an agent is based on a single trigger, the agent will determine that the associated event has occurred when the trigger is activated. If an agent is based on a trigger combination, the agent will determine that the event has occurred when the trigger combination is activated.

Further, a trigger is a condition used to determine when an event has occurred. Many types of conditions may be used, such as conditions based on object attributes, relationships between the objects, timing of the objects, missing objects, etc. When the condition is satisfied, then the trigger is said to have been activated. A trigger combination is a set of triggers that can be logically combined using logical operations to determine when an event has occurred. An action includes a predefined response executed by the system upon detecting an event, such as sending notifications or triggering alarms.

The image depicts a warehouse setting where AI agents identify and label various objects and individuals, including boxes, pallets, a forklift, a pallet jack, and people. The AI agents can detect these elements and understand the context to perform tasks aligned with specific objectives.

The right side of the figure outlines the AI agents' functionalities, categorized into two areas: "Understand Your Environment" and "Automatically Respond." In the first section, AI-powered object and activity detection are used to identify custom events tailored to operational needs, with categories including safety, operations, and security. Specific examples are provided, such as detecting missing personal protective equipment, unattended workstations, and potential security threats like motor break-ins or loitering.

The second section describes the AI agents' capability to trigger pre-configured responses once an event is detected. These responses include notifying a contact list, activating deterrence devices like sirens or floodlights, stopping machinery, initiating door lockdowns, sending automated messages, and triggering systems such as Yard Management System (YMS), Property Management System (PMS), or Enterprise Resource Planning (ERP).

The identified objects interact within a warehouse environment to facilitate object and activity detection, enabling the system to understand the context and accomplish specific tasks. The system identifies and tracks boxes, e.g., to detect any unauthorized movement or tampering. This tracking aids in maintaining accurate stock records and ensuring security within the warehouse.

The forklift operates within the warehouse to transport pallets and boxes. The system monitors the forklift's movement and interactions with other components, such as person and pallet jack, to prevent accidents and ensure safe operation. The AI agents analyze the forklift's path and speed to reduce the risk of collisions.

A person is detected interacting with the environment, e.g., to operate the forklift and handle boxes. The system may track the person to ensure compliance with safety protocols, such as wearing personal protective equipment (PPE), to monitor productivity, or to detect dangerous situations, e.g., collision with the forklift. The AI agents provide alerts if any safety violations occur.

The system identifies pallets to detect events related to loading and unloading processes. By tracking pallets, the AI agents can optimize storage space and streamline logistics operations within the warehouse (e.g., low inventory).

The pallet jack is used to move pallets and boxes manually. The system monitors the use of pallet jacks to ensure safe handling practices and prevent damage to people and goods.

Figure 3:
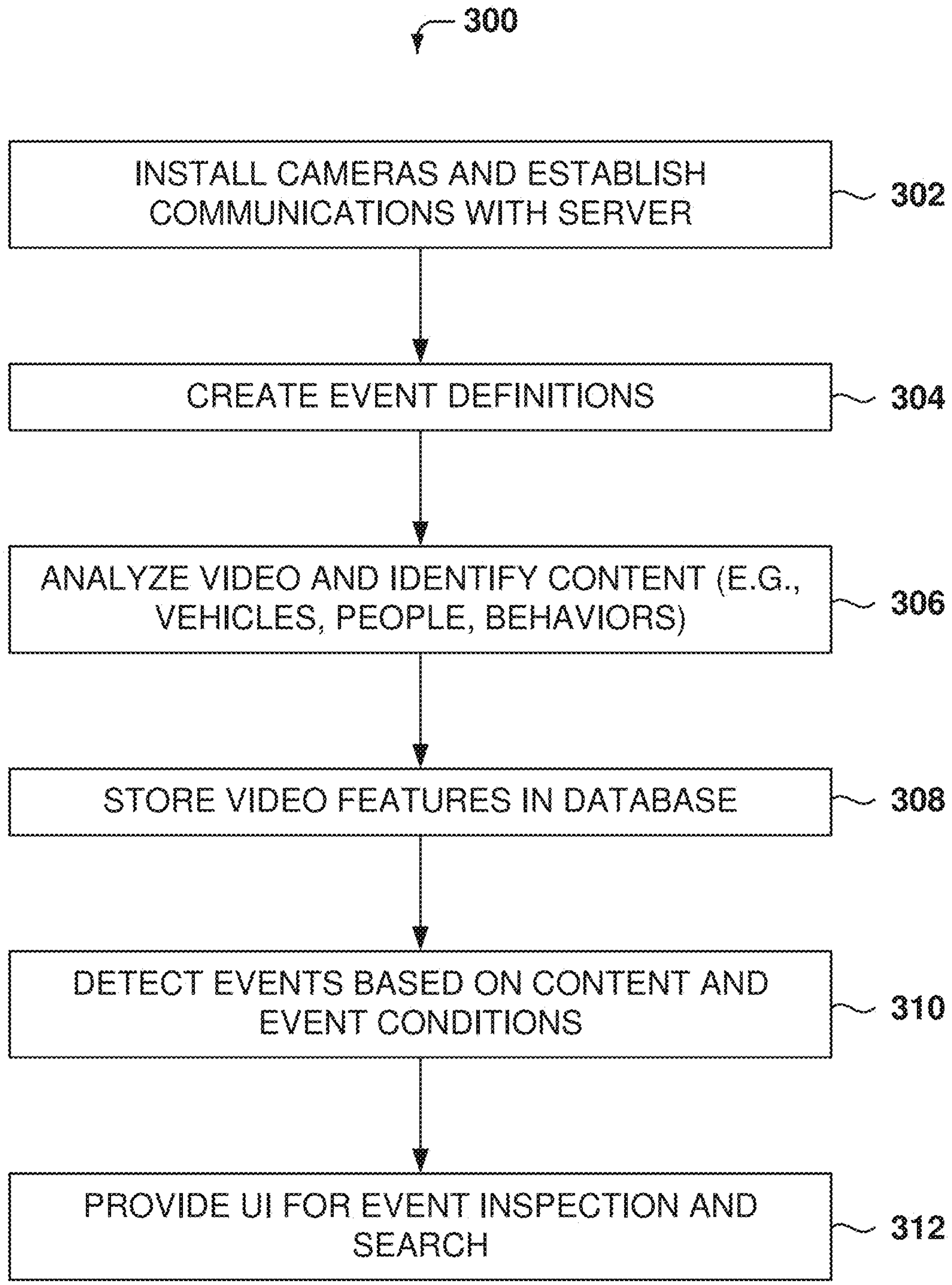
FIG. 3 shows a flowchart of a method for analyzing surveillance footage, according to some examples.

FIG. 3 shows a flowchart of a method 300 for analyzing surveillance footage, according to some examples. While the various operations in this flowchart are presented and described sequentially, one of ordinary skill will appreciate that some or all of the operations may be executed in a different order, be combined or omitted, or be executed in parallel.

Operation 302 is for the installation of cameras and the establishment of communications with a server. This involves setting up one or more cameras to capture continuous video feeds and ensuring that these cameras are connected to a network that allows data transmission to an Intelligent Video Recorder (IVR) device. In some examples, the Real-Time Streaming Protocol (RTSP) is used to stream compressed video data from the cameras to the IVR.

From operation 302, the method 300 flows to operation 304 for creating event definitions and the agents to detect the events. This operation involves defining specific events that the system will monitor. Users can create agents for event detection from scratch or using event templates.

An event may be defined for specific zones within the video data where monitoring is required. The user may manually mark these zones or allow the software to identify them automatically. Further, the agent may check object relationships, such as proximity and positional relationships, to monitor interactions between objects (e.g., a person approaching a vehicle).

From operation 304, the method 300 flows to operation 306 for analyzing video and identifying content, such as vehicles, people, and behaviors. In some examples, an ML model is utilized to detect and track objects within the video data. The model is configured to identify objects and their attributes, e.g., identify color, position, vehicle type, and movement. The tracking includes maintaining object identity across frames and ensuring accurate tracking of speed and position.

From operation 306, the method 300 flows to operation 308 for storing video features in a database. As used herein, metadata refers to the structured information extracted from video data, including attributes such as object identity, color, position, movement, and other relevant characteristics.

This metadata is stored in a database to facilitate efficient querying and retrieval for event detection and analysis. In some examples, the video metadata is stored in a columnar database for efficient querying and retrieval. The columnar store compresses data and facilitates rapid querying, recording object attributes, positions, and other relevant metadata.

From operation 308, the method 300 flows to operation 310 for detecting events by the agents based on content and event conditions. The system applies the defined event templates to the stored video data to identify relevant incidents. This process allows the system to detect events without requiring real-time monitoring.

From operation 310, the method 300 flows to operation 312 for providing a UI for event inspection and search. The UI allows users to create agents, review detected events, and apply filters. Users can search events based on features stored in the database and apply filters, e.g., time window, event name, location, camera, and event severity.

Figure 4:
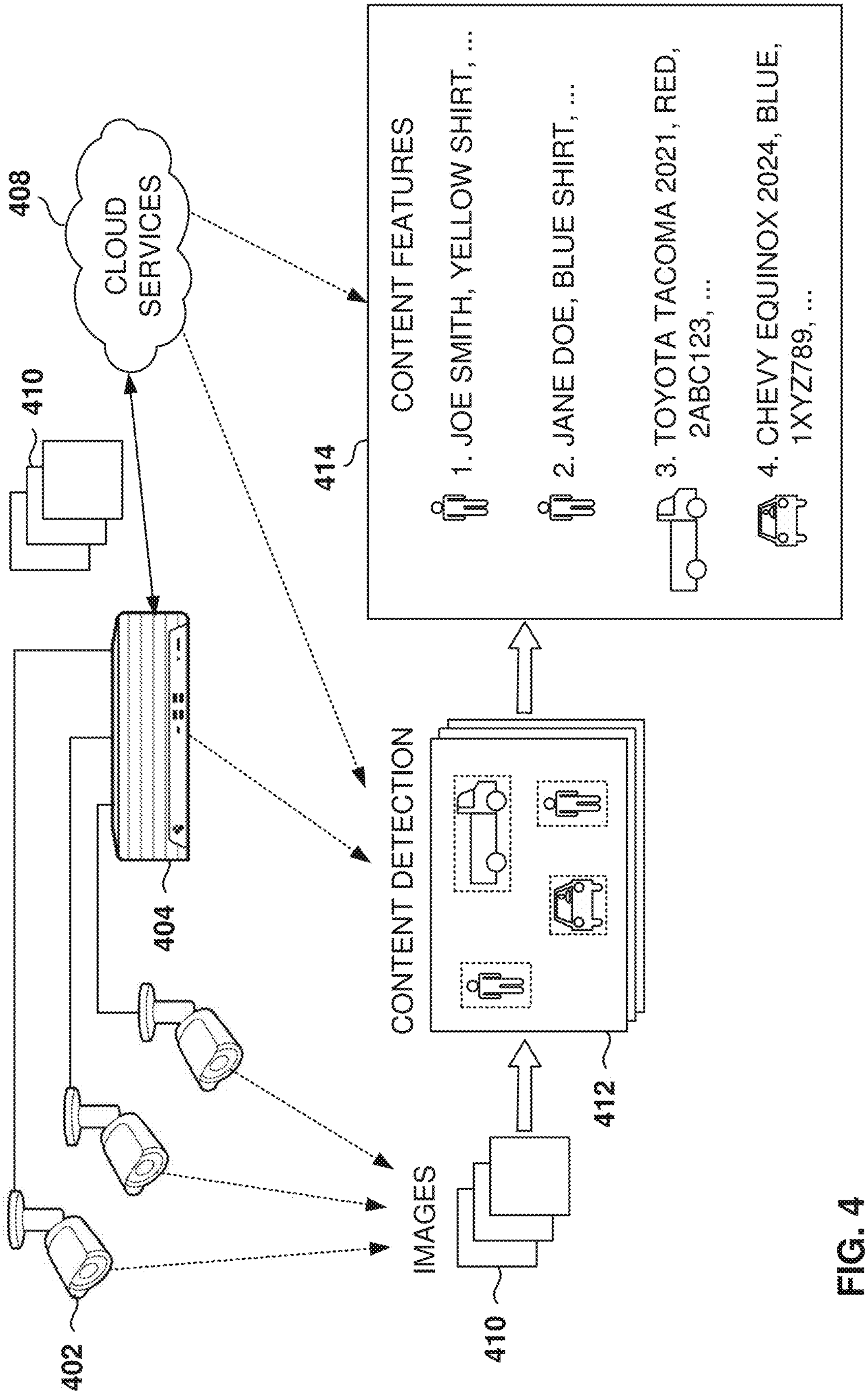
FIG. 4 shows a sample high-level architecture for event detection, according to some examples.

FIG. 4 shows a sample high-level architecture for event detection, according to some examples. The system comprises several components that work together to analyze video data and detect events.

One or more cameras 402 capture video data and transmit the video data to the IVR 404. The IVR 404 processes the video data and sends the video data to cloud services 408 for further analysis. The cloud services 408 provide additional computational resources and storage capabilities, enabling advanced processing and data management.

The IVR 404 is a high-performance, AI-powered video recording system designed to enhance video surveillance and security operations. The IVR 404 offers a hybrid architecture that combines local storage with cloud-based features, enabling users to securely store video locally while backing up event-related footage to the cloud. This setup ensures video data is both easily accessible and protected, with encryption measures in place to secure it during both storage and transmission.

The IVR 404 is compatible with any Internet Protocol (IP) camera, allowing users to integrate their existing camera setups. In some examples, the IVR 404 can scale to accommodate a wide range of camera counts, supporting configurations from small installations of 8 cameras to larger enterprise deployments of up to 64 cameras. This flexibility is further enhanced by advanced AI-driven features such as people counting, vehicle tracking, and the ability to search footage quickly using intuitive filters.

The IVR 404 also offers robust redundancy features, including Redundant Array of Independent Disks (RAID) support in larger systems. Additionally, the system ensures that users can automate workflows, improve operations, and access footage easily from a centralized cloud dashboard.

Images 410 represent the video frames extracted from the video data. These frames are subjected to content detection 412 by the existing agents, where objects and features within the frames are identified (e.g., bounding boxes defined around each object to identify the location, as well as metadata describing characteristics of the object). It is understood that object is used as a generic term and may also include people. In some examples, the content detection 412 utilizes machine learning models to recognize and classify objects such as people and vehicles. The content analysis may be performed by the IVR 404 or by the cloud services 408.

Content features 414 are generated from the detected objects and saved as metadata associated with each object.

These features may include attributes such as identity, clothing color, vehicle make and model, and license plate information. The content features 414 are analyzed for the detection of security events based on predefined conditions and relationships between the detected objects.

The integration of these components allows for efficient event detection and monitoring, providing users with the ability to define and respond to specific scenarios. The system leverages both edge and cloud computing to optimize performance and scalability.

Video is defined as a list of streams or as a list of frames, also referred to as images 410, that are continuously transmitted from the camera. The purpose is to maintain an uninterrupted recording of video content, which is then stored and utilized for various applications.

One objective is to identify the presence of individuals, vehicles, forklifts, weapons, etc., within the frame and record the positions of these specified objects. The agent uses an AI model to detect these objects.

Bounding boxes are drawn around the objects to indicate their locations. At a certain point, these objects may move. To detect movement, the positions of these objects are periodically checked, e.g., one to three times per second.

For example, an individual relocates to another area, and a forklift changes its position when moving away. Subsequently, these objects may temporarily become unobservable. The system is tasked with redetecting these objects to ascertain their new locations. The video processing pipeline checks to re-identify these objects in order to maintain a consistent recognition of objects and their movement, which includes evaluating the velocity and new positions of the detected objects.

Once it has been established that the individual does indeed exist and is not a false positive, a detection of the person's features is performed. For example, these features may include, but are not limited to, the color of the shirt, the color of the pants, a person's identity (e.g., via facial recognition), etc. These identified features are then stored to facilitate the search of specific events (e.g., finding when a particular person entered one zone).

The system converts the information into an enumeration of individuals, vehicles, forklifts, etc., present within the frame. For example, object number one has been identified as person number one, and the individual is detected wearing a yellow shirt and blue pants. A detection list is compiled from these observations.

Variations in lighting conditions occasionally result in the perception of a yellow illumination, which may suddenly change to a blue light or similar phenomenon. Prior to resolving the implications of these variations, the information remains as preliminary detections. The presence of a second individual, various objects, a third individual, and various vehicles may occur. The attributes of a vehicle may include make, model, and license plate (e.g., detected via license plate reading).

The IVR 404 sends the identified object data to the cloud services 408 for further processing. In some examples, the cloud services 408 is implemented as a Senseware Cloud, but other cloud services may be implemented (e.g., Amazon Web Services [AWS], Microsoft Azure, Google Cloud Platform [GCP], IBM Cloud, Oracle Cloud, etc.). The Senseware Cloud typically integrates with Internet of Things (IoT) devices and sensor networks to collect, store, analyze, and visualize real-time data. This data can pertain to a wide array of metrics such as temperature, humidity, energy consumption, air quality, and more.

Figure 5:
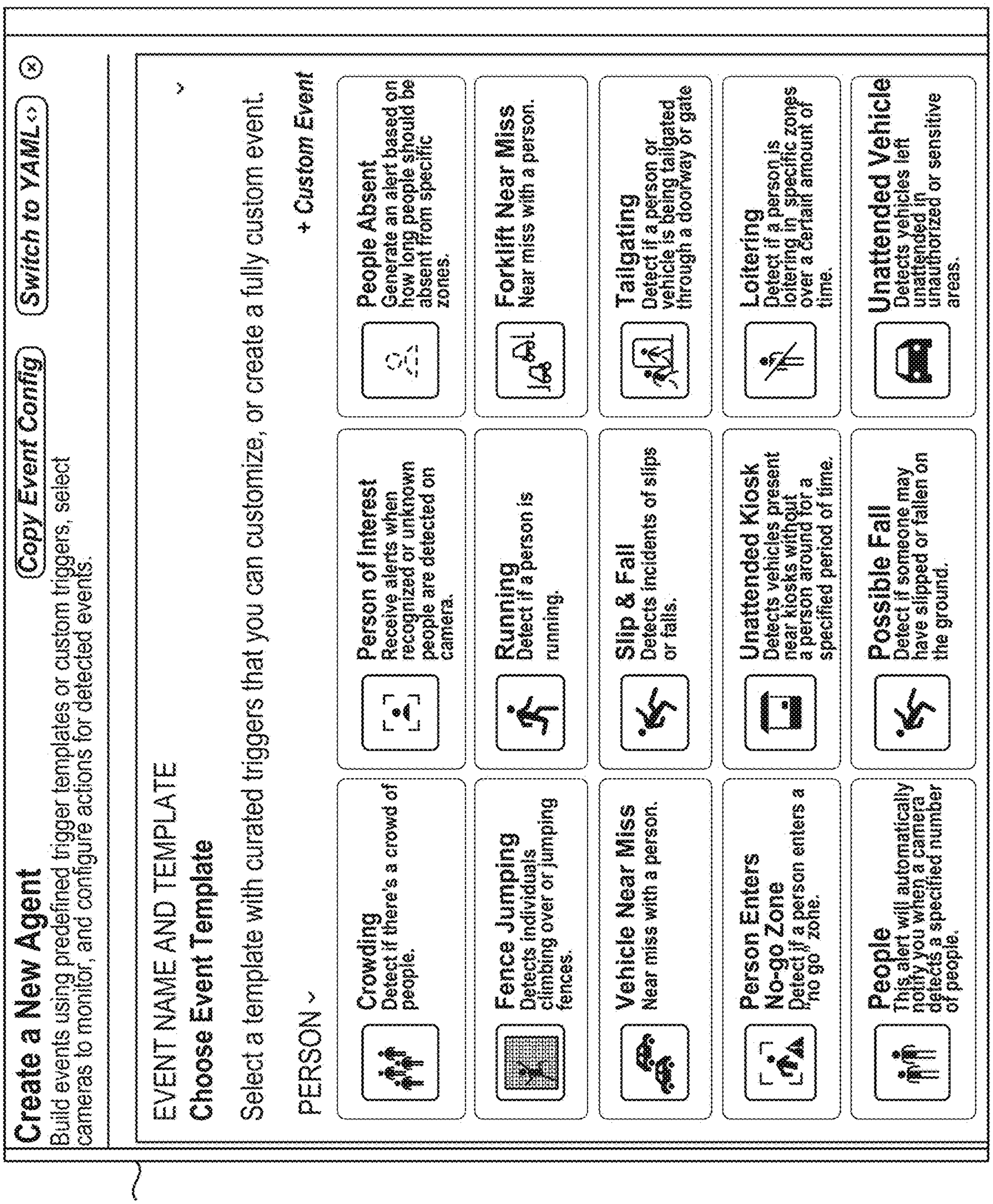
FIG. 5 shows a UI for creating agents, according to some examples.

FIG. 5 shows a UI 502 for creating agents, according to some examples. An event template is a pre-configured agent for detecting the occurrence of a specific type of event. The event template comprises one or more triggers and one or more actions.

The UI 502 includes a section labeled "Event Name and Template," where users can choose an event template. Various templates are displayed, each represented by an icon and a brief description. These templates include options such as "Crowding," "Person of Interest," "People Absent," "Fence Jumping," "Running," "Forklift Near Miss," "Vehicle Near Miss," "Slip & Fall," "Tailgating," "Person Enters No-go Zones," "Unattended Kiosk," "Loitering," "People," "Possible Fall," and "Unattended Vehicle." Each template is designed to detect specific events or conditions, allowing users to customize alerts and actions based on the selected triggers.

For example, the People-Absent event template detects scenarios where individuals are expected to be present but are not detected within a defined area for a specified period. It uses object detection to monitor absence in designated zones.

The event for Forklift Near Miss identifies situations where a forklift comes dangerously close to other objects or people, potentially causing an accident. It analyzes proximity and movement patterns to detect near-miss incidents.

The event for Unattended Kiosk monitors kiosks to detect when they are left unattended. It tracks the presence of personnel in proximity to the kiosk and triggers alerts if no one is detected for a predetermined threshold duration.

For Fence Jumping, the event template detects instances where individuals attempt to climb or jump over a fence. It monitors specific zones for unauthorized entry and triggers alerts when such activity is detected.

For Slip and Fall, the template identifies occurrences where a person slips or falls within a monitored area. It analyzes body movements and positions to detect potential accidents and issues alerts for immediate response.

For Tailgating, the template detects situations where an unauthorized person or vehicle follows closely behind an authorized individual or vehicle to gain access to a restricted area. It monitors entry points and analyzes the sequence of entries to identify tailgating incidents.

Figure 6:
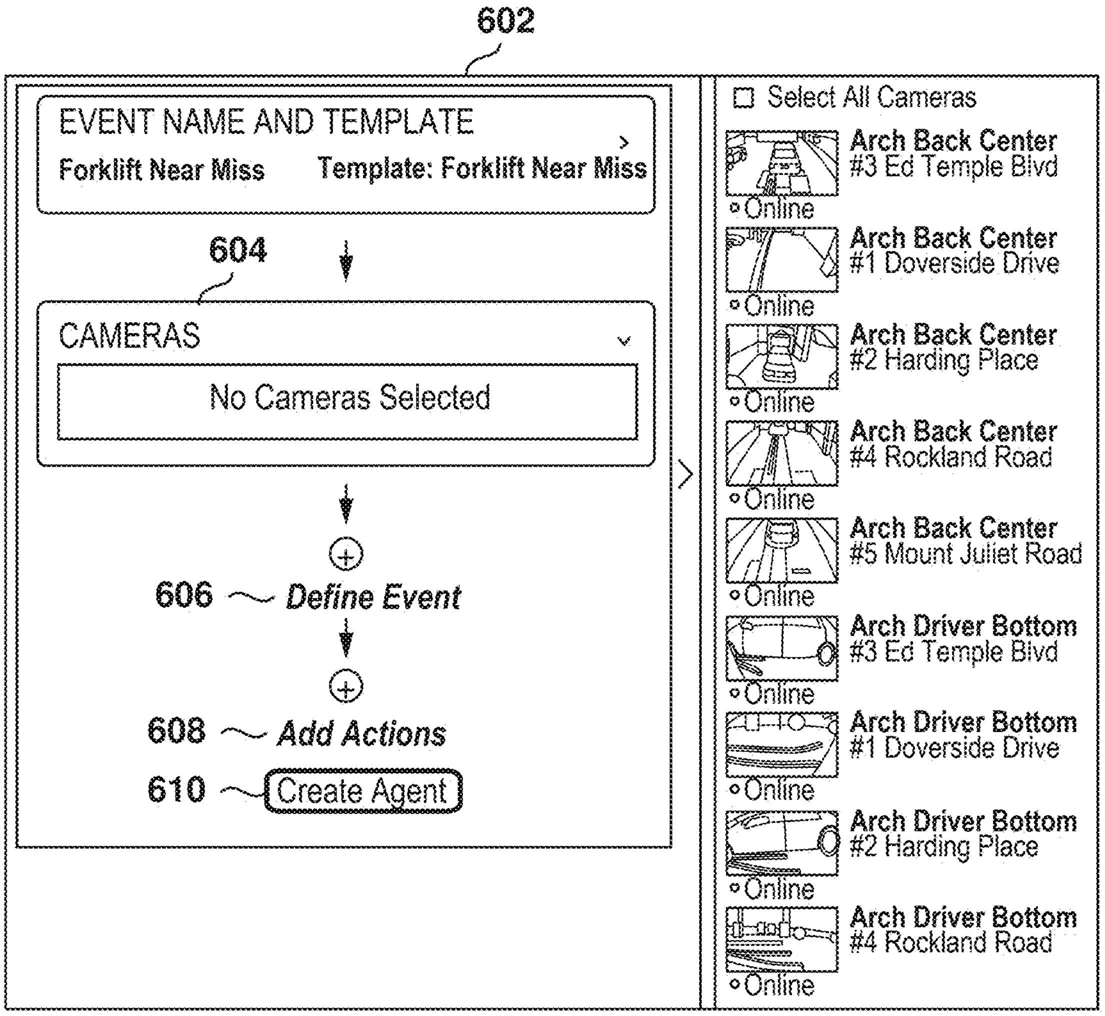
FIG. 6 shows a UI for creating a new agent based on an event template, according to some examples.

FIG. 6 shows a UI 602 for creating a new agent based on an event template, according to some examples. The UI 602 is designed to facilitate the configuration of an agent for event detection within a video surveillance system. The section labeled "Event Name and Template" displays the selected template ("Forklift Near Miss" in the illustrated example), providing users with a predefined structure for agent creation.

To create agents, the system allows the use of any data available in the platform and the possibility of combining different data to create alerts for custom events tailored to each organization's use case. For example, when a school administrator wants to prevent trespassing, the administrator wants to be alerted when someone is jumping a fence so that they can dispatch a police officer or faculty to address the trespassing event immediately. In another example, when a manager is attempting to reduce safety accidents, the manager wants to know if an accident is about to happen, such as a near miss or a fall, so that they can train and change processes to reduce the number of accidents and reduce costs for the company.

The platform provides a security copilot, which is a personalized assistant working with the user to safeguard the spaces of interest to the user. The user can create her own agents from scratch or use one of the predefined templates. The agent of the security copilot automatically identifies safety and security events and responds to these events.

The initial operation for creating an agent is the selection of cameras in the "Cameras" section 604 to allow users to identify cameras for monitoring. This section includes a dropdown menu where users can choose specific cameras or select all available cameras for the event. The interface provides a visual representation of camera status, indicating whether each camera is online.

The right side of the interface displays a list of available cameras, each with a thumbnail image and status indicator. Users can easily identify and select cameras for inclusion in the event monitoring setup.

After selecting cameras, the "Define Event" button 606 initiates the process of specifying the conditions and triggers for the agent. This operation involves setting parameters such as object presence, absence, and specific object relationships, which are used for accurate event detection.

The "Add Actions" button 608 enables users to configure actions that the agent will perform upon detecting the event. These actions may include sending notifications, triggering alarms, or executing other automated responses through integrated systems. The "Create Agent" button 610 finalizes the agent creation process, saving the defined parameters and actions.

Figure 7:
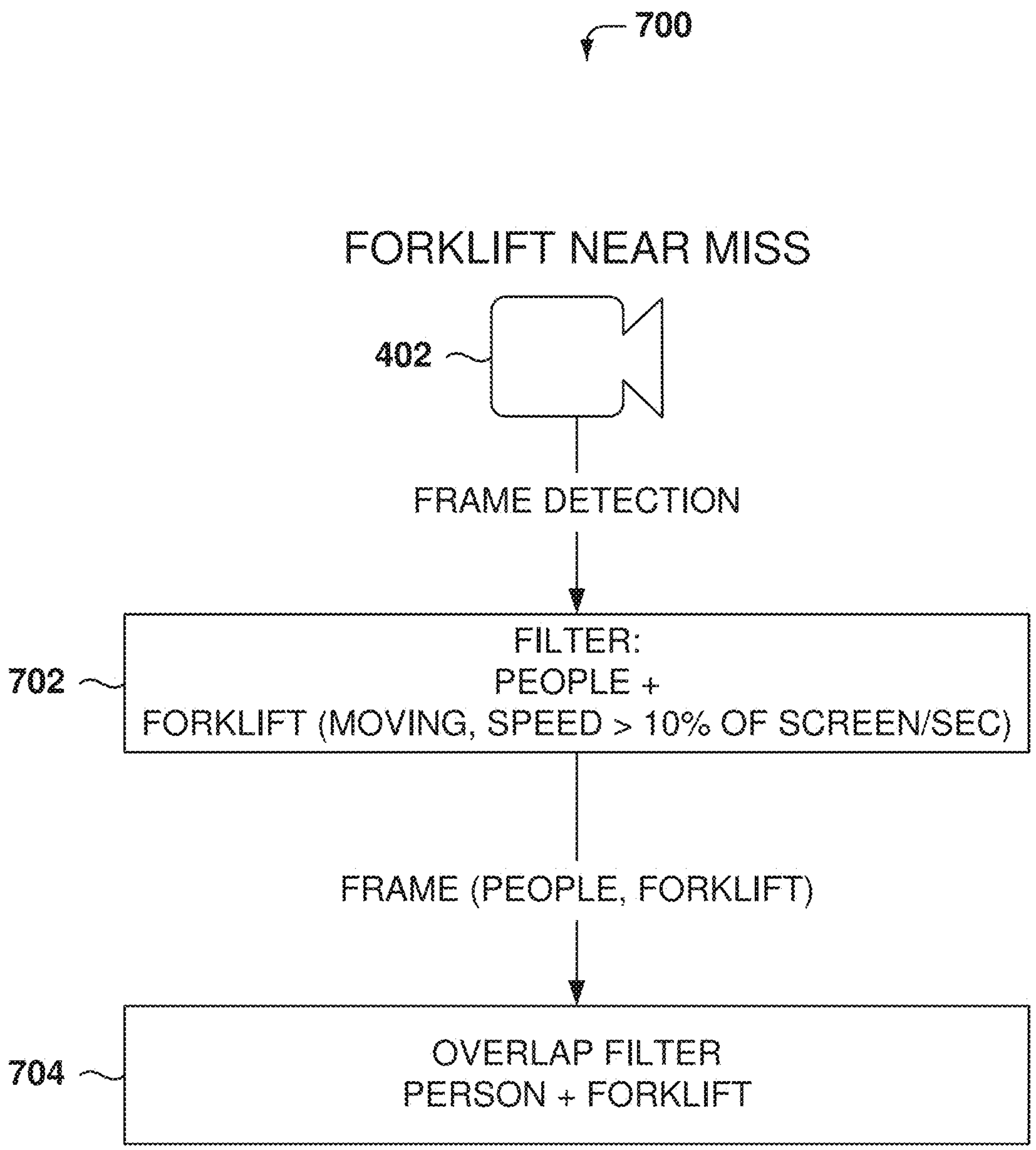
FIG. 7 illustrates the configuration criteria of an agent for forklift near misses, according to some examples.

FIG. 7 illustrates the configuration criteria of an agent 700 for forklift near misses, according to some examples. This process is designed to identify potential safety hazards involving forklifts and personnel in a monitored area. The operations are executed sequentially, with each operation contributing to the overall detection mechanism.

A camera 402 system captures video frames in real time. This operation involves the continuous monitoring of an area where forklifts and personnel are present.

Following frame detection, operation 702 involves filtering the captured frames to identify relevant objects. This operation specifically filters for people and forklifts that are moving at a speed greater than 10% of the screen per second. The movement is identified by comparing the location of the forklift in a plurality of frames. The purpose of this operation is to focus on potential interactions between moving forklifts and personnel, with the purpose of near-miss detection.

In operation 704, the system applies an overlap filter to the previously identified frames. This operation checks for spatial overlap between detected people and forklifts, indicating a potential near-miss situation. The overlap filter uses geometric analysis to determine if a person and a forklift occupy the same or adjacent space within a frame. The purpose of this operation is to pinpoint moments where a collision or near miss is likely, allowing for timely alerts or interventions, as well as flagging these events for safety reviews.

Figure 8:
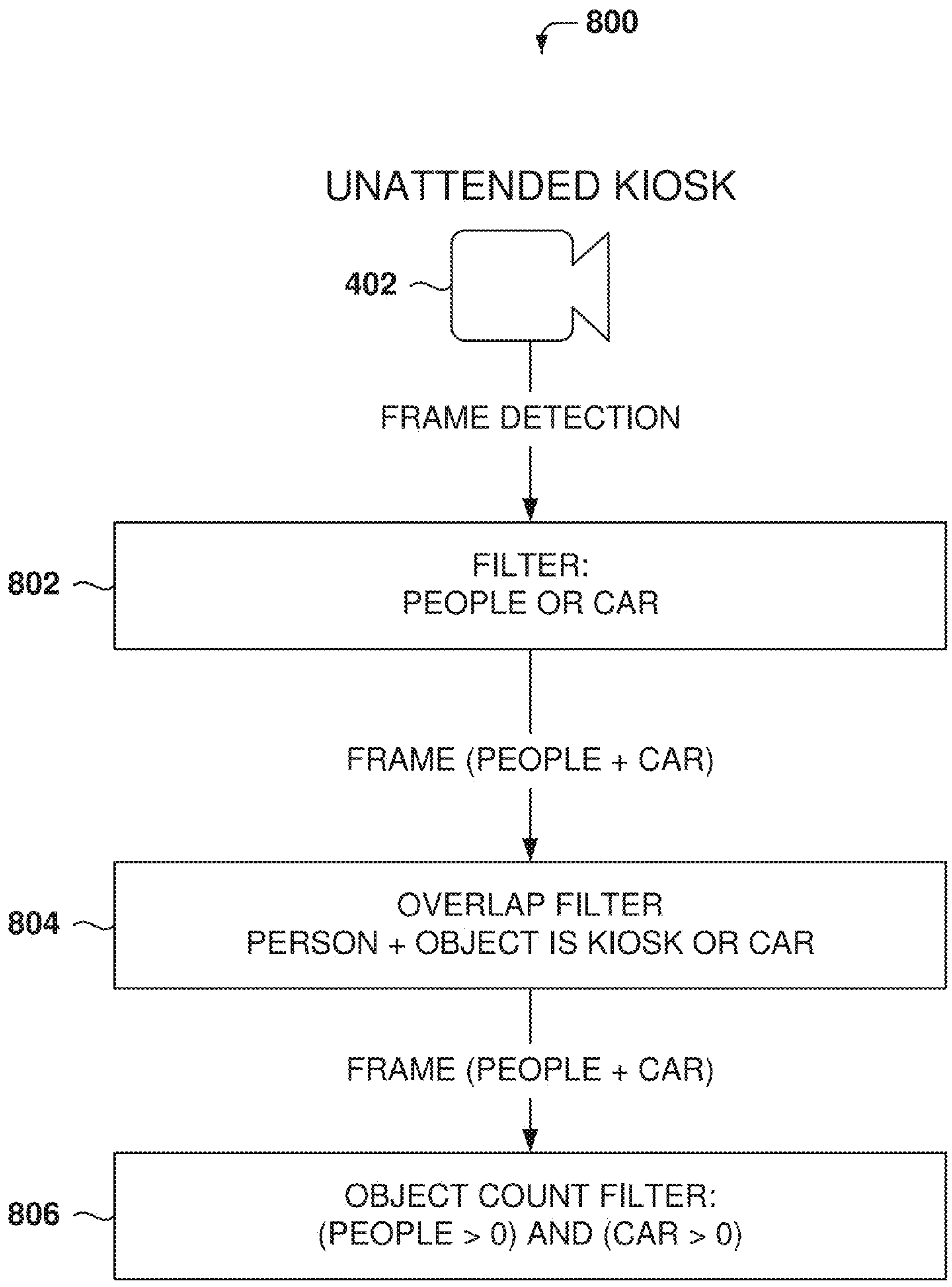
FIG. 8 illustrates the configuration criteria of an agent for unattended-kiosk detection, according to some examples.

FIG. 8 illustrates the configuration criteria of an agent 800 for unattended-kiosk detection, according to some examples. A camera 402 captures video frames in real time to monitor an area where one or more kiosks are located. A kiosk refers to a standalone structure or terminal equipped with interactive features for transactions or information access. The kiosks are accessed by a person who may be standing or sitting in a car.

After frame detection, a filter is applied at operation 802 to check if the captured frames identify the presence of people or cars. This filter is designed to isolate frames that contain either of these objects, allowing the system to focus on interactions that may indicate an unattended kiosk scenario when people or cars are present near the kiosk, e.g., a gas station.

Following the initial filtering, the system applies an overlap filter, at operation 804, to the frames that contain both people and cars. This filter checks for spatial overlap between the kiosk and a person or a car. The purpose of this operation is to determine if a person is interacting with or in close proximity to a kiosk, by themselves, or from a car, which may suggest that the kiosk is unattended.

Operation 806 is for performing an object count filter, which counts the frames that have one person or more and one car or more. This filter ensures that the conditions for an unattended kiosk event are met by confirming that there is at least one person and one car in the frame. The combination of these filters allows the system to accurately detect and flag unattended kiosk events for further review or action.

Figure 9:
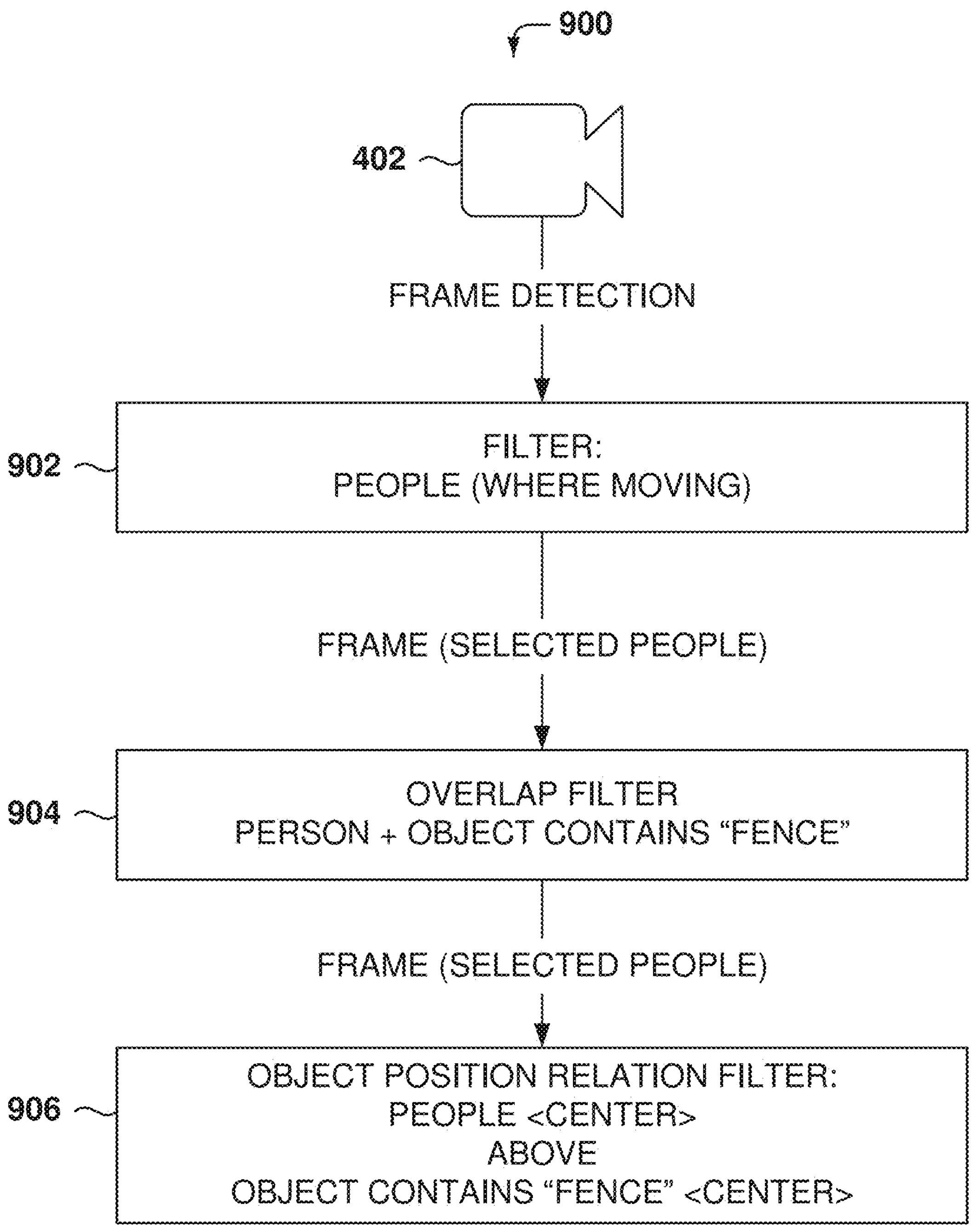
FIG. 9 illustrates the configuration criteria of an agent for fence-jumping detection, according to some examples.

FIG. 9 illustrates the configuration criteria of an agent 900 for fence-jumping detection, according to some examples. A camera 402 captures video frames in real-time of an area with a fence where fence-jumping might occur.

After frame detection, at operation 902, the agent identifies frames containing moving people. This is achieved through a filter that detects movement based on several frames.

Operation 904 is to apply an overlap filter that checks for spatial overlap between a person and an object identified as a fence (e.g., the fence has been defined as a zone within the monitored area). The overlap filter uses geometric analysis to determine if a person and a fence occupy the same or adjacent space within a frame.

At operation 906, an object position relation filter is applied to analyze the positional relationship between the person and the fence. Specifically, the filter checks if the center of the person is above the center of the fence. This positional analysis helps confirm that a fence-jumping event is occurring, allowing the system to trigger appropriate alerts or actions.

It is noted that "above" is one of the options provided in the UI for comparing the positions of two objects. Other options include below, to the right, to the left, to one side, etc.

Figure 10:
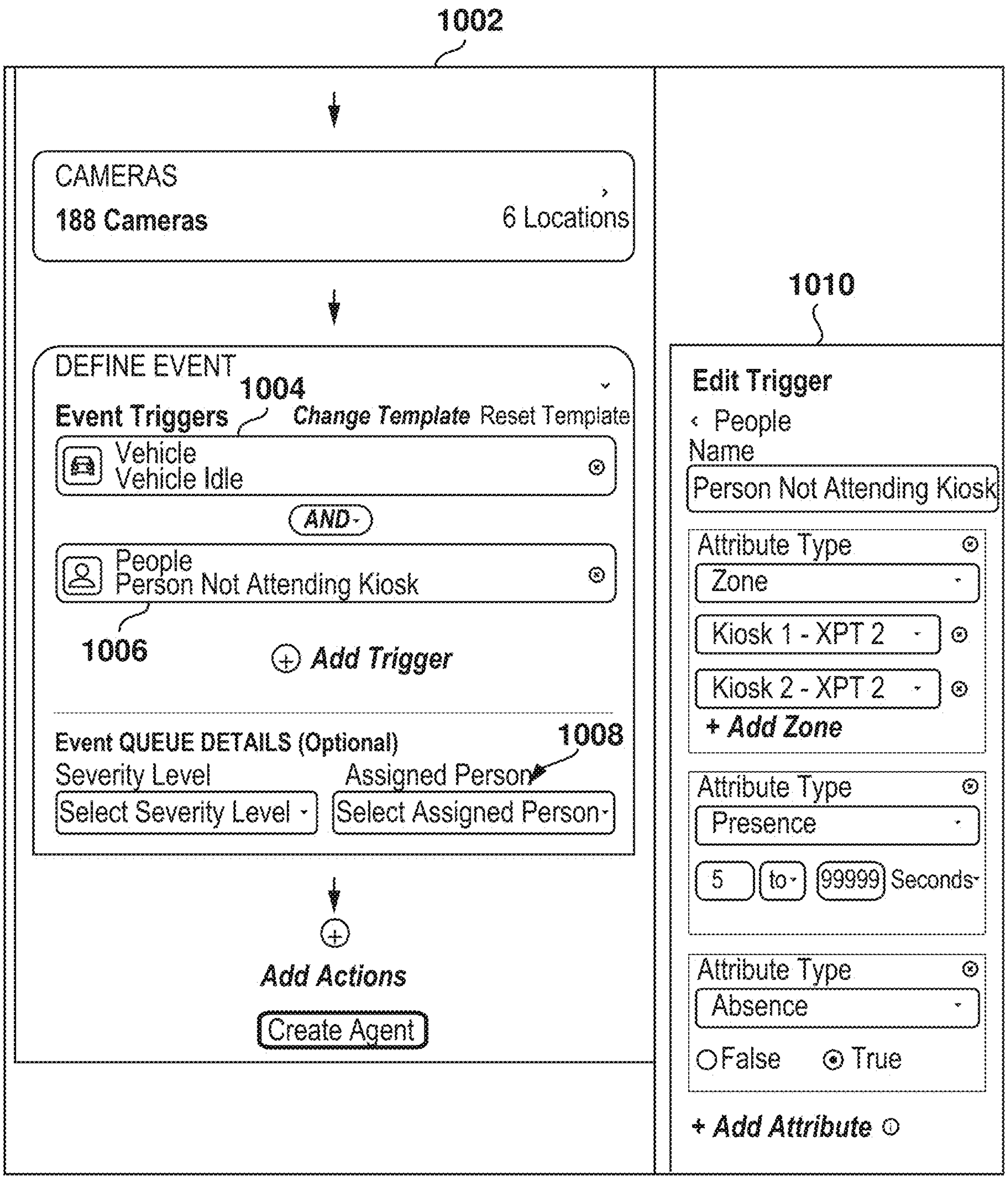
FIG. 10 shows the UI for creating triggers, according to some examples.

FIG. 10 shows the UI 1002 for creating triggers, according to some examples. The UI 1002 is designed to create triggers within a monitoring system.

The top section displays an overview of the system's resources, indicating the number of cameras (188 Cameras) and their distribution across locations (6 Locations).

The "Define Event" section allows users to specify event triggers 1004 in a field where users can select predefined conditions. The example shown includes a trigger for "Vehicle Idle."

The trigger may comprise one or more conditions. In the illustrated examples, there is a second condition 1006 (e.g., "Person Not Attending Kiosk"), in which the conditions are logically combined using the logical operator AND. The user has the option to change to the OR logical operator or some other logical function. Users can add more triggers by selecting the "Add Trigger" option.

The "Event Queue Details" section provides optional fields for further customization. Users can select a severity level 1008 and assign a person responsible for the event by using dropdown menus labeled "Select Severity Level" and "Select Assigned Person." In some examples, the severity levels include high, medium, and low, but other examples may use other severity categories.

If the user selects the option to assign a person, a drop-down menu presents people who may be assigned the notification of the event.

On the right side, the "Edit Trigger" panel 1010 allows for detailed configuration of the selected trigger. Users can name the trigger and define various attribute types, such as "Zone" and "Presence." The example shows settings for zones (e.g., "Kiosk 1-XPT 2") and presence duration (e.g., "5 to 9999 seconds"). Additional attributes like "Absence" can be set to true or false, and users can add more attributes if desired.

The interface is designed to facilitate the creation and management of complex triggers, providing users with a comprehensive set of tools for system monitoring and response.

Another event template is for detecting a near miss between a person and a forklift. In this case, the object relationship is defined as overlapping; that is, the location of the person and the location of the forklift overlap in the image, indicating that there has been contact or near contact.

In some examples, the relationship condition includes three options: "Is Overlapping" (location of the bounding boxes of the objects intersect), "Position Relationship" (relative position), and "Overlap Distance" (to configure distance between the objects). The Position Relationship defines a directional relationship of one object with reference to the other object. For example, for a car and a person, the Position Relationship may be defined as above, below, left, and right, but other examples may include additional options. For example, a person under a vehicle may be used to detect possible situations for the theft of catalytic converters.

The agent would detect the two objects, person and forklift, and the creation of the object-relationship condition of overlapping. Further, another condition is set for the second object, the forklift, to be moving. This way, if the forklift is not moving, the event will not trigger just because the person is walking by the forklift.

Some of the available triggers related to people include absence (no people detected), count (number of people in the frame), duration (amount of time a person is within the surveilled area), speed (at which the person is moving), angle direction (defining the orientation of the person), idle time (amount of time the person has not moved), is moving (the person is on the move), presence (the person is present in the frame), screen size (amount of space in the frame that the person is occupied), zoom (person is present in a predefined zone), semantic search (enables to search for metadata parameters associated with the person), after clothing color, lower clothing color, pose angle, etc.

For example, the pose angle may be used to determine that a person has fallen. The absence trigger is useful to determine when there is no person in the image, which assists in identifying conditions such as when a kiosk is unattended when a car arrives, and nobody attends the customer for a minimum configured amount of time.

Each trigger may include respective options. For example, the presence trigger may include fields to configure a range of time, the fields being "From" and "To," so the user can configure the presence of an object from 10 to 60 seconds. This may be used to indicate that a vehicle has been idle for at least ten seconds.

In the illustrated example, a first attribute type is for a zone, which is defined as the combination of two zones corresponding to two kiosks. Further, the presence condition may be configured to trigger the event after a certain amount of time happens before the vehicle is idling without a person responding.

The objects may be defined either by a user or by the entity conducting the analysis. Users are able to delineate certain zones or specific areas within a camera view that represent an area of interest. For example, the area for the kiosk could be delineated, identifying it as the kiosk or as the lane designated for vehicle operations or a similar context. The zones may be defined by the user or identified automatically by the system, such as detecting a zone in front of a gas pump.

The interaction of the objects is based on where the objects are in relation to each other. In some examples, the relationship is based on the relationship between the center of the detected boxes for each object.

Figure 11:
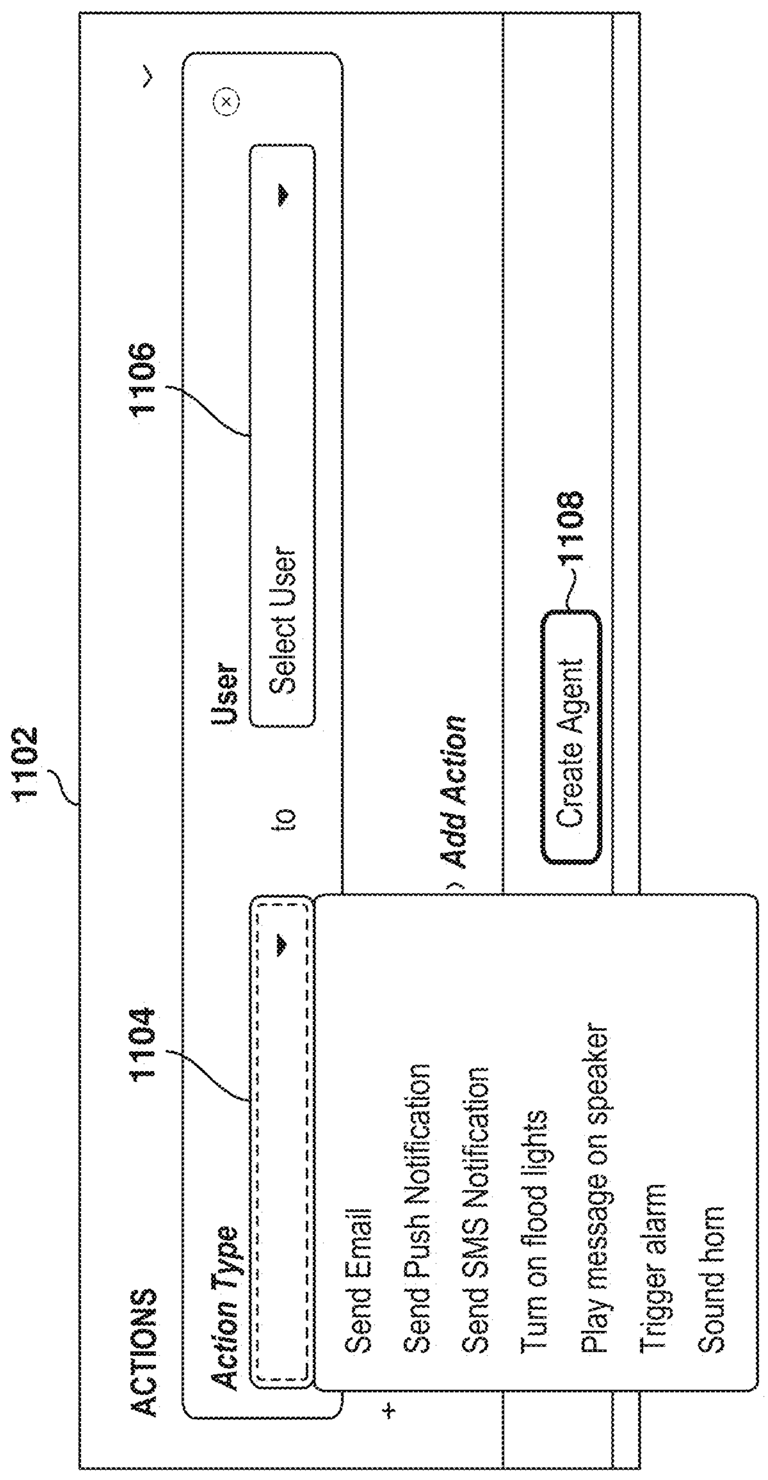
FIG. 11 shows the UI for selection actions to perform in response to detecting an event, according to some examples.

FIG. 11 shows the UI 1102 for selection actions to perform in response to detecting an event, according to some examples. The action type field 1104 is a dropdown menu that allows the user to select the type of action to be performed when an event is triggered. In some examples, the options available in this dropdown include "Send Email," "Send push notification," "Send SMS notification," "Send daily summary email," "Turn on flood lights," "Play message on speaker," "Trigger alarm," and "Sound horn," but other implementations may utilize different or additional actions, such as making a phone call, sending a voice text, etc.

These actions may discourage individuals from engaging in criminal activities, such as parking lots of dealers or rental companies. Another type of action would be to call a security company or the police when criminal activity is suspected.

Alternative actions may involve utilizing an Application Programming Interface (API) to initiate other types of actions. Integration is possible, for instance, with access control systems (e.g., badging systems). An API may be used to perform actions on real-life machines, such as locking or unlocking doors. It is possible to specify, for example, that when an unrecognized individual is detected, all doors should be locked, alarms should be activated, and lights should be turned on.

The user selection field 1106, next to the action type field 1104, is a dropdown menu that enables the user to select a specific user to whom the action will be directed. The field is labeled "User" and provides a list of users from which to choose.

Once the actions are configured, the button Create Agent 1108 may be selected to create the agent after the configuration of the event is complete.

FIG. 12 shows a UI 1202 for presenting event information, according to some examples. The event queue refers to a structured list or sequence of detected events awaiting processing or review. The UI 1202 organizes events based on predefined criteria, such as time or severity, enabling efficient management and response to each event within the video surveillance system.

The UI 1202 includes a title bar that displays the title "Event Queue" to indicate that the UI 1202 presents a list of detected events.

A navigation panel is located on the left side, featuring an "All Events" button for accessing the main event list. Search and filter options, positioned at the top of the main panel, include a "Search" button and a "Filters" button to define search parameters for selecting the events.

In some examples, if the user selects the filters option, several filters are presented. The list of filters includes date and time, event name, location, camera, and event severity. The event severity is a configurable parameter in the event definition. In some examples, the severity level may be low, medium, or high), but other examples may utilize different severity categories.

Further, an event-list table displays a list of events with details about the events. The table displaying events includes the following columns: date & time, which shows the timestamp of each event; event name, which lists the name of the event; location, which indicates the location associated with the event; camera, which specifies the camera involved in capturing the event; severity, which displays the severity level of the event; assigned-to, which shows the person or team assigned to handle the event; and event thumbnails, which shows small images next to each event entry providing a visual preview.

Control Buttons are provided at the top right of the UI 1202 to manage events for managing existing events, create new events to allow users to add new events, and a fetch-more button for loading additional events.

Live monitoring is important for many users, particularly in untended remote locations. Immediate awareness of a person's presence at the location is desired, rather than discovering this information the following day or if a manager neglected to check an alert in a text message. Many users have security personnel within an operation center to constantly check on the remote location and execute specific measures, such as contacting law enforcement or utilizing a microphone.

Many of these companies exhibit deficiencies in effective detection. The prevalent practice among these organizations involves utilizing motion detection, followed by employing personnel in an operations center to monitor the screens. Upon detection of a motion event, the alert enters a queue and is subsequently assigned to the next available individual. The techniques presented herein to analyze events automatically can reduce the number of alerts that need to be reviewed by 70% or more in some instances.

Also, some monitoring may be desired to improve business metrics. For example, a company might not want to have a customer who arrives at the car wash waiting for a long time before being helped because some users may decide to leave if the service is of low quality. By automatically triggering these events, the manager may take corrective action to avoid the problem.

Figure 13:
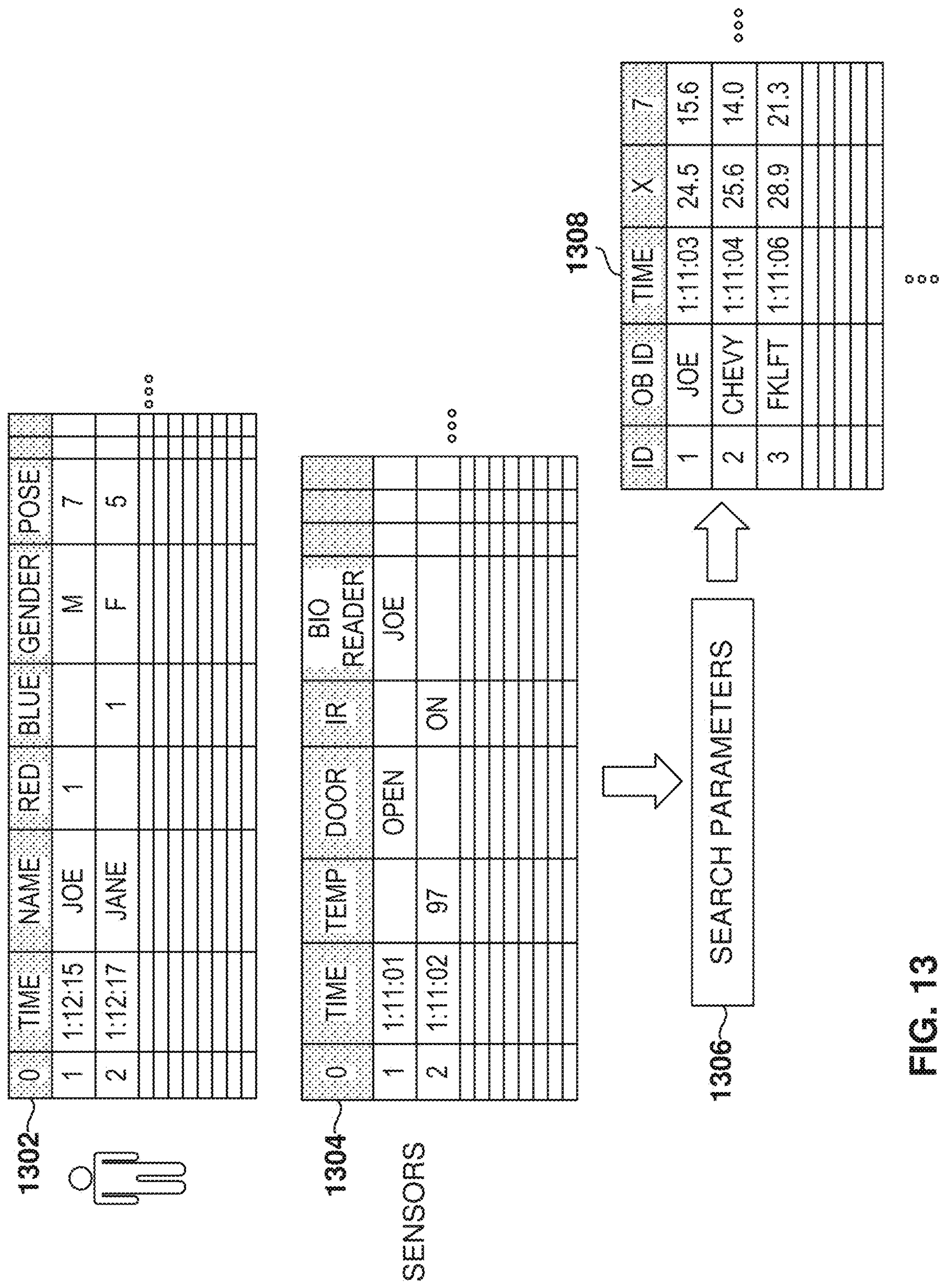
FIG. 13 illustrates data structures used for storing and searching events, according to some examples.

FIG. 13 illustrates data structures used for storing and searching events, according to some examples. The system may create one or more tables to store the metadata captured for the detected events, e.g., data captured by the IVRs. Two tables are illustrated in this example: a human data table 1302 and a sensor data table 1304.

The human data table 1302 stores information related to individuals, such as the time of the event, name, person wearing a red shirt (Boolean value for yes or no), blue shirt, gender, pose, etc. For instance, the first entry records data at time 1:12:15 for an individual named Joe wearing a red shirt, male, and in a pose labeled 7 (e.g., standing). The table may include additional columns, such as other colors of clothing, height, etc.

Other implementations may have other fields, like the color of clothing with values corresponding to different colors. However, creating a field for each color, as shown in the human data table 1302, may shorten the response time for certain queries (e.g., finding individuals wearing a blue top).

The sensor data table 1304 captures environmental and sensor-related data. The illustrated example includes fields for time, temperature, door status, infrared (IR) status, bio reader identification, etc. An example entry at time 1:11:01 indicates an open door and identifies Joe via the bio reader.

For a vehicle, the features may include vehicle color, make, model, license plate, location, and status, such as moving, idle, or present. In some examples, semantic embeddings, describing one or more features of an object, are created to facilitate searches. The semantic embeddings provide a general description of these objects so users can perform queries such as "show me people wearing masks at the checkout line."

An embedding is a dense numerical representation of a discrete object, such as a word, image, or user, in a high-dimensional space. Embeddings are often used to represent complex data types in a way that machine learning algorithms can easily process.

Embeddings are typically learned through training a model on a large dataset. The model is trained to predict some properties of the data, such as the next word in a sentence or the category of an image. As the model is trained, it learns to represent the data in a way that is useful for making predictions. Once the model is trained, the embeddings can be used to represent the data in other machine-learning tasks. For example, word embeddings can be used to train a model to classify text or generate text. Image embeddings can be used to train a model to classify images or detect objects in images.

Embeddings are useful because they allow machine learning algorithms to learn about the relationships between different objects. For example, word embeddings can learn that the words king and queen are related because they are both members of the same family. Image embeddings can learn that images of cats and dogs are related because they are both animals. Embeddings are also useful because they can be used to represent data in a way that is efficient for machine learning algorithms to process. For example, word embeddings can be used to represent words as vectors of real numbers. This allows machine learning algorithms to perform operations on words, such as addition and subtraction, which can be useful for tasks such as text classification and machine translation.

Search parameters 1306 are used to query the data tables. These parameters facilitate the retrieval of specific events based on predefined criteria.

The result data table 1308 includes the outcome of the searches. It includes fields for search ID, object ID (e.g., the ID of the user), time, and additional attributes such as coordinates within the image. For example, the first result entry shows data for Joe at time 1:11:03 with coordinates (24.5, 15.6).

For specific objects, post-processing is conducted to consolidate the raw data; for example, to consider the various speeds and shirt colors associated with each individual. In some cases, the final value is resolved through majority voting from information in multiple frames or from multiple cameras, determining, for example, whether the majority indicates yellow shirts, resulting in the identification of an individual as wearing a yellow shirt. Similarly, an individual may be identified as a specific person, such as Joe or Jane.

The data from each frame is ingested into one or more tables, so these tables are indexed and ready to be searched for all the surveillance cameras for a particular user.

In some examples, the data is stored in its original raw, original form, giving an unaltered state of the raw data. In some examples, a structure referred to as a columnar store is used. In conventional databases, data is typically stored sequentially, row by row, akin to the layout in an invented spreadsheet format. This method is generally more intuitive for individuals. However, computers handle data storage more efficiently when utilizing a column-by-column manner. This approach facilitates enhanced data compression and consequently allows for more rapid querying.

For example, if there is an entry identifier that grows in ascending order (e.g., 1, 2, 3, . . . ), it is only required to store the initial value as the other values may be calculated from the initial value. Consequently, even if the data set extends to a length measurable in gigabytes, it occupies merely a few kilobytes for storage.

In some examples, an SQL query is used to perform a search. The SQL query is then applied to the database, which includes the corresponding tables (e.g., tables 1302 and 1304), to obtain the results. For example, Joe was wearing a red shirt at certain times.

The queries may correspond to configured events, and these queries are executed periodically to search for events, such as unattended kiosks. The queries may correspond to the rules associated with the triggers defined in the events.

Further, simple queries may be performed for a combination trigger. If the combination trigger includes two rules (e.g., vehicle present and person absent), then a separate query may be executed for each rule and the results combined, such as by performing a logical AND operation to detect when both rules are true.

This approach is advantageous for commonly run queries. Most users tend to cause the execution of a few sets of queries continuously. By optimizing each query separately, it is possible to obtain results quickly and with a low use of computing resources. For example, a user may have 50 different carwash locations. By performing a single query for the 50 locations, the system performance improves as compared to having to perform 50 separate queries, one for each location.

An additional procedure involves situations where a ‘not’ trigger is present. The focus is on identifying instances where this trigger is absent (e.g., a person is absent). In one example, the query without the negative clause is used, and then the dataset that is the result is omitted from the set of possible results (e.g., entries from the camera within a certain timeframe).

It is noted that the property of “absence” is sometimes difficult to determine because the system may not know if the absence is because there is no data available or because the person was not really present. By using the regular query and then inverting the results, it is possible to actually determine when somebody was absent from the view of a surveillance camera.

The event generation occurs by executing the query at predefined intervals or segments (e.g., every 5 or 10 minutes). The system effectively ensures that each time a new segment appears, the query is executed.

Each triggering of these events is added to a queue for further processing and reporting. The queue may include events from multiple events and formation from multiple cameras. Another process accesses the event queue and determines the response (e.g., the configured action) to be executed in response to the event.

Figure 14:
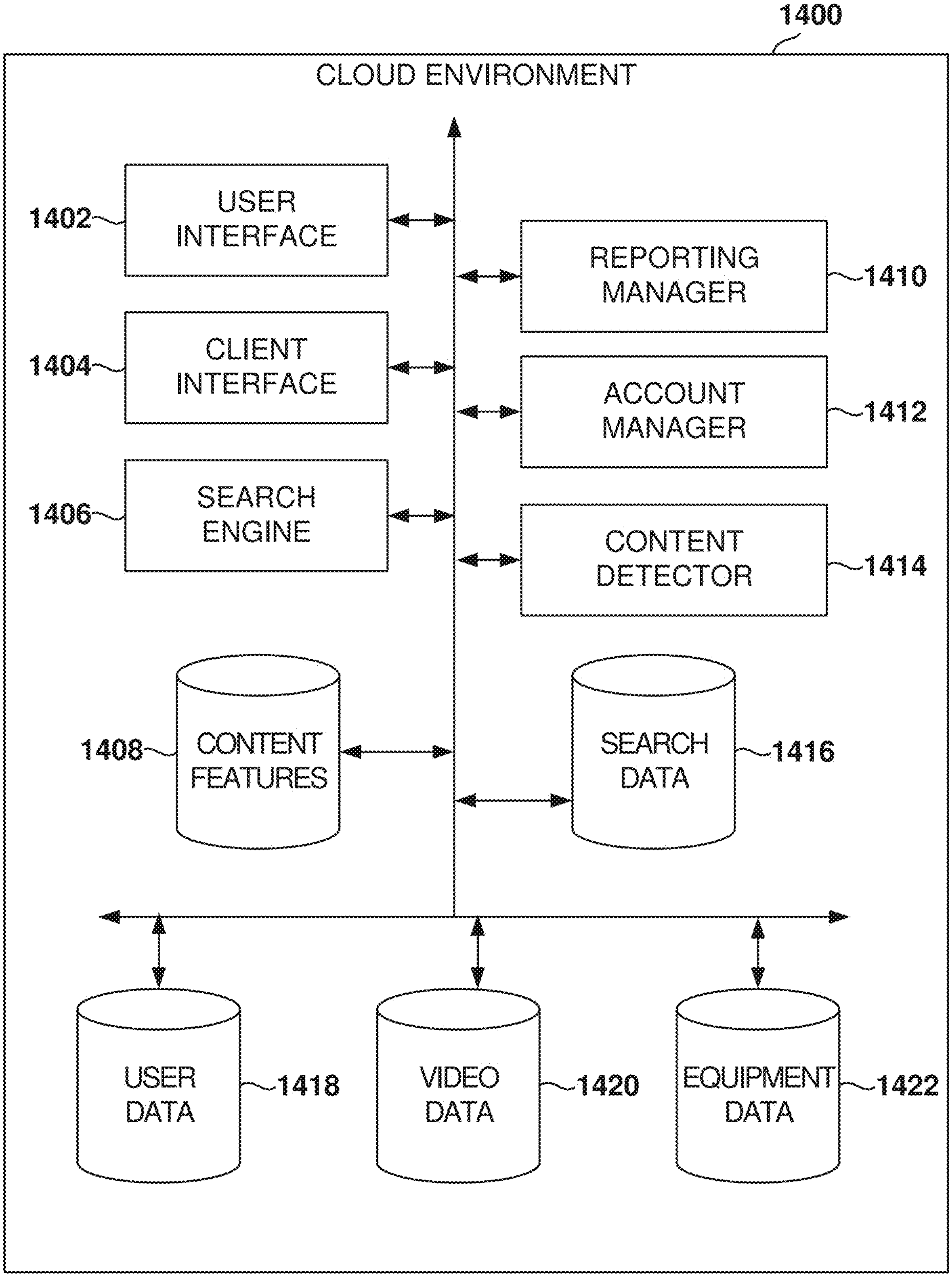
FIG. 14 illustrates a cloud environment for implementing some examples.

FIG. 14 illustrates a cloud environment 1400 for implementing some examples. The cloud environment 1400 may include one or more servers and one or more databases that may be distributed across one or more storage devices.

The cloud environment 1400 includes a user interface 1402, a client interface 1404, a search engine 1406, a reporting manager 1410, an account manager 1412, a content detector 1414, and several databases. The databases include content features 1408, search data 1416, user data 1418, video data 1420, and equipment data 1422.

The user interface 1402 facilitates interaction between users and the cloud system by providing user interfaces, such as the UIs described above with reference to FIGS. 1, 5-6, and 10-12. The client interface 1404 enables communication with external client systems, such as via APIs.

The search engine 1406 processes queries and retrieves relevant information. The reporting manager 1410 generates reports based on data analysis. The account manager 1412 handles user accounts and associated activities. The content detector 1414 identifies and categorizes content within the surveillance images.

The content features database 1408 stores information about detected content, including the metadata captured for the content. The search data 1416 database stores information related to user search activities. The user data 1418 database contains information about the users interacting with the cloud environment 1400.

Further, the video data 1420 databases store video content received from surveillance cameras. The equipment data 1422 database holds information about hardware and other equipment used in the system, such as cameras (e.g., make, model, installation date, location) and IVRs (e.g., make, model, installation date, location, encryption keys).

Figure 15:
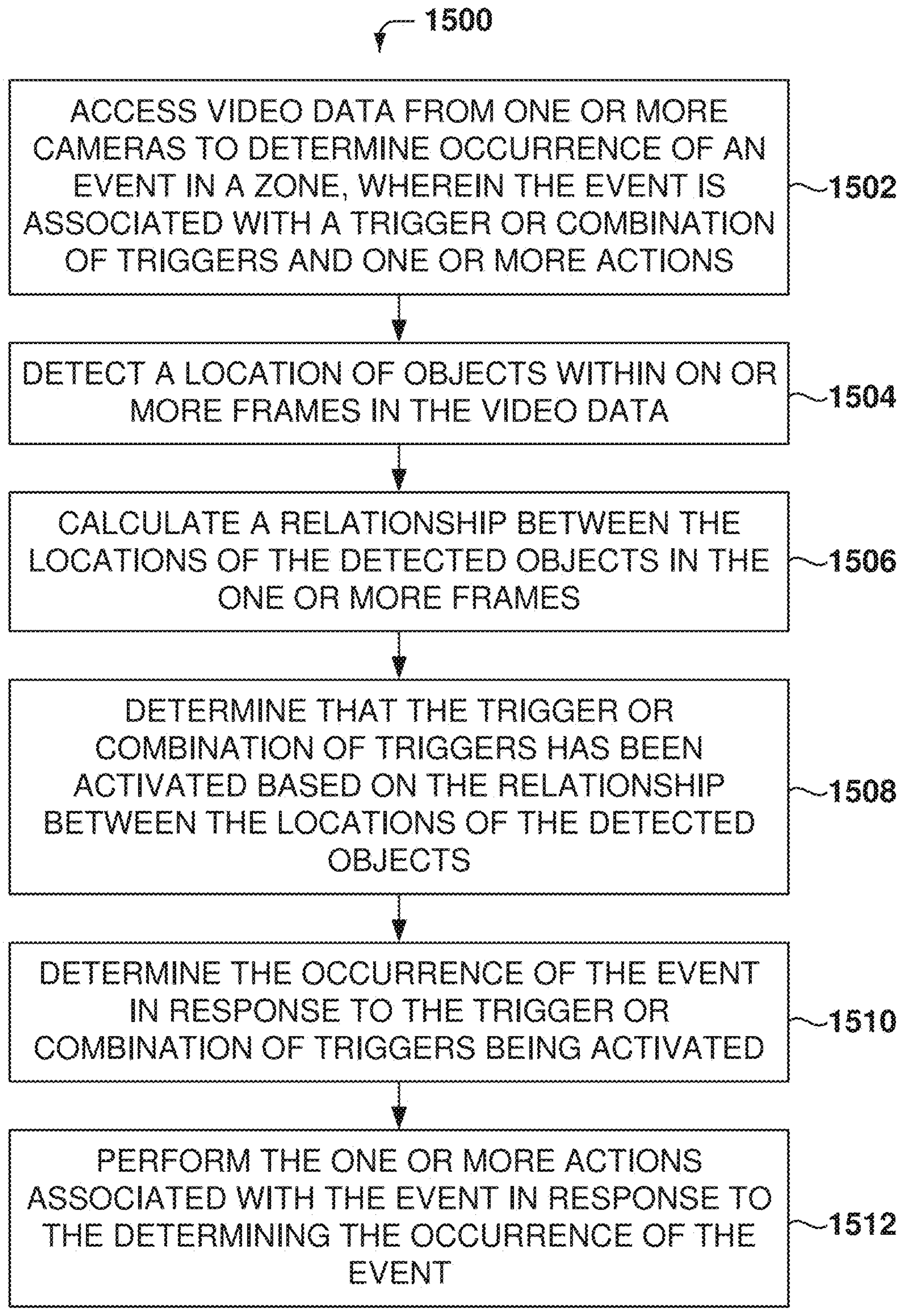
FIG. 15 shows a flowchart of a method for detecting events based on video surveillance data, according to some examples.

FIG. 15 shows a flowchart of a method 1500 for detecting events based on video surveillance data, according to some examples. While the various operations in this flowchart are presented and described sequentially, one of ordinary skill will appreciate that some or all of the operations may be executed in a different order, be combined or omitted, or be executed in parallel.

At operation 1502, the method 1500 accesses video data from one or more cameras to determine the occurrence of an event in a zone. The event is associated with a trigger or combination of triggers and one or more actions.

From operation 1502, the method 1500 flows to operation 1504 for detecting a location of objects within one or more frames in the video data. This involves analyzing the video data to identify and classify objects of interest. Advanced algorithms, such as machine learning models, may be employed to enhance the accuracy of object detection.

From operation 1504, the method 1500 flows to operation 1506 for calculating a relationship between the locations of the detected objects in the one or more frames. This operation involves analyzing the spatial relationships and interactions between objects. The calculation may include, for example, determining distances, overlaps, or directional relationships between the objects.

From operation 1506, the method 1500 flows to operation 1508 for determining that the trigger or combination of triggers has been activated based on the relationship between the locations of the detected objects. This involves evaluating whether the calculated relationships meet predefined conditions that define the trigger or a combination of triggers.

From operation 1508, the method 1500 flows to operation 1510 for determining the occurrence of the event in response to the trigger or combination of triggers being activated. This operation confirms that the conditions for the event have been satisfied, indicating that the event has occurred.

From operation 1510, the method 1500 flows to operation 1512 for performing the one or more actions associated with the event in response to determining the occurrence of the event. This could involve alerting security personnel, activating alarms, or recording additional data.

In view of the disclosure above, various examples are set forth below. It should be noted that one or more features of an example, taken in isolation or combination, should be considered within the disclosure of this application.

FIG. 16 shows a table 1602 for tracing actions, according to some examples. Customers wish to know why a certain action was taken after detecting an event, which includes reviewing the video associated with the event and finding out what triggers were detected.

The surveillance system provides a feature to give a detailed explanation of the detection of the event in the actions that were taken. The added feature for explainability enhances transparency by displaying the reasons for event triggers and offering visual indicators such as timestamps and debug views of trigger actions, each associated with a unique confirmation identifier. This diagnostic functionality provides a detailed overview of the system's actions, assisting users in identifying discrepancies, such as non-triggered events, and understanding issues related to peripheral APIs or trigger misconfigurations.

Further, the system measures end-to-end latency for event and action execution, supplying quantitative data on system performance. Latency metrics are captured at various stages, including AI inference time, data transmission delays, and action execution times. Bottlenecks within the processing pipeline are identified, enabling engineers to direct optimization efforts toward the most impactful areas, such as algorithm efficiency or network infrastructure improvements.

An example scenario involves detecting an individual in a specified area or another object, and the floodlight was activated at a particular time (e.g., 9:16:37 AM PST). A trace documenting ongoing activities is provided, enabling the keeping of comprehensive records. The process is traced from the moment the occurrence of the event is observed automatically, continuing until the action has been executed, with every single timestamp being recorded in between.

The system enables the customer to acquire knowledge about the occurrence of the event, such as confirming that the floodlight was activated at a specific time or that an email was dispatched at a specific time, etc. This is particularly valuable for people in supervision roles, such as an IT director in a school, who may lack awareness regarding whether an email was sent or a lockdown trigger was activated. In such instances, the recipient lacks certainty concerning the execution of the action. With the system's capabilities, confirmation of the occurrence is provided to the user with an explanation of what happened and the sequence of what happened.

The table 1602 shows a list of actions that the agent took with reference to events. Each line shows what the system was doing over time, particularly with reference to the beginning of the event detection. By providing the list of actions, the user can observe the sequence that caused the detection of one or more events.

The table 1602 is designed to facilitate the tracking and analysis of event-related activities, offering insights into the sequence and timing of actions performed by the system. The details on the event detection add transparency by showing why events were triggered and providing visual cues such as timestamps and debug views of trigger actions, each with a unique confirmation ID.

This diagnostic capability gives a clear view of the system's actions, helping users identify discrepancies (like non-firing events) and understand peripheral API issues or trigger misconfigurations.

Further, the table 1602 provides information on end-to-end latency for event and action execution, providing quantitative data on system performance. Also, the table 1602 captures latency metrics at various stages, including AI inference time, data transmission delays, and action execution times.

In some examples, the table 1602 includes several columns, each representing specific attributes of the logged actions. The "Checkpoint" column lists the stages of the event processing workflow, such as "EVENT_CAPTURE" and "AGENT_LISTENER." These checkpoints indicate the progression of the event through various processing stages.

The "Trace Event" column specifies the type of event or action associated with each checkpoint, such as "EVENT_OUTPUT" and "MESSAGE_INPUT." This column helps identify the nature of each action within the event processing sequence.

The "Elapsed" column records the time taken for each action to complete, providing a measure of the system's efficiency in processing events. This information is useful for performance analysis and optimization.

The "Timestamp" column provides the exact date and time when each action occurred, allowing users to correlate actions with specific events and timeframes. This temporal information is helpful for auditing and troubleshooting purposes.

The "Capture Trace ID" column contains identifiers for actions, enabling precise tracking and referencing of actions within the system. These IDs are used to maintain the integrity and traceability of the event capture process.

The "Detection" column indicates the time when the event was detected, providing a reference point for the subsequent actions taken by the system. This helps in understanding the latency between detection and response.

The "User ID" and "Appliance ID" columns provide additional context by identifying the user and the specific appliance involved in the event.

The table 1602 is part of a broader event capture log, which is intended to provide a comprehensive view of the actions associated with a particular event. This log is for users who want to review the sequence of actions and understand the system's response to detected events.

Figure 17:
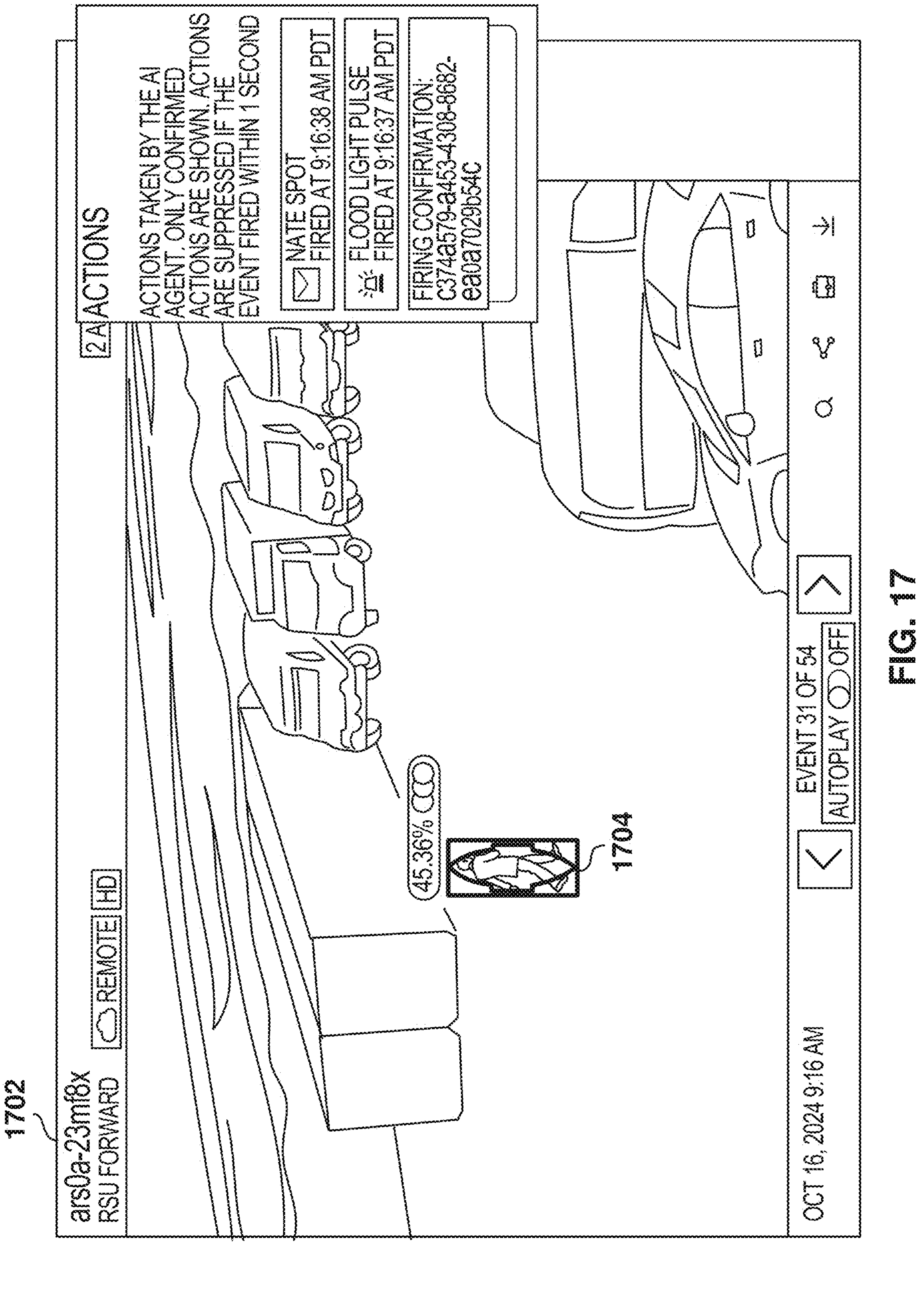
FIG. 17 shows a UI for showing actions taken by the AI agent, according to some examples.

FIG. 17 shows a UI 1702 for showing actions taken by the AI agent, according to some examples. The UI 1702 shows a live video feed from a security camera labeled RSU Forward, providing a view of a parking area with several vehicles and a person 1704 present in the parking area. In the illustrated example, the video feed is timestamped on Oct. 16, 2024, at 9:16 AM, indicating the moment of capture.

The UI 1702 includes an actions panel on the right side, detailing actions executed by the AI agent. The actions panel lists two specific actions: Nate Spot and Flood Light Pulse. Each action entry includes a timestamp indicating the exact time the action was fired, such as 9:16:38 AM PDT for "Nate Spot" (the person detected in the parking lot has been identified as Nate) and 9:16:37 AM PDT for "Flood Light Pulse." The panel also provides a firing confirmation ID, offering an identifier for the sequence of actions performed.

The video feed section of the UI 1702 includes navigation controls, such as arrows for moving between events and an autoplay toggle. The event indicator shows Event 31 of 54, allowing users to track the sequence of events captured by the system. Additional controls at the bottom of the interface enable users to manage playback and view options, including zoom and full-screen capabilities.

The interface is designed to provide a comprehensive overview of the actions taken by the AI agent, offering users the ability to review and analyze the events captured by the surveillance system. The combination of live video feed and detailed action logs facilitates efficient monitoring and response to detected events.

Figure 18:
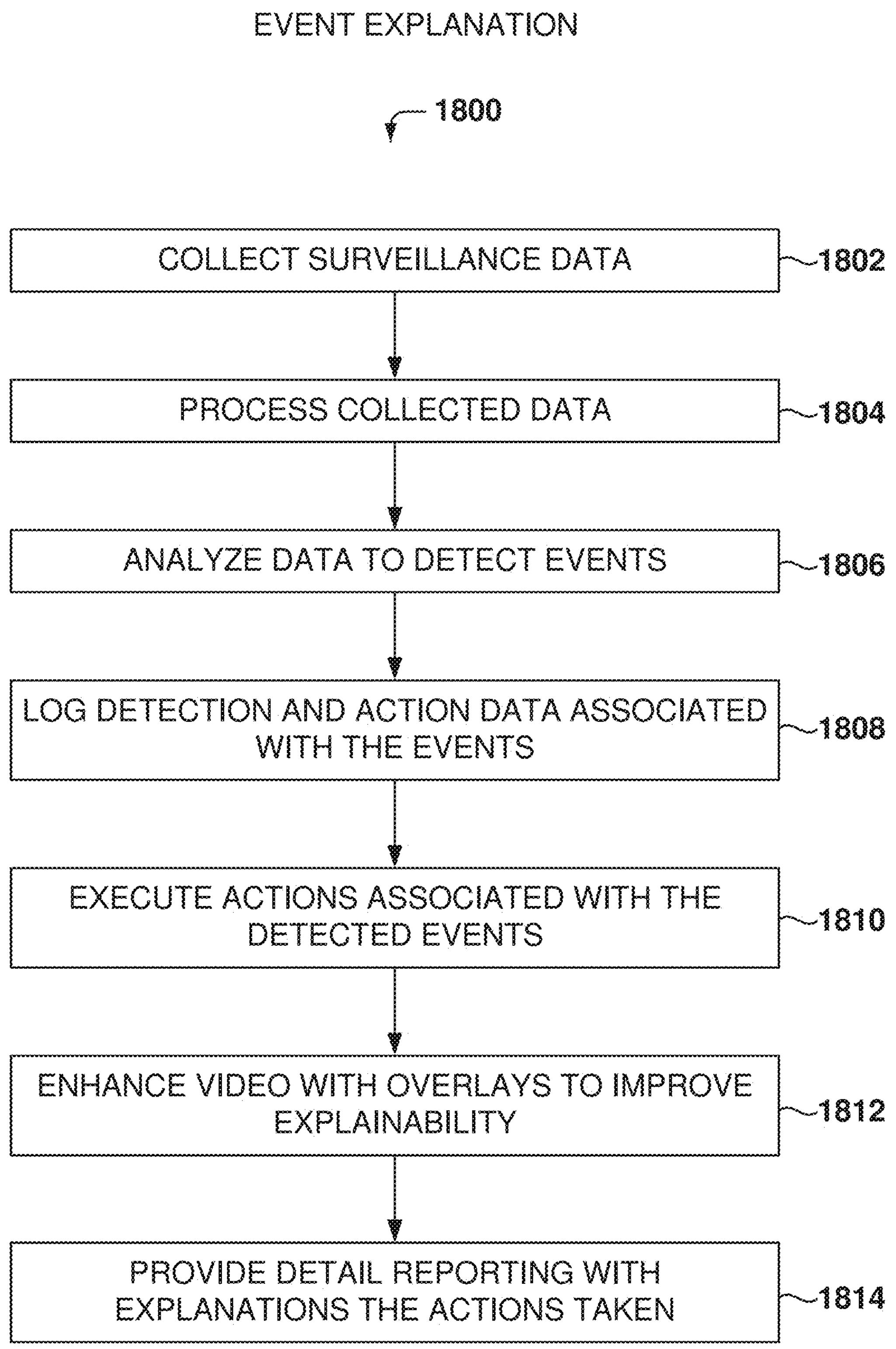
FIG. 18 shows a flowchart of a method for providing detailed reporting with explanations of actions taken, according to some examples.

FIG. 18 shows a flowchart of a method 1800 for providing detailed reporting with explanations of actions taken, according to some examples. While the various operations in this flowchart are presented and described sequentially, one of ordinary skill will appreciate that some or all of the operations may be executed in a different order, be combined or omitted, or be executed in parallel.

At operation 1802, the method 1800 includes collecting surveillance data. This operation includes gathering video feeds and other relevant data from various surveillance cameras and sensors installed in the monitored area. The collected data may include video frames, audio signals, and metadata from sensors.

From operation 1802, the method 1800 flows to operation 1804 for processing the collected data. This operation includes preprocessing the data to filter out noise, normalize the data, and prepare the data for further analysis. The preprocessing may include the use of AI models to detect objects within the frames.

From operation 1804, the method 1800 flows to operation 1806 for analyzing the data to detect events. This operation involves using machine learning models and algorithms to identify specific events within the processed data. The analysis may include object detection, motion detection, and pattern recognition to determine the occurrence of predefined events.

From operation 1806, the method 1800 flows to operation 1808 for logging detection and action data associated with the events. This operation involves recording the details of the detected events, including triggers for the event, and the actions taken in response to those events. The logged data may include timestamps, event types, detected objects, triggers activated, and the actions executed by the system.

From operation 1808, the method 1800 flows to operation 1810 for executing actions associated with the detected events. This operation involves performing predefined actions in response to the detected events. The actions may include sending notifications, triggering alarms, activating deterrence devices, or executing other automated responses.

From operation 1810, the method 1800 flows to operation 1812, which is an optional operation in some examples, to enhance video with overlays to improve explainability. This operation involves adding visual overlays to the video feed to provide context and explanations for the detected events. The overlays may include bounding boxes around detected objects, zones indicating areas of interest, and annotations explaining the triggers and actions.

From operation 1812, the method 1800 flows to operation 1814 for providing detailed reporting with explanations of the actions taken. This operation involves generating comprehensive reports that include detailed explanations of the detected triggers and the corresponding actions. The reports may include visual representations, timestamps, and descriptions of the system's decision-making process.

Figure 19:
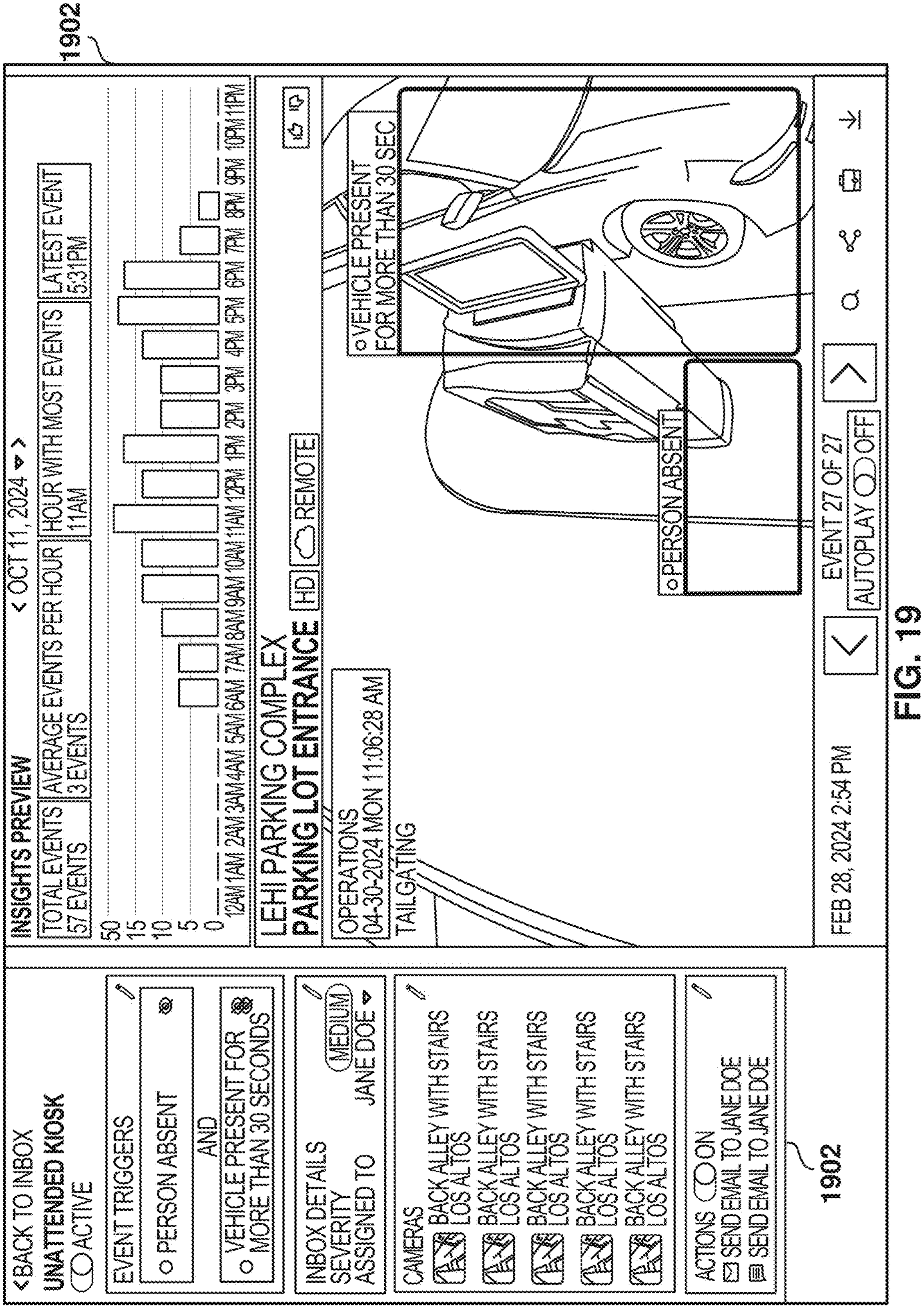
FIG. 19 shows a UI for showing zone and bounding-box overlays, according to some examples.

FIG. 19 shows a UI 1902 for showing zone and bounding-box overlays, according to some examples. The agents have the capability to articulate ongoing processes through the addition of zones or specific items present on the actual triggers themselves. For instance, when detecting the presence of a car next to the kiosk, the system highlights the kiosk and provides a status message, such as, "This is the kiosk under observation."

The system increases explainability by supplying visual overlays directly on the video image, demonstrating how and why specific events are triggered.

In some examples, the overlays on the image comprise zones and bounding boxes. The zones comprise predetermined- or dynamically-generated regions within the frame that hold relevance for event detection, such as restricted areas, points of entry or exit, and hazardous zones.

The bounding boxes are rectangular demarcations surrounding detected objects, e.g., individuals, vehicles, etc., that bear relevance to the triggers. Real-time annotations are visible on video frames upon the activation of the trigger, including scenarios where an object enters a prohibited or restricted zone, or when two objects interact with each other.

Trigger-specific overlays delineate the precise trigger conditions that have been satisfied. For example, a bounding box may alter its color to indicate a rule violation, such as turning red when an individual enters a restricted area without authorization, when the individual is present in the zone, or when the individual is absent from the zone.

The visual cues assist users in comprehending the spatial relationships and interactions that result in events. Insights into the internal decision-making process are provided, aiding in the identification of discrepancies, such as missed detections or false positives. The system provides a feedback mechanism that points out potential issues with peripheral APIs for active deterrence or misconfigurations in trigger settings. This feedback is used for iterative improvements and refinement of the system's performance, facilitating data-driven optimization strategies.

Additionally, the system may filter objects in some scenarios to differentiate the relevant objects that affect the triggers. For example, a frame may include multiple individuals, but only one individual is relevant to a specific event. The system identifies the individual and provides a bounding box that is different from the bounding boxes of other individuals; or only the relevant individual is presented with the bounding box while the remaining individuals in the frame are not framed with the bounding box.

In another scenario, two individuals are engaged in a fight, and others form a crowd, and the system marks the fighters differently from the members of the crowd.

Additionally, the metadata associated with the triggers may be also presented. This metadata may include an identification number for each individual that has a detected presence, such as a pedestrian or vehicle. The specific identification numbers that activate a given trigger are determined, and as a result, the corresponding bounding boxes are displayed and labeled accordingly.

In the context of detecting individuals engaged in a fight, a configured trigger is set up to identify the two individuals involved in combat. In some examples, this identification occurs through either a semantic trigger or an object relationship trigger. Alternatively, their physical postures may be analyzed to recognize a fighting stance, resulting in the activation of a trigger designed to detect such activity.

Upon detection, the system acknowledges the identified behavior and labels it as having activated the fighting trigger. In conjunction with this process, the detection of a crowd in a different area prompts the conclusion that these individuals have activated the crowd trigger. Consequently, these observations, when combined, lead to the classification of the situation as a fighting event, e.g., the presence of the crowd around two people (e.g., two students) engaged in a fight is identified, and the events are labeled accordingly.

In the illustrated example, the UI 1902 includes several components designed to provide detailed information about the event detection and monitoring process. The left panel of the UI 1902 contains the "Event Triggers" section, which lists the conditions for triggering an event. In this example, the triggers are "Person absent" and "Vehicle present for more than 30 seconds." These triggers are combined using the logical operator AND, indicating that both conditions must be met for the event to be activated.

Below the "Event Triggers" section, the "Inbox Details" section displays the severity level of the event, which is set to "Medium" in this example, and the person assigned to handle the event, identified as Jane Doe. This section allows users to manage and prioritize events based on their severity and assigned personnel.

The "Cameras" section lists the available cameras monitoring the area. In this example, several cameras are listed, including "Back alley with stairs" in Los Altos. Users can select specific cameras to view the live feed or recorded footage. An option to see more cameras is provided to access additional camera feeds.

The "Actions" section shows the configured actions to be performed when the event is detected. In this example, the actions include "Send Email to John Smith" and "Send text to John Smith."

The main display area of the UI 1902 shows a live video feed from the selected camera, identified as "Left Parking Complex—Parking Lot Entrance." The video feed is time-stamped (e.g., Feb. 28, 2024, 2:54 PM), and the video feed includes visual overlays, such as bounding boxes and labels, to highlight detected objects and events. In this example, a green bounding box labeled "Person absent" indicates the absence of a person, while a pink bounding box labeled "Vehicle present for more than 30 sec" highlights a vehicle that has been present for the specified duration.

Above the video feed, the "Insights preview" section provides a summary of event statistics for a selected date. This section includes a bar chart showing the number of events detected per hour, with a total of 57 events, an average of 3 events per hour, and the peak event time at 11 AM. The event is recorded at 5:31 PM. Navigation controls allow users to select different dates for viewing event statistics.

Beneath the video feed, controls allow the user to navigate through the events, with options to move between events using navigation arrows. Additional controls at the bottom of the interface enable users to manage playback and view options, including zoom and full-screen capabilities.

Figure 20A:
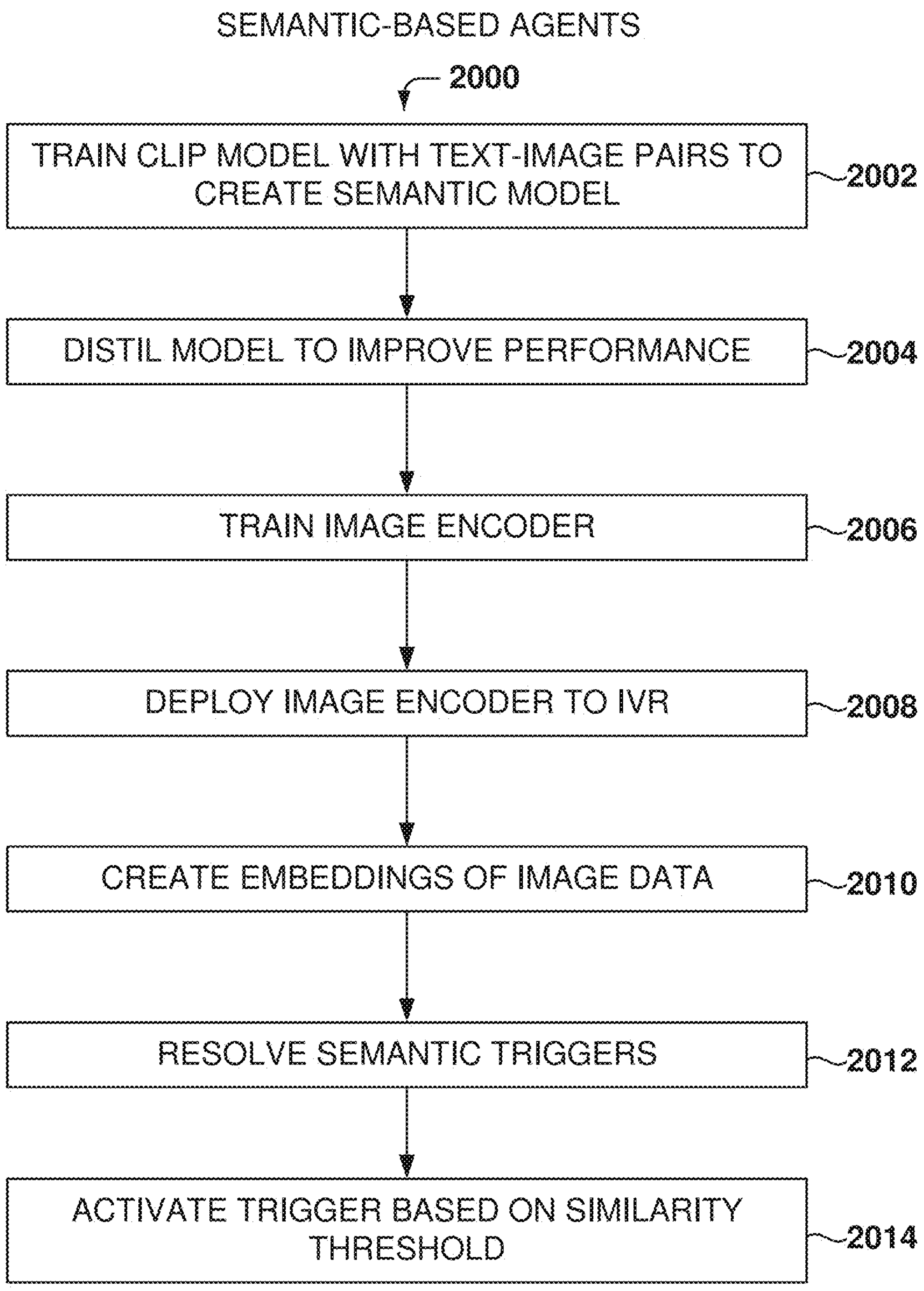
FIG. 20A shows a flowchart of a method for activating a trigger based on a similarity threshold, according to some examples.

FIG. 20A shows a flowchart of a method 2000 for activating a trigger based on a similarity threshold, according to some examples. While the various operations in this flowchart are presented and described sequentially, one of ordinary skill will appreciate that some or all of the operations may be executed in a different order, be combined or omitted, or be executed in parallel.

Semantic-based AI agents use models, using vector embeddings, to conceptualize the relationship between an image and a text associated with the image. In some examples, the solution includes creating embeddings of the images, as well as their content, such as people or other objects. Subsequently, these embeddings are used to assess the relevance of a specific trigger to a particular event or agent.

An illustration of this can be found in the possible-fall event, which detects the event using semantic-based AI agents. Observations indicate that these semantic-based AI agents when presented with multiple prompts, such as those describing a person lying down, a person falling, or a person assuming an unusual body position, exhibit a strong correlation in terms of semantic similarity with the model.

At operation 2002, the method 2000 involves training a Contrastive Language-Image Pretraining (CLIP) model with text-image pairs to create a semantic model. This operation includes leveraging a dataset comprising images and their corresponding textual descriptions.

CLIP is a model that connects images and text by learning shared features. CLIP is trained to understand images and text in a way that allows it to associate a text description with a relevant image and vice versa. The CLIP model learns a shared embedding space where images and texts with similar meanings are closely aligned. This alignment allows for effective comparison and reasoning across different data modalities.

CLIP uses a technique called contrastive learning, where the model learns to distinguish between paired (correct) and unpaired (incorrect) images and text. Further, CLIP uses multi-modal learning. Unlike traditional models, which usually focus on a single type of data (either image or text), CLIP is a multi-modal model that combines both, learning a shared representation of images and text.

The system utilizes these models to improve semantic comprehension of visual data. Rich semantic embeddings are generated for visual inputs, including video frames or object crops, as well as textual data, such as metadata or sensor readings. Embeddings of audio are created using direct embedding and transcription to concentrate the process on the semantic meaning. This alignment permits effective comparison and reasoning across various data modalities.

One feature of CLIP is Zero-Shot Learning, where the CLIP model is able to classify images into categories without seeing any examples during training. Thus, it is possible to prompt the CLIP model to identify an image based on new categories or phrases that were not used for training. Further, CLIP uses contrastive learning, where learning is performed by maximizing the similarity between matching image-text pairs while minimizing the similarity between non-matching pairs. The result is an effective linkage of the semantics of the images to the text.

A CLIP model has an image encoder and a text encoder. Both encode the conceptual understanding of inputs into a shared high-dimensional semantic space. The CLIP model takes an image, a cropped image, or a plurality of images as input. The plurality of images may be combined using data averaging, max pooling, or some other statistical process.

The CLIP model outputs a semantic embedding, which is a vector that is used to encode the information. Subsequently, a textual description is utilized to assess the alignment between the embedding of the image and the embedding of the text. In some examples, the distance between the embedding vectors is calculated, and if the distance is below a predefined threshold, then it is concluded that the text is a proper description of the image.

Thus, the system creates multiple embeddings of text describing an image for multiple scenarios. When the image embedding is similar to one of the text embeddings, then it is assumed that there is a match. When a match is found, the match may be used to activate a trigger; that is, the trigger is activated based on a semantic description of the image.

From operation 2002, the method 2000 flows to operation 2004 for distilling the model to improve performance. This operation is optional and involves reducing the size of the trained CLIP model to enhance the performance, particularly for deployment on edge hardware such as the Intelligent Video Recorder (IVR). The distillation process retains the features of the model while optimizing the model for faster inference and lower resource consumption.

From operation 2004, the method 2000 flows to operation 2006 for training the image encoder that is part of the CLIP model. This operation involves compiling the image encoder component of the CLIP model for IVRs. The image encoder is responsible for encoding visual inputs, such as video frames or object crops, into a shared high-dimensional semantic space.

From operation 2006, the method 2000 flows to operation 2008 for deploying the image encoder to the IVR. This operation includes installing the compiled image encoder on the IVR hardware, enabling the IVR hardware to perform inference on full frames, image patches, and crops. The deployment ensures that the IVR can process visual data in real time and generate semantic embeddings.

From operation 2008, the method 2000 flows to operation 2010 for creating embeddings of image data. This operation involves generating rich semantic embeddings for the visual inputs processed by the image encoder. In some examples, the embeddings cover images and other metadata, such as bounding boxes detected in the frame. The embeddings—using crops of people, vehicles, and object bounding boxes—are used to focus the semantic representation of the embeddings to be more accurate. For example, this results in more fidelity for embeddings around cars or people (e.g., a person wearing a helmet).

From operation 2010, the method 2000 flows to operation 2012 for resolving semantic triggers. This operation involves using embeddings of the images and the text to calculate vector similarity (e.g., cosine distance).

It is noted that several AI models may be used at different phases. For example, the detection models may be used to identify objects in the frame, and the semantic models may be used to determine certain situations based on a description of the situation in the frame.

For example, the system can discern nuanced situations, such as recognizing that an individual wearing safety gear in a hazardous zone is appropriate, whereas someone without the safety gear may not be in the hazardous zone.

In some examples, the embeddings are injected into and associated with bounding boxes and full frames. Subsequently, these embeddings are integrated into the detection metadata and indexed by the cloud. This process employs a combination of direct indexing and approximate nearest neighbor methods used by vector databases, such as those utilized by the Hierarchical Navigable Small World (HNSW) database. HNSW is an efficient data structure and algorithm primarily used for approximate nearest neighbor search (ANNS) in high-dimensional spaces, commonly used in databases and search systems where quick retrieval of approximate nearest neighbors is desired.

To resolve semantic triggers, both image and text encoders are utilized, permitting the incorporation of both image and text prompts. Following the encoding of the target prompt within the trigger, the embedding is employed to determine vector similarity at each timestamp when an embedding is calculated.

From operation 2012, the method 2000 flows to operation 2014 for activating the trigger based on the similarity threshold. This operation involves applying a similarity threshold to the calculated vector similarities between the image embedding and one of the text embeddings to determine the activation of the trigger. The trigger can be composed of any other trigger, allowing for flexible and adaptive event detection based on semantic analysis.

Further, the timestamps where a certain similarity threshold is applied comprise the basis for the trigger activation. The trigger can be composed with any other trigger as previously described.

The use of semantic-based agents provides several benefits, including flexibility and adaptability (agents are capable of managing a broad array of scenarios without requiring extensive retraining, thereby rendering the system scalable across diverse domains and use cases), robustness to variations (semantic embeddings exhibit reduced sensitivity to changes in visual appearance resulting from lighting, angle, or occlusion, facilitating more consistent detections) and enhanced contextual understanding (the integration of visual and textual data within a unified semantic space enables agents to attain a more comprehensive understanding of events, which contributes to achieving accurate and meaningful detections).

The use of semantic-based agents provides the ability to detect new types of events quickly. For example, detecting a trash can being open. There may not be a model to detect this situation, but the semantic agent may be used to identify this situation by comparing the embedding to an embedding of text, such as "trash can is open," or by supplying image examples.

Figure 20B:
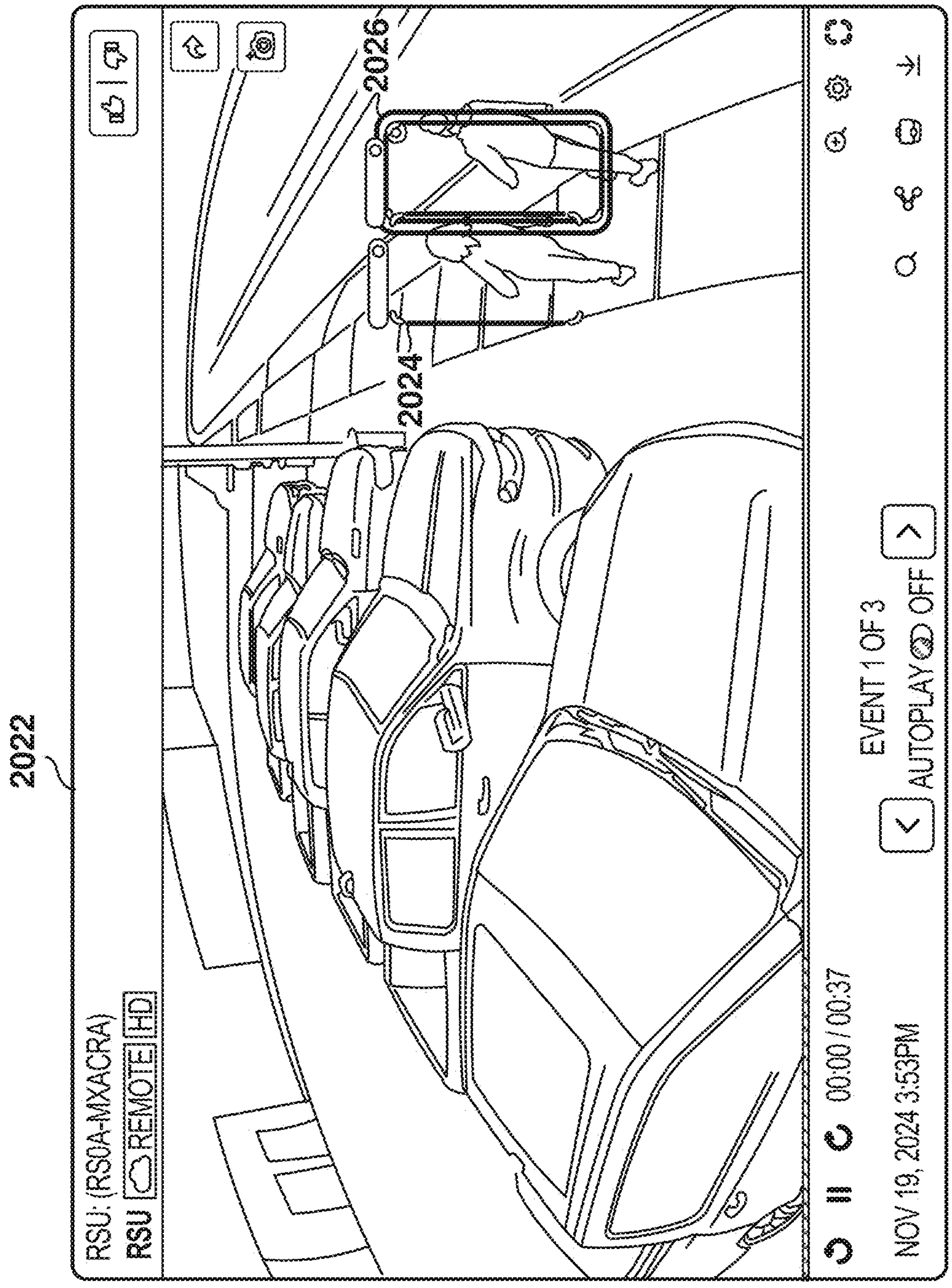
FIG. 20B shows a surveillance image with people wearing hoodies, according to some examples.

FIG. 20B shows a surveillance image 2022 with people wearing hoodies, according to some examples. The surveillance image 2022 displays a parking lot with several vehicles, and two individuals are detected walking on the sidewalk. The individuals are highlighted with bounding boxes 2024 and 2026, indicating detection by the surveillance system. A timestamp on the image (Nov. 19, 2024, 3:53 PM) indicates the time of the event, and the UI interface includes controls for video playback and navigation, showing event 1 of 3.

Many users want to detect specific events that may not be available as an option by the surveillance system. The challenge for these users is to build custom agents, particularly when the users do not have data scientists available with the skills to create the particular event detectors.

In some examples, this problem occurs within systems that utilize machine learning models for real-time detection and classification tasks. These systems often operate in environments where rapid and accurate identification of objects is crucial, such as security monitoring or automated vehicle recognition. The problem is exacerbated by the need for a process that can accommodate diverse user requirements without necessitating extensive data collection or model training expertise.

The impact of this problem is significant, as it affects the ability of users to deploy effective machine-learning models in practical applications. Without addressing this issue, users may experience reduced accuracy in detection tasks, leading to potential errors and inefficiencies in their operations. The consequences of not resolving this problem include increased resource consumption, prolonged development times, and the inability to leverage advanced machine learning techniques effectively.

For example, a user may want to detect if a person wearing a hoodie is in a particular location, the brand of a car entering a parking lot, if the truck entering an area is a delivery truck, if there is smoke, if it is daytime or nighttime, etc.

The system provides a method to develop agents tailored to the distinct use cases of each user without necessitating an extensive team or a complex process for model development. The custom agents created are seamlessly integrated within the event detection system, and all the features available to track events are at the disposal of the user.

The presented solution addresses the complexity and inefficiency of training semantic agents by introducing a streamlined process that integrates both image and text data. This solution is designed to be accessible to non-technical users, allowing them to train semantic agents effectively without requiring extensive technical expertise.

The solution addresses technical challenges by simplifying the training process and making it accessible to non-experts. It targets the inefficiencies of traditional methods that rely solely on image data and require complex neural network architectures. The expected outcomes of applying this solution include improved accuracy in detection tasks and reduced resource consumption. The solution is designed to be fast and straightforward, allowing users to deploy effective machine-learning models in practical applications.

The illustrated example is to determine if a person entering an area is wearing clothing with a hoodie, even if the hoodie is not over the head. In one scenario, the development of a hoodie detection system was created to identify individuals engaging in loitering behavior within a client's premises. Observations at a particular site indicated that approximately 80 to 90 percent of criminal activities at a specific location involved individuals wearing hoodies pulled over their heads, so the user wanted to detect these events to detect potential undesired activities proactively.

In this illustrated example, for a user wearing a hoodie, the hoodie does not have to be over the head to be detected. Another agent could be created to detect if the hoodie is over the head or not, following the same process described below but with different information to indicate when a person is wearing the hoodie over the head or not.

In another scenario, a custom agent was created to detect whether a vehicle associated with issuing parking tickets was present in the street. An agent was developed to identify and alert people at an office when someone was issuing parking tickets outside.

Figure 20C:
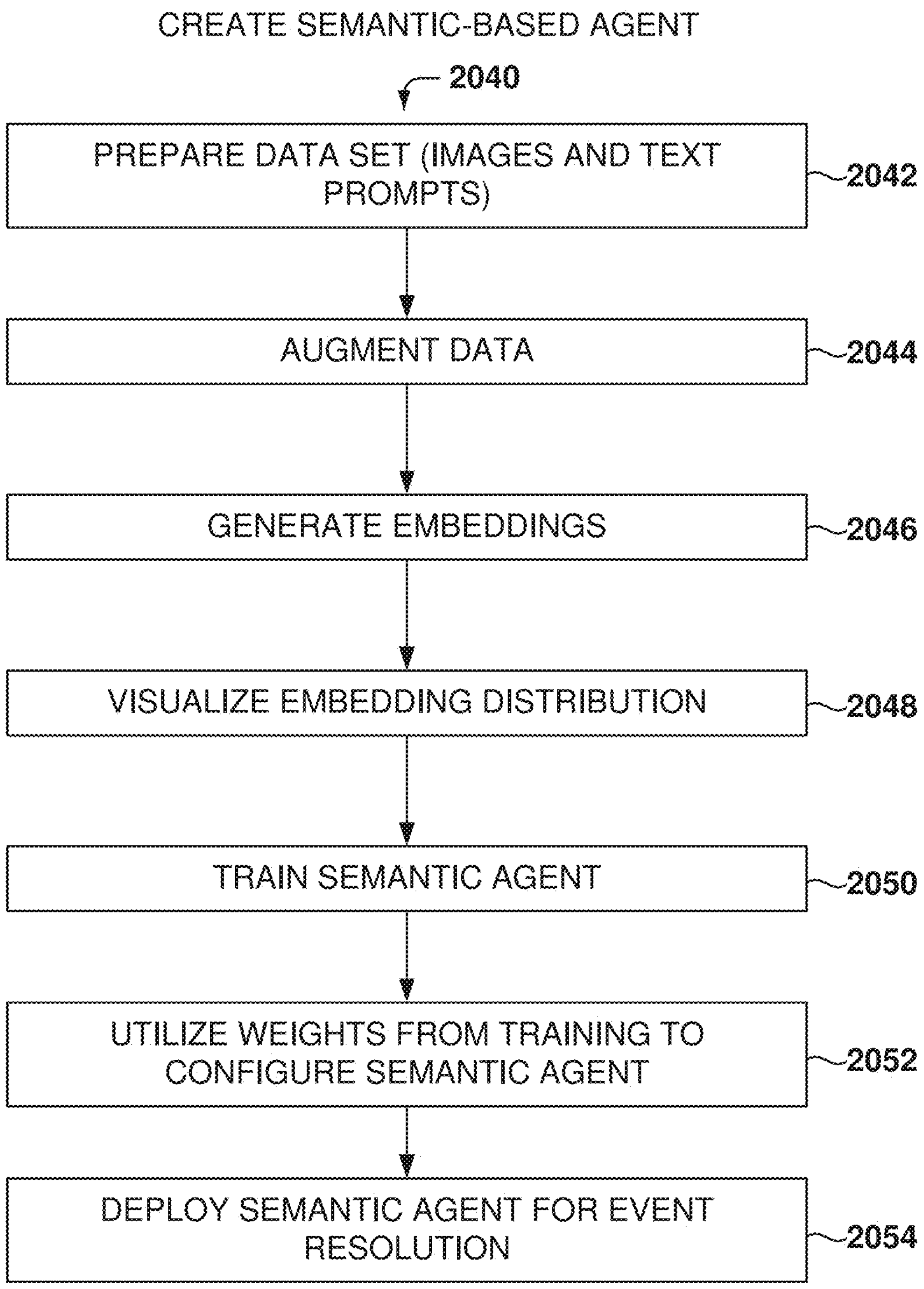
FIG. 20C is a flowchart of a method for creating a semantic agent, according to some examples.

FIG. 20C is a flowchart of a method 2040 for creating a semantic agent, according to some examples. While the various operations in this flowchart are presented and described sequentially, one of ordinary skill will appreciate that some or all of the operations may be executed in a different order, be combined or omitted, or be executed in parallel.

The solution provides a process that allows individuals without a computer science degree or technical experience to train semantic agents utilizing few-shot learning methodologies. The process aims to achieve expediency and straightforwardness. The procedure also involves data set generation and augmentation. Embeddings are created and visualized on a chart to observe the clustering patterns to determine if the embeddings are properly distributed (e.g., different items have embeddings in separate areas, while similar items have embeddings near each other).

Few-shot learning is a machine learning approach that enables a model to learn and make accurate predictions with a small number of training examples (e.g., sixteen images). Unlike traditional models that require large datasets, few-shot learning leverages prior knowledge and patterns learned from related tasks to generalize from limited data. This approach is particularly useful in scenarios where data collection is challenging or expensive, allowing the model to adapt to new tasks with minimal labeled data.

This solution achieves high accuracy by integrating textual comprehension (e.g., text describing the images used for training) within the selection process or training process. Conventionally, only images are utilized for training, focusing solely on feeding a vast number of images into the system to determine whether an image represents a type of item (e.g., a cat or a dog). However, in the described approach, both text and images are employed, and the combination of these modalities markedly enhances the performance of the training and inferencing process.

The approach leverages semantic embeddings and few-shot learning to enable rapid, flexible AI model training across diverse object detection and classification scenarios, making sure that text helps the understanding of the images. The methodology focuses on transforming image and text representations into semantic spaces that can be efficiently used for training and inference.

At operation 2042, a data set is prepared. This data set includes images and text prompts, which are used for training the semantic model. In some examples, the data preparation includes organizing the data into class-specific subfolders and creating a JSON file with label mappings and diverse textual descriptions for the images in each class. In this example, a folder named train is created containing two folders for the two classes: hoodie and no hoodie.

Data creation involves obtaining a collection of images covering the desired event (e.g., featuring hoodies) and another set of images covering other scenarios where the event is not taking place (e.g., showcasing items that are not hoodies like people without hoodies). A few random images can be included to increase diversity and aid the process.

The data preparation further includes creating textual descriptions of the event in plain language, e.g., what a hoodie resembles and what a hoodie does not resemble. A hoodie typically appears as a garment with a hood attached, frequently seen when an individual wears the hood over the head in a manner that might be perceived as suspicious when walking. Conversely, clothing that does not resemble a hoodie includes attire such as suits, blouses, and dresses. These garments lack the foundational attributes of a hoodie, foreclosing any hooded feature and presenting a more formal appearance. The task involves delineating these distinctions within the data set.

The process utilizes the list of descriptions detailing the items to be detected, classified, or observed within the agent. These images and textual prompts serve as the reference point for the agent. During testing, it was observed that the use of this new approach resulted in a notable enhancement in accuracy for event detection, given the additional context provided by the textual descriptions.

In some examples, the data set preparation includes organizing the training data into class-specific subfolders and creating textual prompts that include a label mapping (e.g., mapping classes to numeric values) and diverse textual descriptions for each class to improve model alignment to guide the event detection process.

Here are some examples of textual descriptions in JSON format:

```
{
 "label_mapping": {
   "hoodie": 1,
   "nohoodie": 0
 },
 "prompts": {
   "hoodie": {
       "a photo of a person in a dark hoodie with the hood up, looking suspicious",
       "a video of an individual in a hoodie with hands in pockets, avoiding eye contact",
```

-continued

"a photo of a person wearing a hoodie, loitering near a building entrance",
"a video of a person in a hoodie looking over their shoulder, appearing cautious",
"a photo of a hooded individual with face partially obscured, glancing around",
...
}
"nohoodie": {
"a photo of blooming roses in the garden",
"a video of people enjoying a beach sensitive",
"a photo of a butterfly resting on a flower",
"a video of children playing in a playground",
"a photo of a golden retriever playing in a park",
"a video of a family picnic on a sunny day",
...
}}}

From operation 2042, the method flows to operation 2044, where data augmentation is performed. This step involves generating multiple augmented versions of the training images to improve model robustness. As the existing images are limited in number, the aim is to enhance their representation.

The process involves adding new images by modifying each original image. Techniques such as lens flare and black-and-white conversion can be applied to create more augmented images derived from each original image. Lens flare occurs when a bright light source, such as the sun or studio light, reflects off the internal elements of a camera lens, scattering light and creating artifacts in the captured image. Lens flare can appear as rings or orbs (circular reflections of the light source), streaks or lines (light streaks radiating across the image), or haze (a general loss of contrast, resulting in a washed-out effect). This approach seeks to generate approximately 50 variations in order to increase the amount of data.

One example command for creating the augmentation is as follows:

python3 trainer.py augment ./data/hoodie-num-augmentations 50

The user may choose higher or lower augmentation values depending on the data sets. In this example, 50 augmentations were used.

From operation 2044, the method flows to operation 2046, where embeddings are generated. In some examples, the CLIP model is employed to create semantic embeddings for the images and text, but other examples may use other embedding tools. These embeddings form a unified space for both data types: images and text.

An embedding is a dense numerical representation of a discrete object, such as a word, image, or user, in a high-dimensional space. Embeddings are used to capture the semantic meaning of the object, allowing for effective comparison and analysis. In the context of machine learning, embeddings are often learned through training a model on a dataset, enabling the model to represent complex data types in a way that algorithms can easily process.

From operation 2046, the method flows to operation 2048, where the embedding distribution is visualized. This is an optional operation and may be used to check that the process is working correctly and separate the training data into respective clusters for each category. In one example, the visualization is performed using a t-SNE (t-Distributed Stochastic Neighbor Embedding) tool to visualize embedding clusters, allowing for an analysis of class separability and potential model performance, but other visualization tools may be utilized.

From operation 2048, the method flows to operation 2050, where the semantic agent is trained. In some examples, this training is a supervised learning task where logistic regression with cross-validation is implemented. The model is trained on semantic embeddings instead of raw image pixels, supporting both binary and multi-class classification scenarios.

In some examples, the semantic agent training comprises: the implementation of logistic regression accompanied by cross-validation; training processes utilizing semantic embeddings rather than raw image pixels; support for both binary and multi-class classification scenarios; and the dynamic adjustment of model complexity according to the characteristics of the dataset. In some examples, the data is split into training data and testing data (e.g., 80% in 20%).

The training may include testing the results, and if the results are not satisfactory, additional cycles of data preparation, augmentation, and embedding may be used to improve the model performance. In one example, the testing indicates the accuracy and precision recall on hoodies and hoodies. A confusion matrix may be plotted to see the results of the testing. In this case, the model is ready for deployment.

From operation 2050, the method flows to operation 2052, where the weights for the neural network obtained from the training are utilized to configure the semantic agent. These weights are used as input to the agent configuration, allowing the agent to compare new embeddings for detection.

Below are sample commands for training and embedding:

python3 trainer-py split-data ./data/hoodie 0.8-seed 42
python trainer-py embed ./data/hoodie/train From operation 2052, the method flows to operation 2054, where the semantic agent is deployed for event resolution. This deployment enables the agent to perform real-time event detection and resolution based on the trained model and configured parameters.

The training may also produce a semantic agent analysis that provides a probability of similar mappings for several probability values. One example output is as follows:

spotal-trainer ~/spot/api/cloudai/trainer git:(master)$
python3 trainer.py get-semantic-agent-embedding
./outputs/hoodie__classifier__20241119__170418.json
Semantic Agent Analysis
==================================================
Embedding norm: 35.1425
Probability to Similarity Mapping:
Probability: 1.00%, Cosine Distance: 1.1308, Cosine Similarity: −0.1308
Probability: 5.00%, Cosine Distance: 1.0838, Cosine Similarity: −0.0838
Probability: 10.00%, Cosine Distance: 1.0625, Cosine Similarity: −0.0625
Probability: 15.00%, Cosine Distance: 1.0494, Cosine Similarity: −0.0494
Probability: 20.00%, Cosine Distance: 1.0394, Cosine Similarity: −0.0394
Probability: 25.00%, Cosine Distance: 1.0314, Cosine Similarity: −0.0314

-continued

| |
|---|
| Probability: 30.00%, Cosine Distance: 1.0241, Cosine Similarity: −0.0241 |
| Probability: 35.00%, Cosine Distance: 1.0175, Cosine Similarity: −0.0175 |
| Probability: 40.00%, Cosine Distance: 1.0115, Cosine Similarity: −0.0115 |
| Probability: 45.00%, Cosine Distance: 1.0057, Cosine Similarity: −0.0057 |
| Probability: 50.00%, Cosine Distance: 0.9994, Cosine Similarity: 0.0006 |
| Probability: 55.00%, Cosine Distance: 0.9934, Cosine Similarity: 0.0066 |
| Probability: 60.00%, Cosine Distance: 0.9875, Cosine Similarity: 0.0125 |
| Probability: 65.00%, Cosine Distance: 0.9819, Cosine Similarity: 0.0181 |
| Probability: 70.00%, Cosine Distance: 0.9766, Cosine Similarity: 0.0234 |
| Probability: 75.00%, Cosine Distance: 0.9714, Cosine Similarity: 0.0286 |
| Probability: 80.00%, Cosine Distance: 0.9667, Cosine Similarity: 0.0333 |
| Probability: 85.00%, Cosine Distance: 0.9621, Cosine Similarity: 0.0379 |
| Probability: 90.00%, Cosine Distance: 0.9576, Cosine Similarity: 0.0424 |
| Probability: 95.00%, Cosine Distance: 0.9535, Cosine Similarity: 0.0465 |

In this example, the embedding norm is observed to be relatively low. If a probability of 50% is desired, a cosine distance and threshold may be established accordingly. For a higher probability threshold, the cosine distance is reduced. For instance, if a cosine distance of 0.99 is preferred, it corresponds to approximately 57% accuracy prior to activating the agent, given that the agent accepts inputs based on cosine distances. Consequently, the weight vector is obtained.

An example of a fragment of a weight vector is as follows:

```
Weight Vector:
Shape: (512,)
Vector: [ 2.45159949e+00 6.86825633e−01 1.84840961e+00
9.71457824e−01 9.47415157e−01 1.62864526e+00 1.89537617e+00
2.21753234e+00 8.66817352e−01 1.20914863e+00 3.36996599e−01
−3.26044815e−01 2.55495868e−01 3.66612019e−01 2.97881732e−01
−1.17184768e+00 −3.85750965e−01 −2.36788148e−01 −2.10637653e−01
2.25962162e+00 −4.58670545e−02 −2.72664636e−01 −5.80303395e−01
8.27064278e−01 1.92736769e+00 3.23077857e−01 1.15848374e+00
−1.38556317e+00 −2.58389364e−01 2.35325346e+00 −7.70825027e−01
9.55253503e−01 −2.45142227e−01 −1.47276318e+00 7.03655123e−01
−1.20364344e+00 −3.16272884e−01 1.06755149e+00 1.05866344e+00
−3.55355358e−01 −2.19535327e+00 1.42823812e+00 1.37639174e+00
...
1.15844674e+00 9.97147336e−01 2.89120322e−01 −3.54939497e−01]
```

To deploy the agent, the agent interface is used to configure the trigger, as described below with reference to FIG. 20E. The user may input the weight vector through copy and paste operation and configure the cosine distance corresponding to a certain threshold (e.g., 55%). The agent is thus configured to activate at the configured probability if it assesses the presence of a hoodie. In some examples, the configuration of the agent is automated within the actual platform, and the user will not have to run the scripts.

Figure 20D:
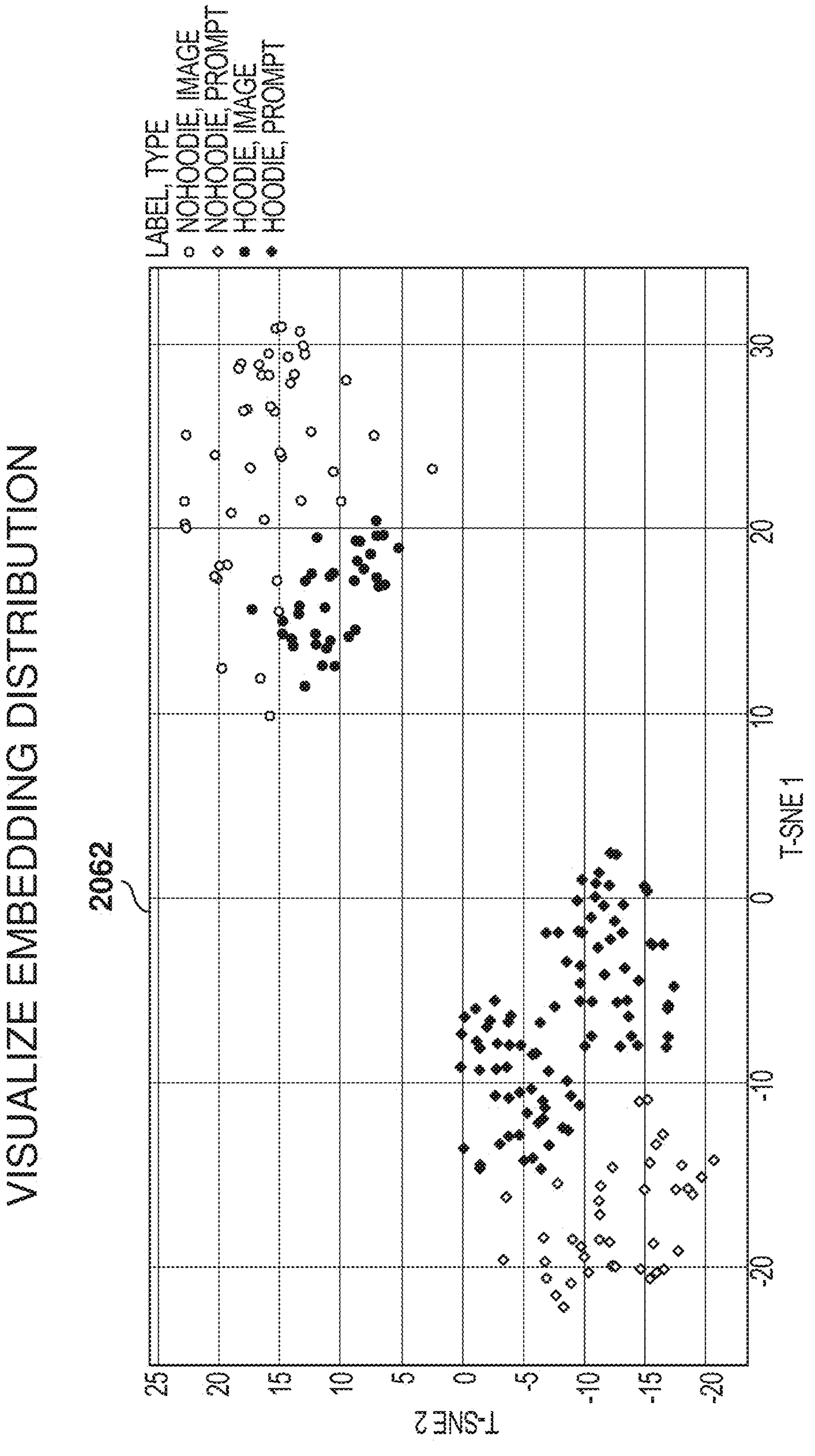
FIG. 20D shows a chart that shows the distribution of embeddings for the training items, according to some examples.

FIG. 20D shows a chart 2062 that shows the distribution of embeddings for the training items, according to some examples. In this example, the chart 2062 employs t-Distributed Stochastic Neighbor Embedding (t-SNE) to project high-dimensional data into a two-dimensional space, facilitating the visualization of how embeddings are grouped based on their semantic similarities.

The chart includes two primary clusters, each representing distinct categories of embeddings. The dark dots (e.g., blue dots) correspond to embeddings labeled as "nohoodie, image" and "nohoodie, prompt," while the light dots (e.g., red dots) represent embeddings labeled as "hoodie, image" and "hoodie, prompt." This visualization highlights the separability of the embeddings, indicating that the semantic model effectively distinguishes between the different categories based on the input data.

The axes labeled as t-SNE 1 and t-SNE 2 represent the two dimensions of the t-SNE projection, which are abstract dimensions used to visualize the relative distances and relationships between the embeddings. The clustering of the embeddings suggests that the semantic model has successfully captured the underlying patterns and features that differentiate the categories, which is important for accurate classification and detection tasks.

This visualization is significant as it provides insights into the performance of the semantic model, allowing for the assessment of class separability and potential areas for improvement. By analyzing the distribution of embeddings, users can identify any clustering issues or areas where additional data might be needed to enhance model performance.

In this scenario, due to the joint training of models incorporating both images and text, a shared semantic space is created where images and text coexist, facilitating the visualization of properties. Observation reveals that the dots representing text are located on the same side, while the dots representing images form a perimeter configuration. This representation illustrates the interaction between text and images, whereby each influences the other, thereby enhancing the model's capability to classify specific entities more effectively.

This approach aims to enhance the model's accuracy and effectiveness through improved data representation. Visualization facilitates the user's comprehension of whether the model would perform effectively with this specific data set. Additionally, visualization aids in error analysis. Conducting such visualization allows for a more thorough understanding of the data distribution. This approach enables an assessment of the model's performance with the inclusion of this particular data and offers insights into potential avenues for incremental improvement.

In a potential scenario, there may be a lone image in a specific area within the visualization chart, which will affect the model's ability to distinguish between categories such as hoodies and jackets. From this view, a conclusion may be drawn that there is a need to gather additional data related to jackets or hoodies.

Figure 20E:
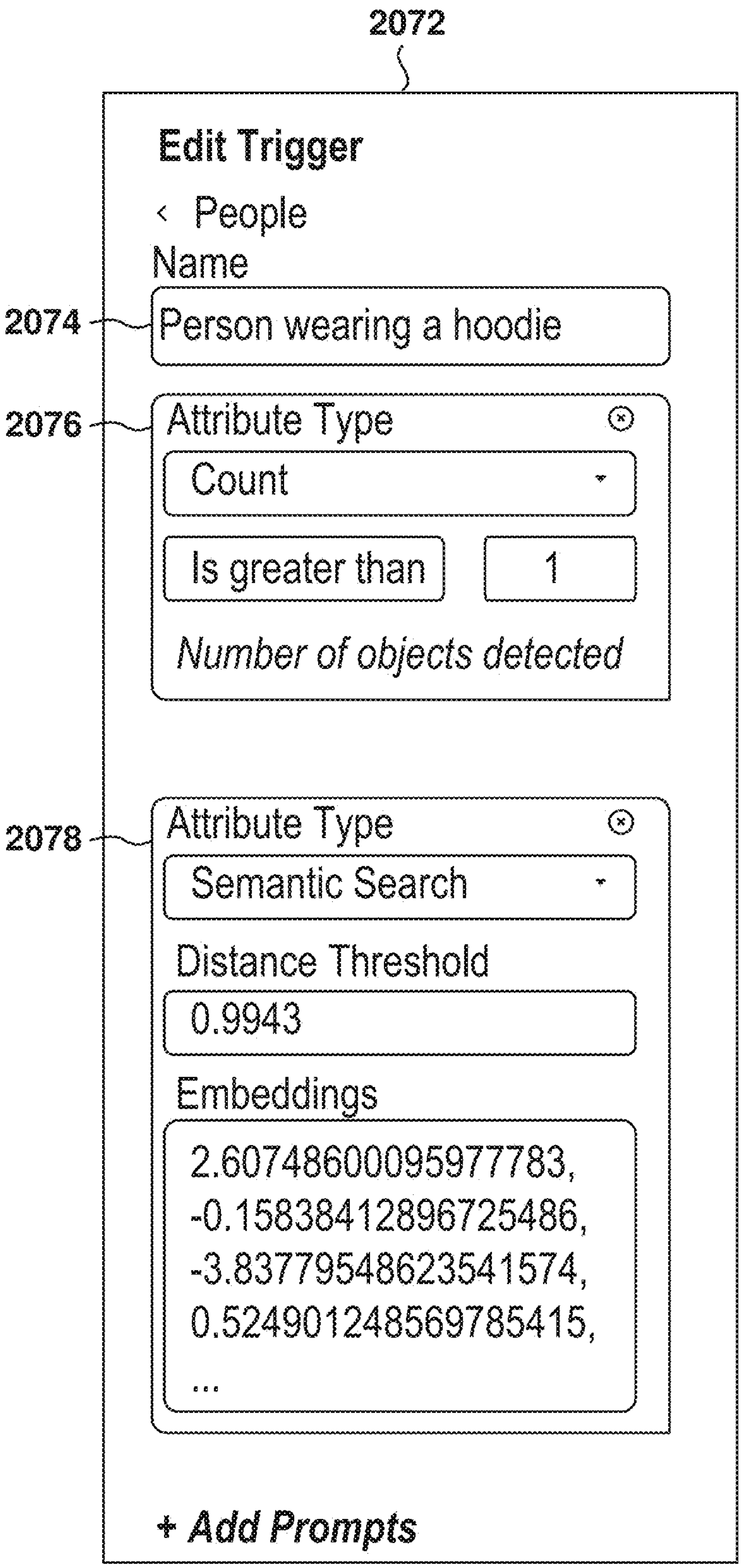
FIG. 20E shows a UI for creating the semantic agent using the data resulting from the training, according to some examples.

FIG. 20E shows a UI 2072 for creating the semantic agent using the data resulting from the training, according to some examples. The interface is designed to facilitate the configuration of triggers based on semantic analysis for event detection within a video surveillance system. The Edit Trigger UI 2072 provides options for defining the conditions under which a trigger is activated.

The first field, labeled Name 2074, allows the user to specify the name of the trigger. In this example, the name is set to "Person wearing a hoodie," indicating that the trigger is designed to detect individuals wearing hoodies.

The interface includes a dropdown menu labeled Attribute Type 2076, which offers various options for defining the type of attribute to be monitored. In this example, the selected attribute type is Count, with a condition set to "Is greater than 1," specifying that the trigger will activate when more than one object is detected (e.g., one person or more wearing a hoodie).

Another dropdown menu, also labeled Attribute Type 2078, provides the option to select Semantic Search as the attribute type. This selection enables the use of semantic embeddings to refine the detection process. The interface includes a field for specifying the Distance Threshold (e.g., set to 0.9943 in this example), which determines the sensitivity of the semantic search.

Below the distance threshold, a field labeled Embeddings is used to paste the embedding vector resulting from the training of the logistic regression. These values represent the semantic embeddings used to compare against the detected objects in the video data. The embeddings play a role in determining the similarity between the detected objects and the predefined semantic criteria.

Subsequently, the agent possesses the capability to utilize that embedding to ascertain whether an individual is wearing a hoodie or not wearing a hoodie. The agent will utilize that weight for comparison purposes. Essentially, the weight constitutes a list of numbers and is compared to all other embeddings. The process involves determining the proximity of the weight to a given embedding. If a strong proximity is identified, the item is classified as a hoodie. Conversely, if the proximity is minimal, the item is classified as not a hoodie.

In some examples, additional tools may be provided to the user to automate the process. For example, a user may create a directory with the sample images and text descriptions, and the system would perform the training and use the resulting embedding to be automatically added to the trigger.

Figure 21:
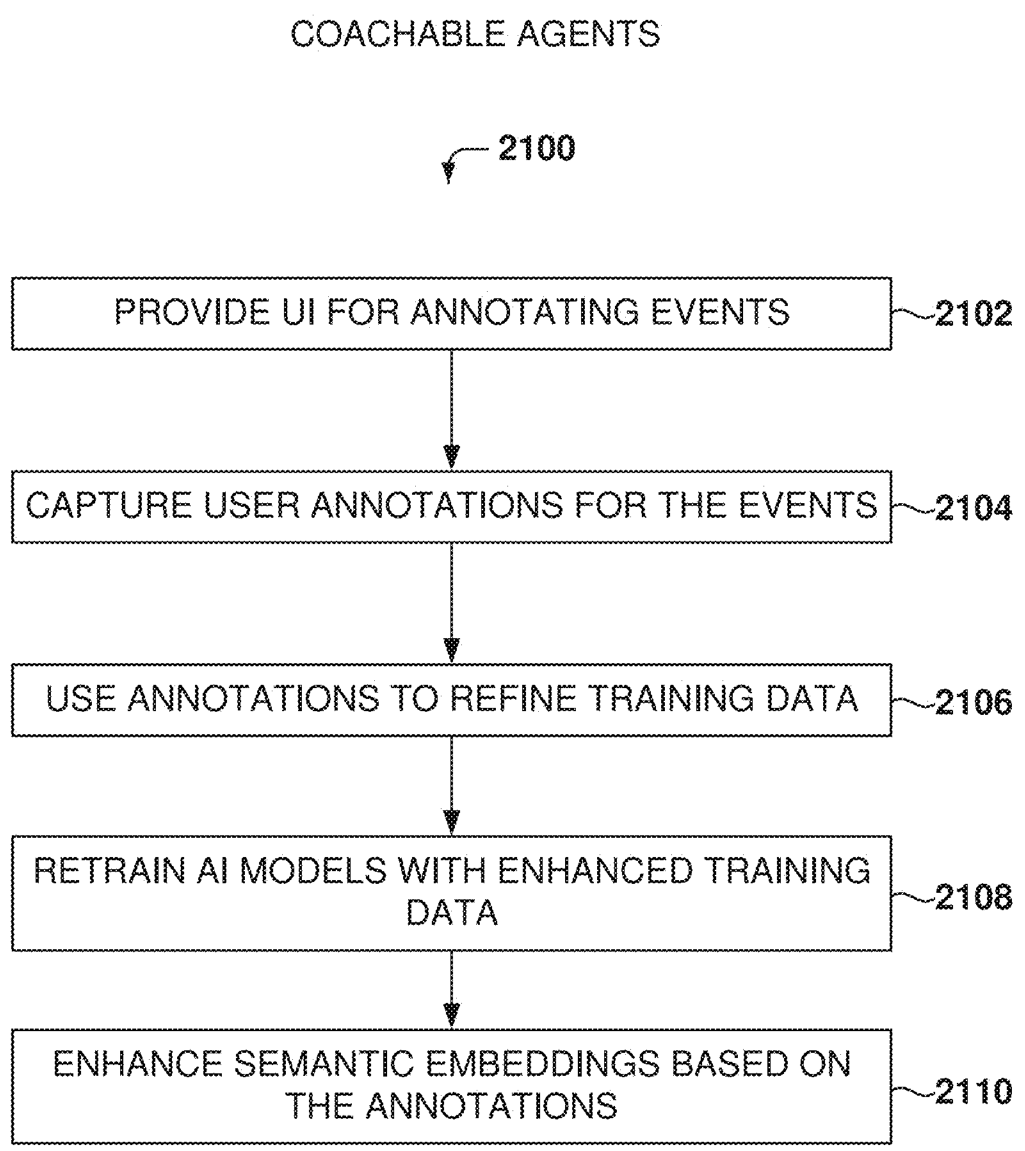
FIG. 21 shows a flowchart of a method for coaching agents that allows user annotations, according to some examples.

FIG. 21 shows a flowchart of a method 2100 for coaching agents that allows user annotations, according to some examples. While the various operations in this flowchart are presented and described sequentially, one of ordinary skill will appreciate that some or all of the operations may be executed in a different order, be combined or omitted, or be executed in parallel.

The system provides an option for the user to provide feedback on the detected events, also referred to as "copilot." The user can provide feedback in several ways, such as annotating if an event was detected correctly or not (e.g., thumbs up, thumbs down).

For example, the user may annotate if the event was labeled correctly or not. If the event was improperly labeled, the user has the option to rename the event that occurred, redraw a boundary of an object, or delete the event. For example, the user may redraw an area associated with an object, such as a kiosk, a parking space, a door, a driveway, a road, etc. Also, the user may identify new objects in the frame.

The system incorporates user-provided annotations and markings to refine the semantic triggers or zones. The recognition system then learns to improve detection based on this feedback.

The users can label specific events, objects, or scenarios within video feeds, upload new examples, or describe the event, providing ground truth examples that can be used to improve the understanding of the semantic trigger. The annotations help in reclassifying and enhancing semantic representations, making the agents more robust and accurate in future detections using ground truth data from the user.

When users confirm correct detections or correct misclassifications, the system adjusts the models accordingly and uses the new example as data points for detecting closeness to the new example. This benefits the semantic trigger by allowing for more robust representations and greater focus due to explicit learning on top of a customer's stationary installed camera.

At operation 2102, the method 2100 involves providing a user interface (UI) for annotating events. This operation includes designing and implementing a UI that allows users to interact with video feeds and annotate specific events. The UI may include tools for drawing bounding boxes, adding labels, and marking timestamps to identify and describe events within the video data.

From operation 2102, the method 2100 flows to operation 2104 for capturing user annotations for the events. This operation involves recording the annotations made by users through the UI. The captured annotations may include details such as the type of event, the objects involved, and the spatial and temporal context of the event. These annotations serve as data points for refining the system's understanding of the events.

From operation 2104, the method 2100 flows to operation 2106 for using annotations to refine training data. This operation involves integrating the captured annotations into the training dataset used for machine learning models. The annotations help in reclassifying and enhancing the semantic representations of the events, making the training data more robust and accurate. In some examples, the refined training data includes both the original data and the user-provided annotations, which improve the model's ability to detect and interpret events.

From operation 2106, the method 2100 flows to operation 2108 for retraining AI models with the enhanced training data. The retraining process updates the models to incorporate the new annotations, improving their performance and accuracy in detecting and interpreting events. The retrained models are better equipped to handle a broader range of scenarios and provide more reliable event detection.

From operation 2108, the method 2100 flows to operation 2110 for enhancing semantic embeddings based on the annotations. This operation involves updating the semantic embeddings generated by the AI models to reflect the new annotations. The enhanced semantic embeddings provide a deeper understanding of the events, allowing the system to make more accurate and meaningful detections. The embeddings are used to calculate vector similarities and resolve semantic triggers, further improving the system's performance.

Figure 22:
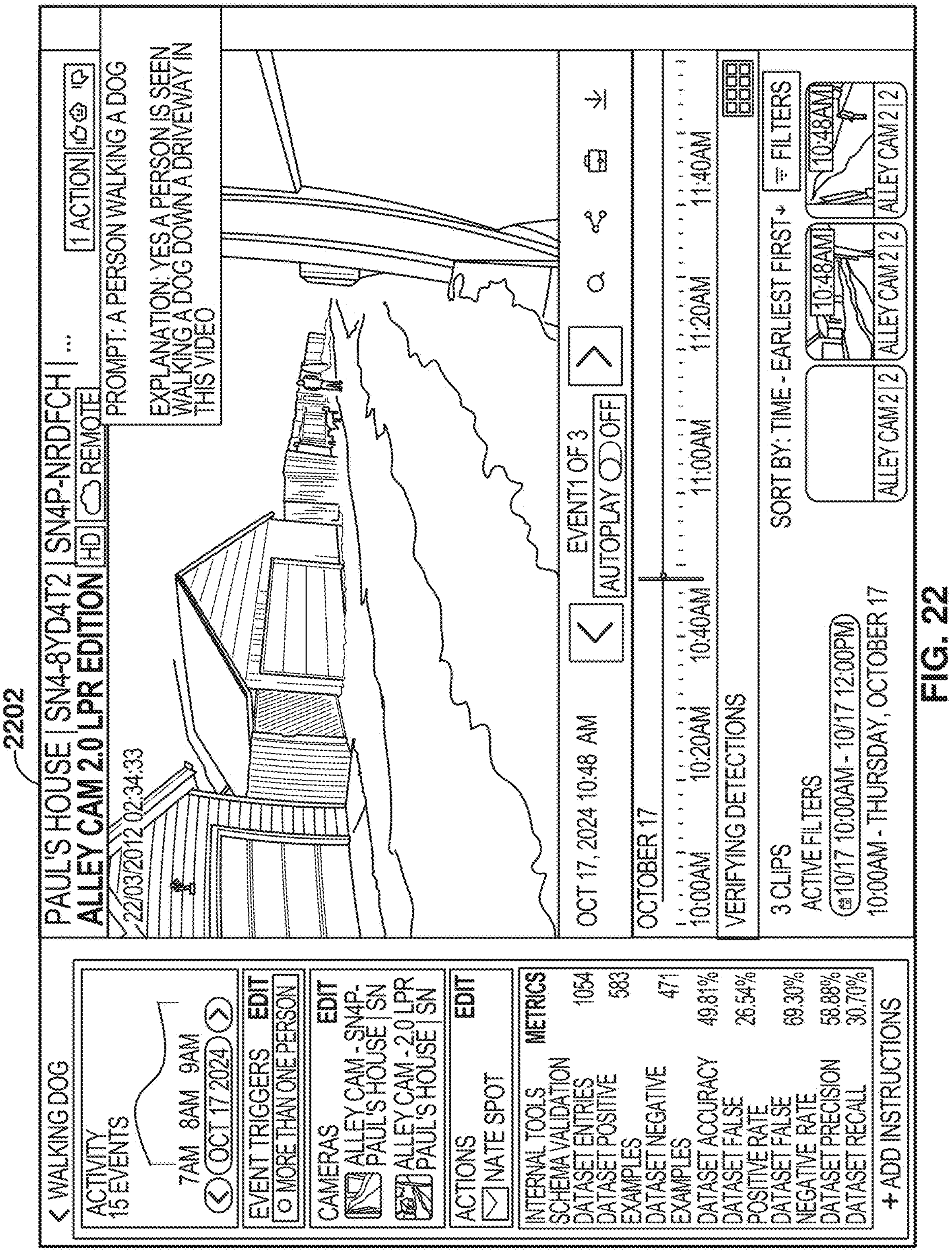
FIG. 22 shows a UI for verifying clips, according to some examples.

FIG. 22 shows a UI 2202 for verifying clips, according to some examples. The clip verifier enhances the system's reliability by providing a secondary validation mechanism for events.

The clip verifier is used to validate detected events using different techniques, such as using a Large Language Model (LLM). The clip verifier acts as a secondary observer evaluating the footage but utilizing a different AI approach.

In some examples, a prompt is generated based on the detected event, and the prompt is used as input to the LLM, asking the LLM a question regarding the event. The LLM's output indicates if the event is validated or not. For instance, in the scenario of detecting a fall, the LLM model would determine if a fall has occurred.

In the illustrated example in FIG. 22, the UI 2202 shows an image for a clip verifier to determine if a person is walking a dog to validate a dog-walking agent. The clip verifier is asked if the image shows a person walking a dog, and the response will validate or not the dog-walking detected event.

Upon initial detection of an event by the primary AI models, the system requests a response, about the associated video data, to a private Large Language Model (LLM) with a specially crafted prompt. The length of the video (and audio) clip submitted may be limited to a configuration variable in the agent (e.g., five minutes).

In some examples, the clip verification is performed on a live video feed, with the retroactive processing of video data taking place by loading indicators to signal that retroactive video is being automatically reviewed by the system.

The LLM offers a second opinion on whether the event has indeed occurred. Crafting specialized prompts for LLMs involves prompt engineering to guide the LLM's reasoning process. The prompts are crafted to provide context and pose specific questions to the LLM, focusing its analysis on the relevant aspects of the event.

For example, a prompt might include a description of the video clip and ask the LLM to determine whether a specific event has occurred, requesting a 'Yes' or 'No' answer followed by a brief explanation. Additional context, such as time of day or location details, may be included to aid the LLM's understanding.

Here is an example of a prompt:

You are provided with a description of a video clip from a security camera:

[Insert generated video description here]

Based on this description, determine whether [specific event] has occurred. Provide a 'Yes' or 'No' answer, followed by a brief explanation.

This approach is a form of AI ensembling, where multiple AI systems (e.g., the AI detection model based on image analysis, the semantic model for semantic analysis) are combined with the use of the LLM to improve overall accuracy and robustness.

The LLM model can be any LLM model that can accept visual information. These models analyze frames or sequences of frames to capture the details about objects, actions, and interactions within the scene. The system identifies the pertinent segments of the video that are selected for event verification, focusing on frames where the triggering event occurs, ensuring that the LLM receives concise and relevant information.

Some of the benefits of using LLMs in Clip Verification include:

- Enhanced interpretability, as LLMs can articulate their reasoning in natural language, providing insights into the decision-making process.
- Contextual flexibility, being capable of understanding and adapting to a wide range of scenarios without extensive retraining, leveraging vast pre-trained knowledge to consider factors beyond the immediate visual content.
- Improving the detection of complex events, particularly in scenarios involving nuanced human behavior, rare events, or subtle interactions that are challenging for composable AI alone.

The clip-verifier approach can open opportunities to forward clips for additional human review or direct human action in the case that an action cannot be automatically executed, such as a 911 call. Additionally, the LLM model can take textual or numerical attributes from triggers, such as temperature readings, ERP entries, or cost entries, and use this information to alter the search in the verification process.

The UI 2202 provides a comprehensive view of events captured by a camera (e.g., Alley Cam 2.0 LPR Edition). The main display area presents a live video feed, timestamped as Oct. 17, 2224, 10:48 AM, showing an alleyway scene. The video feed is accompanied by a notification indicating that a person is walking a dog down the alley.

The left panel of the interface includes several sections. The "Activity" section displays the number of events, with a total of 15 events recorded. The "Event Triggers" section lists the trigger condition "more than one person," which is editable. The "Cameras" section identifies the active camera as Alley Cam 2.0 LPR Edition, with an option to edit the camera settings.

The "Actions" section provides options to edit the actions associated with the detected events. The "Internal Tools" section includes various metrics related to the dataset, such as Schema Validation, Dataset Entries, Dataset Positive Examples, Dataset Negative Examples, Dataset Accuracy, Dataset False Positive, Dataset False Negative, Dataset Precision, and Dataset Recall. These metrics provide insights into the performance and reliability of the detection system. The section also includes options to add instructions or delete the agent.

Beneath the video feed, a timeline is displayed, showing the sequence of events with markers indicating specific occurrences. The timeline is interactive, allowing users to navigate through the events. The "Verifying detections" section highlights the current verification process, with a purple bar indicating the verification status.

The "3 Clips" section below the timeline presents thumbnails of the recorded clips, each with a timestamp and camera identifier. Users can sort the clips by time, with options to apply filters for more refined searches. The interface provides a detailed and organized view of the surveillance data, facilitating efficient monitoring and verification of events.

Figure 23:
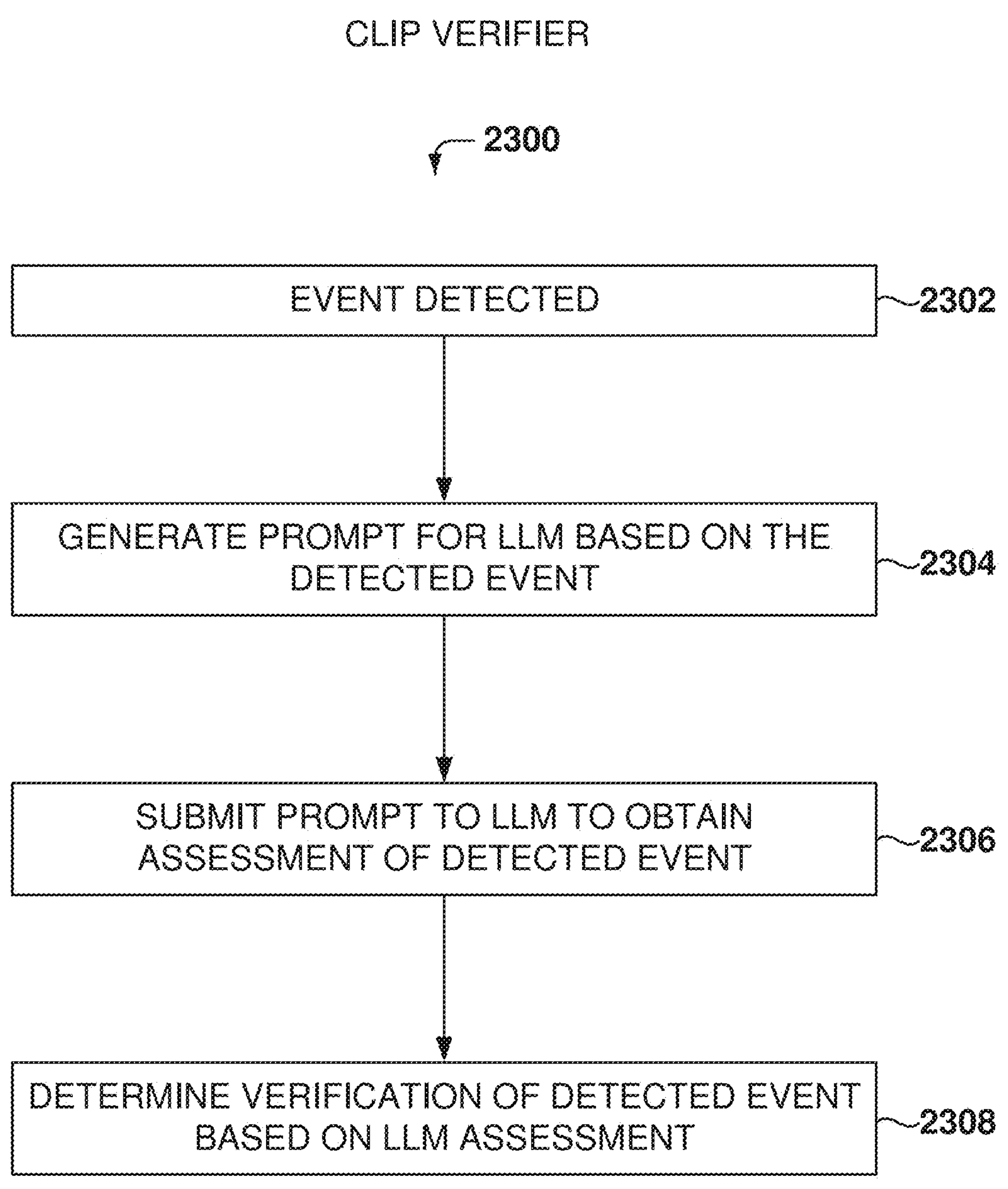
FIG. 23 shows a flowchart of a method to verify a detected event, according to some examples.

FIG. 23 shows a flowchart of a method 2300 to verify a detected event, according to some examples. While the various operations in this flowchart are presented and described sequentially, one of ordinary skill will appreciate that some or all of the operations may be executed in a different order, be combined or omitted, or be executed in parallel.

At operation 2302, the method 2300 involves detecting an event. This operation includes identifying an occurrence within the video data that meets predefined criteria for an event. The detection may be performed by primary AI models that analyze the video feed to identify specific actions, objects, or interactions that constitute an event.

From operation 2302, the method 2300 flows to operation 2304 for generating a prompt for the Large Language Model (LLM) based on the detected event. This operation involves creating a specialized prompt that provides context and specific questions related to the detected event. The prompt is crafted to guide the LLM's reasoning process, focusing the analysis on the aspects of the event.

From operation 2304, the method 2300 flows to operation 2306 for submitting the prompt to the LLM to obtain an assessment of the detected event. This operation includes sending the crafted prompt along with information about the associated video data to the LLM. The LLM processes the prompt and the video data to provide a second opinion on whether the event has indeed occurred. The assessment of the LLM is based on the analysis of the frames or sequences within the video that are identified for event verification.

From operation 2306, the method 2300 flows to operation 2308 for determining the verification of the detected event based on the LLM assessment. This operation involves evaluating the LLM's response (e.g., yes or no to the question of whether this is an event of a given type) to confirm the occurrence of the event. The verification process may include analyzing the LLM's reasoning and the provided explanation to ensure the accuracy and reliability of the event detection.

Figure 24:
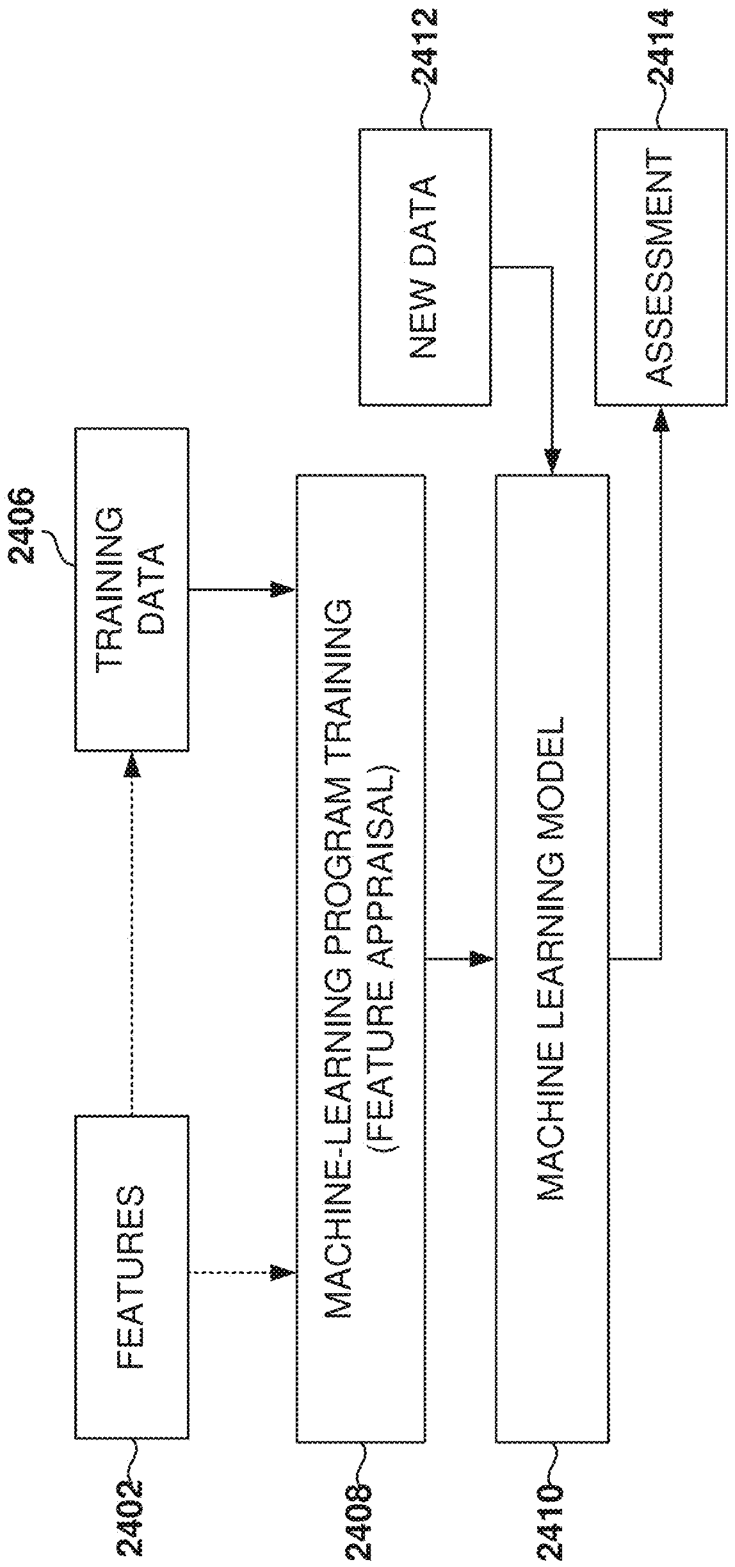
FIG. 24 illustrates the training and use of a machine-learning model for event detection, according to some examples.

FIG. 24 illustrates the training and use of a machine-learning model 2410 for event detection, according to some examples. In some examples, machine learning (ML) models 2410 are utilized to perform operations associated with event detection, such as object identification in an image frame.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data 2412. Such machine-learning algorithms operate by building an ML model 2410 from training data 2406 in order to make data-driven predictions or decisions expressed as outputs or assessments 2414. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, accurate data representation makes the training able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, approximates the relationship between the training inputs and outputs so that the ML model can implement the same relationships when given inputs to generate the corresponding outputs. Unsupervised ML is the training of an ML algorithm, using information that is neither classified nor labeled, and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders.

The training data 2406 comprises examples of values for the features 2402. In some examples, the training data comprises labeled data with examples of values for the features 2402 and labels indicating the outcome, such as the type of event associated with one or more images, objects detected in an image, etc. The machine-learning algorithms utilize the training data 2406 to find correlations among the identified features 2402 that affect the outcome. A feature 2402 is an individual measurable property of a phenomenon being observed. The concept of a feature is related to that of an explanatory variable used in statistical techniques such as linear regression. Choosing informative, discriminating, and independent features facilitates the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

In one example, the features 2402 may be of different types and may include one or more of bounding boxes (rectangular boxes around objects in each image defining the location and size of an object), class labels (e.g., "car," "person," "dog, to identify the type of object), image features (e.g., color, texture, shape, and patterns), anchor boxes (predefined boxes to assist the model learn how to detect objects of varying shapes and sizes), object presence or absence (indicating whether certain objects are present or absent in the image), pose information (orientation or angle of an object), etc.

During training 2408, the ML program, also referred to as ML algorithm or ML tool, analyzes the training data 2406 based on the identified features 2402 defined for the training. The result of the training 2408 is the ML model 2410, which is capable of taking inputs to produce assessments.

Training an ML algorithm involves analyzing large amounts of data in order to find data correlations. The ML algorithms utilize the training data 2406 to find correlations among the identified features 2402 that affect the outcome or assessment 2414.

In some examples, results obtained by the model 2410 during operation (e.g., assessment 2414 produced by the model in response to inputs comprising new data 2412) are used to improve the training data 2406, which is then used to generate a newer version of the model. Thus, a feedback loop is formed to use the results obtained by the model to improve the model.

Feature extraction is a process to reduce the amount of resources required to describe a large set of data. When performing an analysis of complex data, one problem may occur based on the number of variables involved. Analysis with a large number of variables generally requires a large amount of memory and computational power, and it may cause a classification algorithm to overfit training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same or a similar amount of information.

Figure 25:
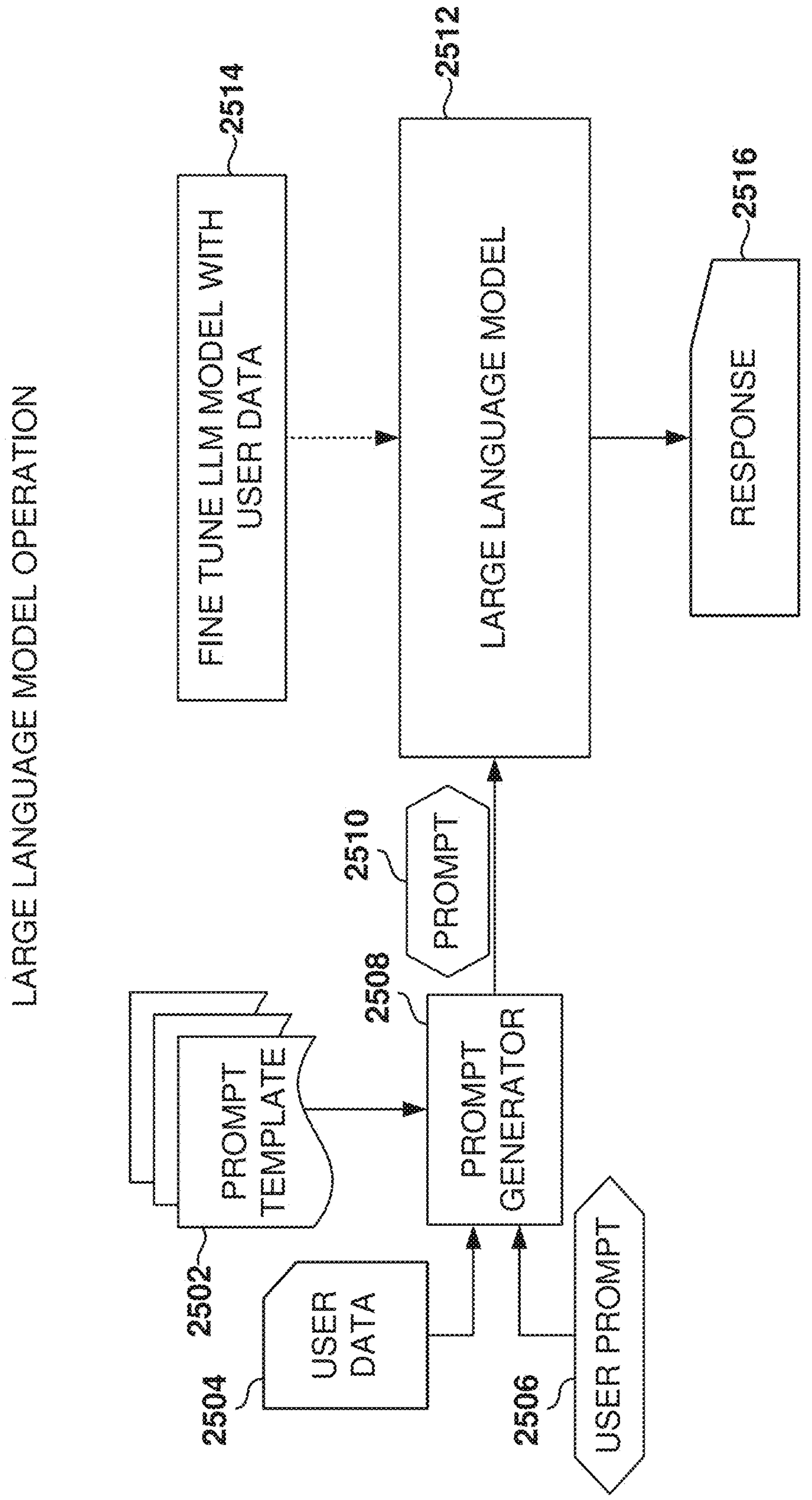
FIG. 25 illustrates the use of a Large Language Model (LLM) to generate a response based on a prompt, according to some examples.

FIG. 25 illustrates the use of a Large Language Model (LLM) 2512 to generate a response based on a prompt 2510, according to some examples. LLM is a type of artificial intelligence model designed to process and generate human-like text by understanding and predicting language patterns. LLMs are typically based on transformer architectures, which allow them to handle long-range dependencies in text and generate coherent, contextually relevant language.

Some examples of LLMs include OpenAI's GPT-3 and GPT-4, Google's BERT and PaLM, Meta's LLaMA, and open-source models like Bloom. LLMs can perform a variety of language tasks, such as text generation, summarization, question answering, language translation, and sentiment analysis.

Some LLMs provide few-shot and zero-shot learning that allows them to handle tasks with little to no additional task-specific training simply by being given a prompt with a few examples (few-shot) or even no example at all (zero-shot).

Users can utilize the LLM 2512 as provided by the vendor or can optionally fine-tune 2514 the LLM 2512 with their user data to adjust the parameters of the LLM 2512 in order to improve performance on a specific task or domain.

Fine-tuning involves taking an already-trained model and adjusting its weights with additional training on new, user-specific data. In some examples, fine-tuning the LLM 2512 includes the following operations:

1. Collect data that reflects the kind of responses the model should produce, e.g., text data from documents, user interactions, or other content relevant to the user application.
2. Label the data as needed; also, preprocessing to clean and preprocess the data, including tokenization, handling out-of-vocabulary words, and managing special characters.
3. Train the model with the user data, which will adjust the weights of the model to fit the user-specific content better.

The LLM 2512 receives the prompt 2510 used as input, and the LLM 2512 generates the response 2516 as output. The LLM uses several techniques to generate the response, including tokenization, contextual encoding, attention mechanism, decoding, and generating the response.

Tokenization converts the input text into tokens, which are smaller pieces of words or characters that allow the model to process language more efficiently. Contextual encoding is used to process the tokens through multiple neural network layers to capture and refine contextual information about the tokens at each layer. The attention mechanism allows the model to determine how each token relates to other tokens in the prompt, helping to understand context, disambiguating meanings, and maintaining coherence across long passages.

After encoding the context, the LLM 2512 begins generating a response, predicting one token at a time based on the learned relationships. To keep the response coherent and relevant, the LLM 2512 uses the previously generated tokens to influence upcoming ones. Each token generation step builds upon the last, preserving continuity within the response.

The prompt 2510 is a piece of text or code that is used to instruct the LLM 2512 towards generating a desired output (e.g., response 2516). The Prompt 2510 provides context, instructions, and expectations for the output.

Prompt engineering is the process of designing and crafting prompts to effectively instruct and guide the LLM 2512 toward generating desired outputs. It involves selecting and structuring the text that forms the prompt 2510 input to the LLM 2512, ensuring that the prompt 2510 accurately conveys the task, context, and desired style of the output.

In some examples, a prompt generator 2508, which is a computer program, is used to the prompt 2510. There are several ways to generate the prompt 2510. In one example, the prompt generator 2508 may use a user prompt 2506 entered by the user in plain language as the prompt 2510. In other examples, the prompt generator 2508 creates the prompt 2510 without having a user prompt 2506, such as by using a static pre-generated prompt based on the desired output.

In some examples, the prompt generator 2508 uses a prompt template 2502 to generate the prompt 2510. The prompt template 2502 defines the structure of the prompt 2510 and may include fields that may be filled in based on available information to generate the prompt 2510, such as user data 2504 or the user prompt 2506. The prompt template may also include rules for the creation of the prompt 2510 (e.g., include specific text when the recipient resides in California, but do not include the text if the recipient does not reside in California). In other examples, the prompt generator 2508 uses heuristics codified into a computer program to generate the prompt 2510.

Figure 26:
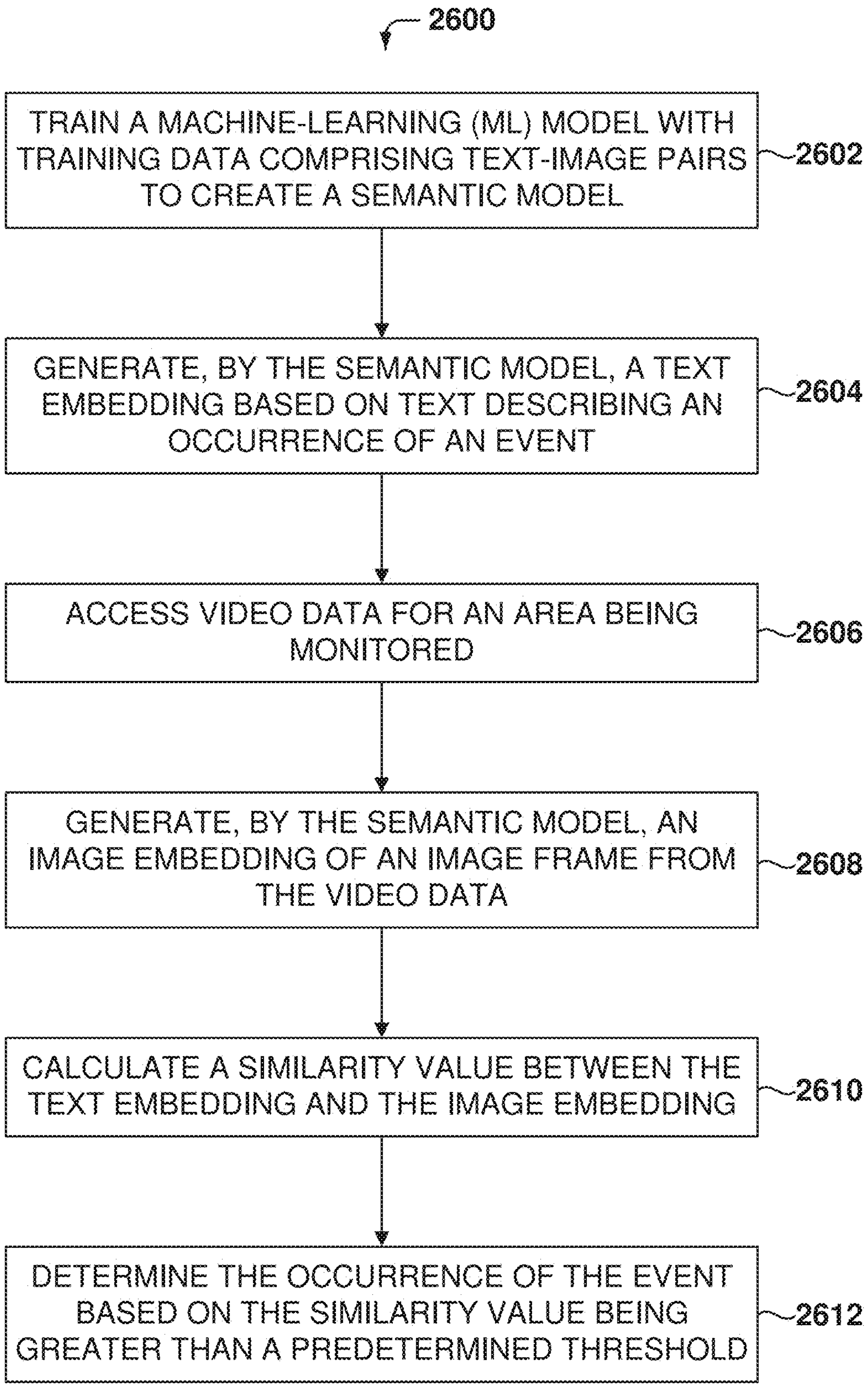
FIG. 26 shows a flowchart of a method for performing semantic analysis of video data using the LLM of FIG. 25, according to some examples.

FIG. 26 shows a flowchart of a method 2600 for performing semantic analysis of video data using the LLM of FIG. 25, according to some examples. While the various operations in this flowchart are presented and described sequentially, one of ordinary skill will appreciate that some or all of the operations may be executed in a different order, be combined or omitted, or be executed in parallel.

Operation 2602 is for training a machine-learning (ML) model with training data comprising text-image pairs to create a semantic model. This operation includes leveraging a dataset comprising images and their corresponding textual descriptions. The ML model, such as a Contrastive Language-Image Pretraining (CLIP) model, learns a shared embedding space where images and texts with similar meanings are closely aligned.

From operation 2602, the method 2600 flows to operation 2604 for generating, by the semantic model, a text embedding based on text describing an occurrence of an event. The text embedding is a vector encoding information based on the text describing the occurrence of the event. This embedding captures the semantic meaning of the text in a high-dimensional space.

From operation 2604, the method 2600 flows to operation 2606 for accessing video data for an area being monitored. This operation involves retrieving video data from surveillance cameras or other video sources that capture the area of interest. The video data comprises a sequence of image frames that are analyzed for event detection.

From operation 2606, the method 2600 flows to operation 2608 for generating, by the semantic model, an image embedding of an image frame from the video data. The image embedding is a vector that encodes information based on the image frame. This embedding captures the visual features and semantic content of the image in a high-dimensional space shared with the text embeddings.

From operation 2608, the method 2600 flows to operation 2610 for calculating a similarity value between the text embedding and the image embedding. This operation involves computing a measure of the closeness (e.g., cosine distance) between the text embedding and the image embedding. The similarity value quantifies how well the image content matches the textual description of the event.

From operation 2610, the method 2600 flows to operation 2612 for determining the occurrence of the event based on the similarity value being greater than a predetermined threshold. This operation involves evaluating whether the calculated similarity value exceeds a predefined threshold, indicating that the event described by the text has occurred in the image frame. If the similarity value is greater than the threshold, the system determines that the event has occurred and may trigger associated actions or alerts.

In view of the disclosure above, various examples are set forth below. It should be noted that one or more features of an example, taken in isolation or combination, should be considered within the disclosure of this application.

Example 1. A computer-implemented method comprising: training a machine-learning (ML) model with training data comprising text-image pairs to create a semantic model; generating, by the semantic model, a text embedding based on text describing an occurrence of an event; accessing video data for an area being monitored; generating, by the semantic model, an image embedding of an image frame from the video data; calculating a similarity value between the text embedding and the image embedding; and determining the occurrence of the event based on the similarity value being greater than a predetermined threshold.

Example 2. The method of Example 1, wherein each text-image pair comprises an image and a textual description of the image.

Example 3. The method of any one or more of Examples 1-2, wherein the training utilizes multi-modal learning to learn in a multi-modal space comprising images and text to learn a shared representation of the images and the text.

Example 4. The method of any one or more of Examples 1-3, wherein the ML model is a Contrastive Language-Image Pretraining (CLIP) model that learns a shared embedding space where images and texts with similar meanings are proximate to each other and images and texts with different meanings are far from each other.

Example 5. The method of any one or more of Examples 1-4, wherein the text embedding is a vector encoding information based on the text describing the occurrence of the event, wherein the image embedding is a vector encoding information based on the image frame.

Example 6. The method of any one or more of Examples 1-5, further comprising: generating a plurality of event-text embeddings for a plurality of text descriptions of a plurality of events; and utilizing the plurality of event-text embeddings to detect any of the plurality of events based on image frames from the video data.

Example 7. The method of any one or more of Examples 1-6, wherein the image embedding comprises information about pixels in the image frame and metadata derived from the image frame.

Example 8. The method of any one or more of Examples 1-7, wherein the semantic model comprises an image encoder and a text encoder, the image encoder configured for encoding image frames into a high-dimensional semantic space shared with the text embeddings.

Example 9. The method of any one or more of Examples 1-8, wherein determining the occurrence of the event further comprises: activating a trigger associated with the event in response to the similarity value being greater than a predetermined threshold.

Example 10. The method of any one or more of Examples 1-9, wherein the ML model provides zero-shot learning to classify images into a category without accessing examples of the category during training.

Example 11. A system comprising: a memory comprising instructions; and one or more computer processors, the instructions, when executed by the one or more computer processors, causing the system to perform operations comprising: training a machine-learning (ML) model with training data comprising text-image pairs to create a semantic model; generating, by the semantic model, a text embedding based on text describing an occurrence of an event; accessing video data for an area being monitored; generating, by the semantic model, an image embedding of an image frame from the video data; calculating a similarity value between the text embedding and the image embedding; and determining the occurrence of the event based on the similarity value being greater than a predetermined threshold.

Example 12. The system of Example 11, wherein each text-image pair comprises an image and a textual description of the image.

Example 13. The system of any one or more of Examples 1-12, wherein the training utilizes multi-modal learning to learn in a multi-modal space comprising images and text to learn a shared representation of the images and the text.

Example 14. The system of any one or more of Examples 1-13, wherein the ML model is a Contrastive Language-Image Pretraining (CLIP) model that learns a shared embedding space where images and texts with similar meanings are proximate to each other and images and texts with different meanings are far from each other.

Example 15. The system of any one or more of Examples 1-14, wherein the text embedding is a vector encoding information based on the text describing the occurrence of the event, wherein the image embedding is a vector encoding information based on the image frame.

Example 16. A non-transitory machine-readable storage medium including instructions that, when executed by a machine, cause the machine to perform operations comprising: training a machine-learning (ML) model with training data comprising text-image pairs to create a semantic model; generating, by the semantic model, a text embedding based on text describing an occurrence of an event; accessing video data for an area being monitored; generating, by the semantic model, an image embedding of an image frame from the video data; calculating a similarity value between the text embedding and the image embedding; and determining the occurrence of the event based on the similarity value being greater than a predetermined threshold.

Example 17. The non-transitory machine-readable storage medium of Example 16, wherein each text-image pair comprises an image and a textual description of the image.

Example 18. The non-transitory machine-readable storage medium of any one or more of Examples 1-17, wherein the training utilizes multi-modal learning to learn in a multi-modal space comprising images and text to learn a shared representation of the images and the text.

Example 19. The non-transitory machine-readable storage medium of any one or more of Examples 1-18, wherein the ML model is a Contrastive Language-Image Pretraining (CLIP) model that learns a shared embedding space where images and texts with similar meanings are proximate to each other and images and texts with different meanings are far from each other.

Example 20. The non-transitory machine-readable storage medium of any one or more of Examples 1-19, wherein the text embedding is a vector encoding information based on the text describing the occurrence of the event, wherein the image embedding is a vector encoding information based on the image frame.

Figure 27:
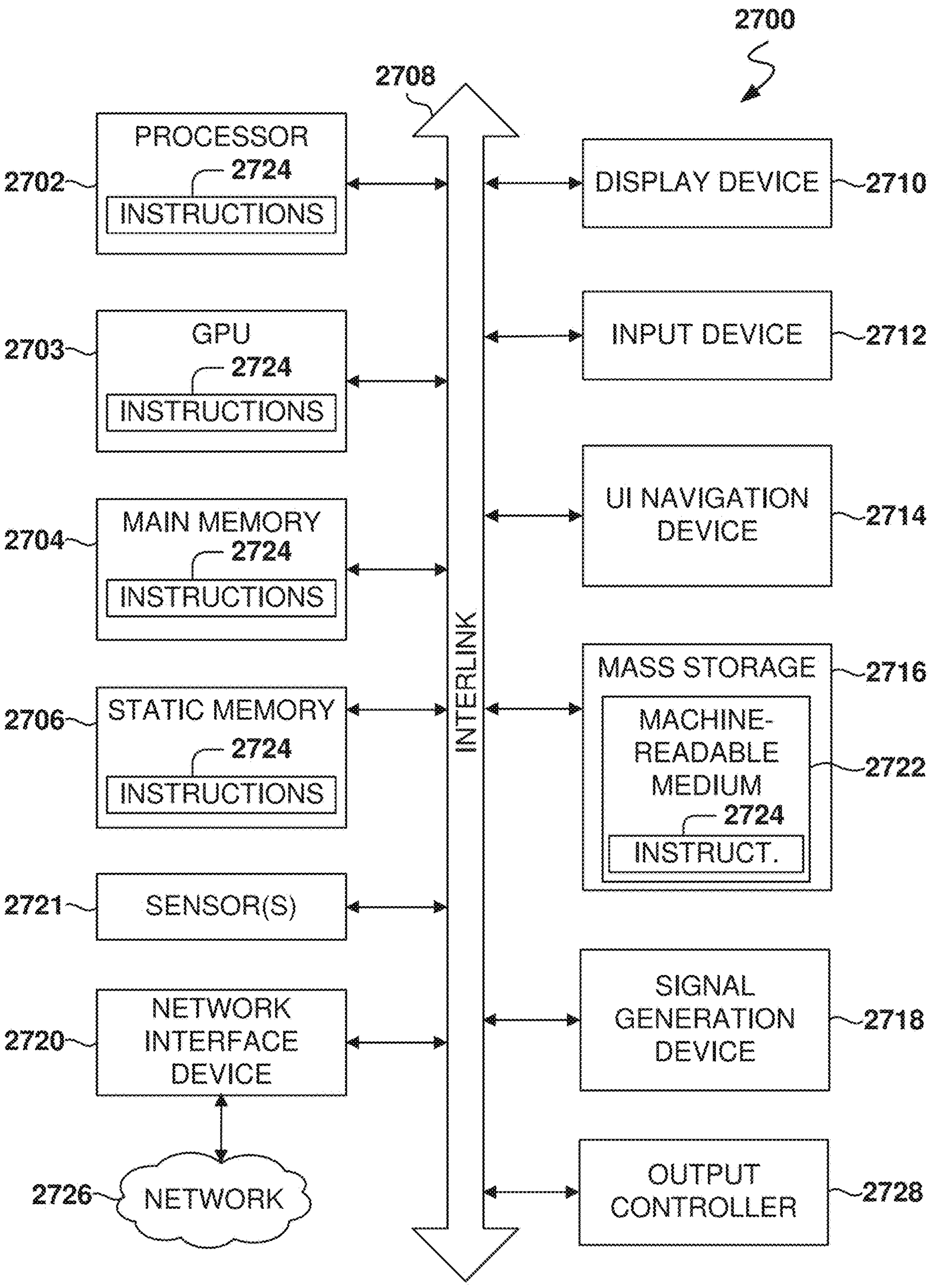
FIG. 27 shows a block diagram illustrating an example of a machine upon or by which one or more examples described herein may be implemented or controlled.

FIG. 27 shows a block diagram illustrating an example of a machine 2700 upon or by which one or more example process examples described herein may be implemented or controlled. In alternative examples, the machine 2700 may operate as a standalone device or be connected (e.g., networked) to other machines. In a networked deployment, the machine 2700 may operate in the capacity of a server machine, a client machine, or both in server-client network environments. In an example, the machine 2700 may act as a peer machine in a peer-to-peer (P2P) (or other distributed) network environment. Further, while only a single machine 2700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as recited herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 2700 (e.g., computer system) may include a hardware processor 2702 (e.g., a central processing unit (CPU), a hardware processor core, or any combination thereof), a graphics processing unit (GPU 2703), a main memory 2704, and a static memory 2706, some or all of which may communicate with each other via an interlink 2708 (e.g., bus). The machine 2700 may further include a display device 2710, an alphanumeric input device 2712 (e.g., a keyboard), and a user interface (UI) navigation device 2714 (e.g., a mouse). In an example, the display device 2710, alphanumeric input device 2712, and UI navigation device 2714 may be a touch screen display. The machine 2700 may additionally include a mass storage device 2716 (e.g., drive unit), a signal generation device 2718 (e.g., a speaker), a network interface device 2720, and one or more sensors 2721, such as a Global Positioning System (GPS) sensor, compass, accelerometer, or another sensor. The machine 2700 may include an output controller 2728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 2702 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 2702 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 2702 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 2702 may be emulated in software, running on a physical processor, as a virtual processor or virtual circuit. The virtual processor may behave like an independent processor but is implemented in software rather than hardware.

The mass storage device 2716 may include a machine-readable medium 2722 on which one or more sets of data structures or instructions 2724 (e.g., software) embodying or utilized by any of the techniques or functions described herein. The instructions 2724 may also reside, completely or at least partially, within the main memory 2704, within the static memory 2706, within the hardware processor 2702, or the GPU 2703 during execution thereof by the machine 2700. For example, one or any combination of the hardware processor 2702, the GPU 2703, the main memory 2704, the static memory 2706, or the mass storage device 2716 may constitute machine-readable media.

While the machine-readable medium 2722 is illustrated as a single medium, the term "machine-readable medium" may include a single medium or multiple media (e.g., a centralized or distributed database and associated caches and servers) configured to store one or more instructions 2724.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 2724 for execution by the machine 2700 and that causes the machine 2700 to perform any one or more of the techniques of the present disclosure or that is capable of storing, encoding, or carrying data structures used by or associated with such instructions 2724. Non-limiting machine-readable medium examples may include solid-state memories and optical and magnetic media. For example, a massed machine-readable medium comprises a machine-readable medium 2722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 2724 may be transmitted or received over a communications network 2726 using a transmission medium via the network interface device 2720. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2724 for execution by the machine 2700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:

causing presentation of a user interface (UI) comprising options to select an event template from a plurality of event templates for creating agents to detect events, each event template being a pre-configured agent for detecting an occurrence of an event, each event template being a pre-configured agent for detecting an occurrence of an event with configurable parameters that determine a trigger for an occurrence of the event and one or more actions to perform when the event is triggered, the agent being a program that determines if the trigger is activated to determine that the event has occurred;

causing presentation on the UI of options, based on the selected event template, for defining the configurable parameters of the selected event template that determine the trigger for the occurrence of the event and the one or more actions, the UI providing options to select a trigger filter from a plurality of filter options comprising zone, person or car, object presence, object absence, objects overlapping, objects spatial relationship, and object count, the UI options further comprising an option to select one or more cameras from a plurality of cameras;

creating the agent based on the selected event template and the selected trigger filter; and ongoing monitoring, by the agent, video data from one or more cameras to determine an activation of the trigger for the occurrence of the event in a zone based on the trigger filter applied to the video data, the zone being an area that has been delineated by a user within view of the one or more cameras, wherein ongoing monitoring the video data comprises:

detecting objects within one or more frames in the video data;

determining values of the trigger filter based on the detected objects in the one or more frames;

determining that the trigger has been activated based on the values of the trigger filter;

determining the occurrence of the event in response to the trigger being activated; and performing the one or more actions configured for the selected event template in response to the determining the occurrence of the event.

2. The method as recited in claim 1, the configurable parameters of the event comprising camera selection, the trigger or combination of triggers, and the one or more actions.

3. The method as recited in claim 2, wherein the configurable parameters of the event further comprise a value for a severity of the event, wherein determining that the trigger has been activated further comprises:

determining that the value of the severity exceeds a predetermined threshold.

4. The method as recited in claim 2, wherein the plurality of event templates further comprises crowding, person of interest, fence jumping, forklift near miss, vehicle near miss, tailgating, loitering, and possible fall.

5. The method as recited in claim 1, wherein the options for defining the configurable parameters that determine the occurrence of the event comprise people, animals, vehicles, tools, and weapons.

6. The method as recited in claim 1, wherein detecting the objects further comprises:

identifying object attributes selected from a group comprising person identity, color, position, vehicle type, and license plate; and identifying movement of the object based on a plurality of frames.

7. The method as recited in claim 1, wherein the trigger comprises two or more conditions comprising a first condition associated with a relationship between locations of a detected person and a detected machine in a warehouse and a second condition associated with the machine moving closer to the person.

8. The method as recited in claim 7, wherein the UI provides options for defining the relationship between the locations of two detected objects comprising overlapping, directional relationship of one object with reference to another object, and distance between objects.

9. The method as recited in claim 1, further comprising:

identifying features of the detected objects; and storing the features in a table.

10. The method as recited in claim 9, further comprising:

providing a UI for searching events based on the features stored in the table, the UI providing filtering options comprising time, event name, location, camera, and event severity.

11. The method as recited in claim 1, wherein each camera is in communication with an intelligent video recorder (IVR) that transmits the video data to a server, wherein the IVR includes a machine-learning (ML) model for detecting the objects.

12. The method as recited in claim 1, wherein the trigger comprises a filter based on an external-data condition based on data provided by an external device.

13. The method as recited in claim 12, wherein the external device is a badging device controlling access to the zone.

14. A system comprising:

a memory comprising instructions; and one or more computer processors, the instructions, when executed by the one or more computer processors, causing the system to perform operations comprising:

causing presentation of a user interface (UI) comprising options to select an event template from a plurality of event templates for creating agents to detect events, each event template being a pre-configured agent for detecting an occurrence of an event, each event template being a pre-configured agent for detecting an occurrence of an event with configurable parameters that determine a trigger for an occurrence of the event and one or more actions to perform when the event is triggered, the agent being a program that determines if the trigger is activated to determine that the event has occurred;

causing presentation on the UI of options, based on the selected event template, for defining the configurable parameters of the selected event template that determine the trigger for the occurrence of the event and the one or more actions, the UI providing options to select a trigger filter from a plurality of filter options comprising zone, person or car, object presence, object absence, objects overlapping, objects spatial relationship, and object count, the UI options further comprising an option to select one or more cameras from a plurality of cameras;

creating the agent based on the selected event template and the selected trigger filter; and ongoing monitoring, by the agent, video data from one or more cameras to determine an activation of the trigger for the occurrence of the event in a zone based on the trigger filter applied to the video data, the zone being an area that has been delineated by a user within view of the one or more cameras, wherein ongoing monitoring the video data comprises:

detecting objects within one or more frames in the video data;

determining values of the trigger filter based on the detected objects in the one or more frames;

determining that the trigger has been activated based on the values of the trigger filter;

determining the occurrence of the event in response to the trigger being activated; and performing the one or more actions configured for the selected event template in response to the determining the occurrence of the event.

15. The system as recited in claim 14, the configurable parameters of the event comprising camera selection, the trigger or combination of triggers, and the one or more actions.

16. The system as recited in claim 15, wherein the plurality of event templates further comprises crowding, person of interest, fence jumping, forklift near miss, vehicle near miss, tailgating, loitering, and possible fall.

17. The system as recited in claim 14, wherein detecting the objects further comprises:

identifying object attributes selected from a group comprising person identity, color, position, vehicle type, and license plate; and identifying movement of the object based on a plurality of frames.

18. A non-transitory machine-readable storage medium including instructions that, when executed by a machine, cause the machine to perform operations comprising:

causing presentation of a user interface (UI) comprising options to select an event template from a plurality of event templates for creating agents to detect events, each event template being a pre-configured agent for detecting an occurrence of an event, each event template being a pre-configured agent for detecting an occurrence of an event with configurable parameters that determine a trigger for an occurrence of the event and one or more actions to perform when the event is triggered, the agent being a program that determines if the trigger is activated to determine that the event has occurred;

causing presentation on the UI of options, based on the selected event template, for defining the configurable parameters of the selected event template that determine the trigger for the occurrence of the event and the one or more actions, the UI providing options to select a trigger filter from a plurality of filter options comprising zone, person or car, object presence, object absence, objects overlapping, objects spatial relationship, and object count, the UI options further comprising an option to select one or more cameras from a plurality of cameras;

creating the agent based on the selected event template and the selected trigger filter; and ongoing monitoring, by the agent, video data from one or more cameras to determine an activation of the trigger for the occurrence of the event in a zone based on the trigger filter applied to the video data, the zone being an area that has been delineated by a user within view of the one or more cameras, wherein ongoing monitoring the video data comprises:

detecting objects within one or more frames in the video data;

determining values of the trigger filter based on the detected objects in the one or more frames;

determining that the trigger has been activated based on the values of the trigger filter;

determining the occurrence of the event in response to the trigger being activated; and performing the one or more actions configured for the selected event template in response to the determining the occurrence of the event.

19. The non-transitory machine-readable storage medium as recited in claim 18, the configurable parameters of the event comprising camera selection, the trigger or combination of triggers, and the one or more actions.

20. The non-transitory machine-readable storage medium as recited in claim 19, wherein the plurality of event templates further comprises crowding, person of interest, fence jumping, forklift near miss, vehicle near miss, tailgating, loitering, and possible fall.

21. The non-transitory machine-readable storage medium as recited in claim 18, wherein the options for defining the configurable parameters that determine the occurrence of the event comprise people, animals, vehicles, tools, and weapons.

22. The non-transitory machine-readable storage medium as recited in claim 18, wherein detecting the objects further comprises:

identifying object attributes selected from a group comprising person identity, color, position, vehicle type, and license plate; and identifying movement of the object based on a plurality of frames.

23. The method as recited in claim 1, wherein the plurality of event templates comprises people absent in a configurable zone, person running, occurrence of slip and fall, person enters a configurable restricted area, kiosk is unattended, and unattended vehicle, each event template comprising one or more filters and one or more actions.

* * * * *